US006742497B1

(12) United States Patent
Kanamaru et al.

(10) Patent No.: US 6,742,497 B1
(45) Date of Patent: Jun. 1, 2004

(54) DEVICE FOR CONTROLLING ROTATIONAL SPEED OF INTERNAL COMBUSTION ENGINE

(75) Inventors: Masanobu Kanamaru, Mishima (JP); Satoru Watanabe, Susono (JP); Hidemi Onaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/926,283

(22) PCT Filed: Apr. 6, 2000

(86) PCT No.: PCT/JP00/02238

§ 371 (c)(1),
(2), (4) Date: Oct. 5, 2001

(87) PCT Pub. No.: WO00/60230

PCT Pub. Date: Dec. 10, 2000

(30) Foreign Application Priority Data

Apr. 6, 1999 (JP) .............................................. 11/98897
May 7, 1999 (JP) ........................................... 11/127457
Jun. 3, 1999 (JP) ........................................... 11/156831
Jun. 9, 1999 (JP) ........................................... 11/162444

(51) Int. Cl.[7] ............................. F02D 41/08; F02D 9/02
(52) U.S. Cl. .............................. 123/339.11; 123/339.19; 123/339.24; 123/352
(58) Field of Search ......................... 123/339.1, 339.11, 123/339.12, 339.22, 339.23, 339.24, 324, 337, 336, 352, 404

(56) References Cited

U.S. PATENT DOCUMENTS

| 4,344,397 | A | | 8/1982 | Geiger et al. | ................ 123/339 |
| 4,378,770 | A | | 4/1983 | Ikeura | ......................... 123/424 |
| 4,513,711 | A | | 4/1985 | Braun et al. | ................. 123/339 |
| 4,638,778 | A | * | 1/1987 | Kamei et al. | ............. 123/339.2 |
| 4,653,452 | A | | 3/1987 | Sawada et al. | .............. 123/491 |
| 4,883,034 | A | * | 11/1989 | Yashiki et al. | .......... 123/339.17 |
| 4,964,386 | A | | 10/1990 | Akiyama et al. | ............ 123/339 |
| 5,081,973 | A | | 1/1992 | Minamitani | .................. 123/339 |
| 5,163,408 | A | | 11/1992 | Nemoto | ....................... 123/491 |
| 5,265,571 | A | * | 11/1993 | Sodeno | ................... 123/339.17 |
| 5,333,585 | A | | 8/1994 | Kuroda | ......................... 123/339 |
| 5,445,124 | A | | 8/1995 | Tomisawa et al. | ...... 123/339.11 |
| 5,447,138 | A | | 9/1995 | Barnes | ........................ 123/446 |
| 5,450,828 | A | * | 9/1995 | Sakamoto et al. | ...... 123/339.11 |
| 5,495,835 | A | | 3/1996 | Ueda | ...................... 123/339.11 |
| 5,586,534 | A | | 12/1996 | Fujimoto | ..................... 123/325 |
| 5,605,138 | A | | 2/1997 | Deichsel et al. | ............ 123/491 |

(List continued on next page.)

FOREIGN PATENT DOCUMENTS

| EP | 0 437 057 | 7/1991 |
| EP | 0 518 289 | 12/1992 |
| EP | 1 048 838 | 11/2000 |

(List continued on next page.)

OTHER PUBLICATIONS

Patent Abstract of Japan, JP 62–003139, Jan. 9, 1987.

*Primary Examiner*—Willis R. Wolfe
*Assistant Examiner*—Johnny H. Hoang
(74) *Attorney, Agent, or Firm*—Oblon, Spivak, McClelland, Maier & Neustadt, P.C.

(57) ABSTRACT

An engine speed control unit of an internal combustion engine for controlling an engine speed so that it can reach a target value, changes the engine speed so that it can reach a target value in a period of time from the completion of the initial combustion of the engine starting to the idling steady state. The after-start engine speed peak actual value "gnepk", which is an engine speed in the idling state in a predetermined period of time from the start of the engine, is calculated, and the after-start engine speed peak target value "tnepk" is read in from the map, and the ratio "rnepk" is found. When the ratio "rnepk" is out of the target range, it can be considered that the burning state is bad.

28 Claims, 36 Drawing Sheets

U.S. PATENT DOCUMENTS

| | | | |
|---|---|---|---|
| 5,615,660 A | 4/1997 | Iwano et al. | 123/680 |
| 5,657,625 A * | 8/1997 | Koga et al. | 60/274 |
| 5,662,084 A | 9/1997 | Deguchi et al. | 123/339.11 |
| 5,701,867 A * | 12/1997 | Mizutani et al. | 123/339.16 |
| 5,784,878 A * | 7/1998 | Kato et al. | 60/274 |
| 5,988,139 A * | 11/1999 | Wasilewski et al. | 123/339.11 |
| 6,009,851 A * | 1/2000 | Iida et al. | 123/339.12 |
| 6,152,105 A | 11/2000 | Nishimura et al. | 123/339.11 |
| 6,212,879 B1 | 4/2001 | Nishimura et al. | 60/274 |

FOREIGN PATENT DOCUMENTS

| | | |
|---|---|---|
| JP | 58-174143 | 10/1983 |
| JP | 59-3135 | 1/1984 |
| JP | 62-3139 | 1/1987 |
| JP | 62-32250 | 2/1987 |
| JP | 62-210240 | 9/1987 |
| JP | 63-314345 | 12/1988 |
| JP | 2-145642 | 12/1990 |
| JP | 04-183950 | 6/1992 |
| JP | 5-222997 | 8/1993 |
| JP | 06-101609 | 4/1994 |
| JP | 07-071293 | 3/1995 |
| JP | 09-303189 | 11/1997 |
| JP | 10-009030 | 1/1998 |
| JP | 10-030480 | 2/1998 |
| JP | 10-148154 | 6/1998 |
| JP | 2001-59438 | 3/2001 |

* cited by examiner

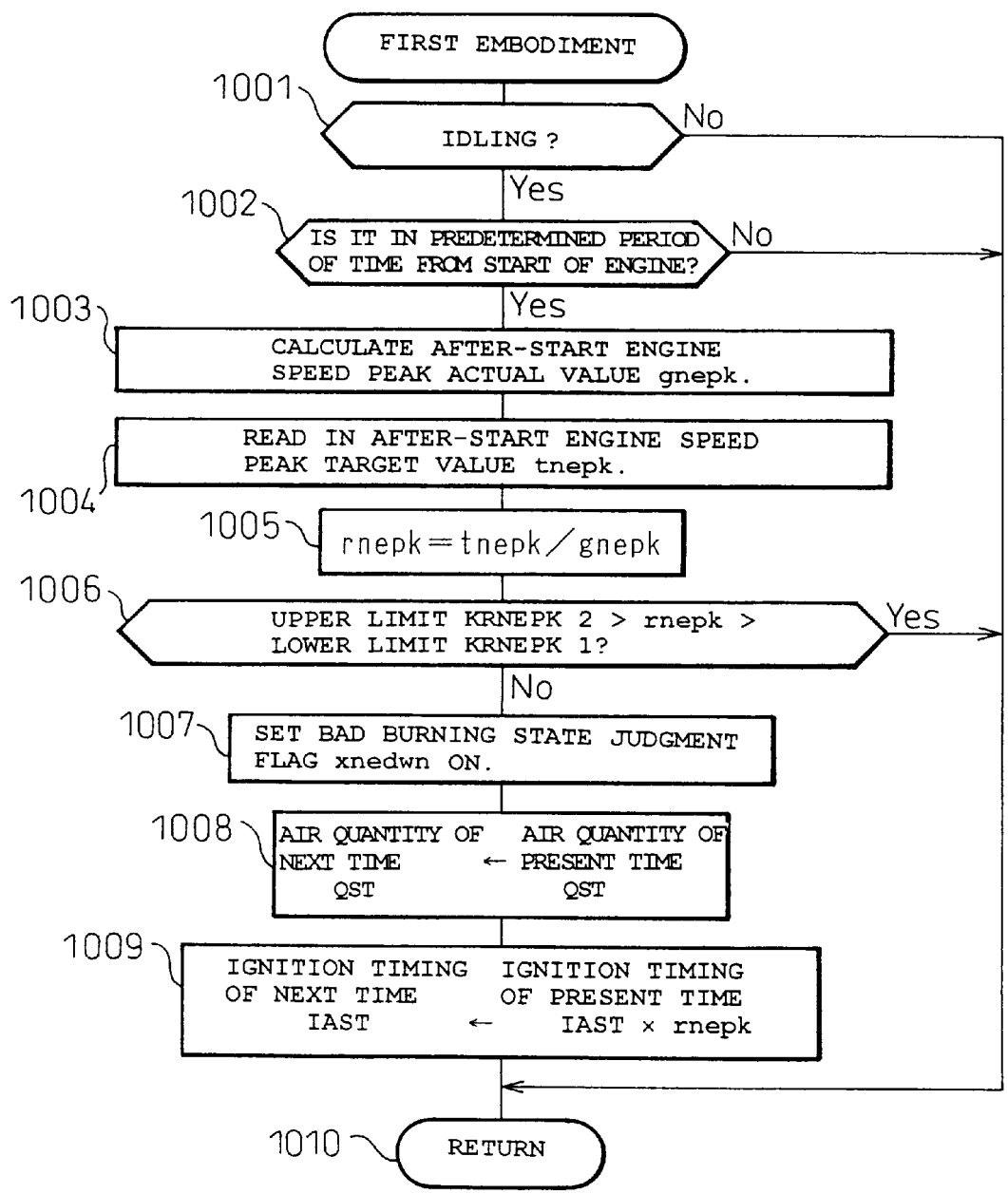

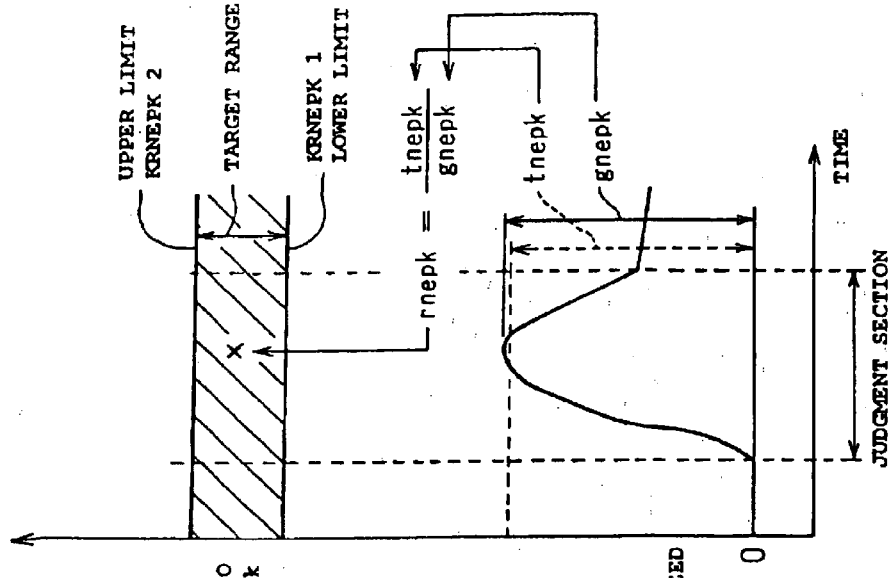
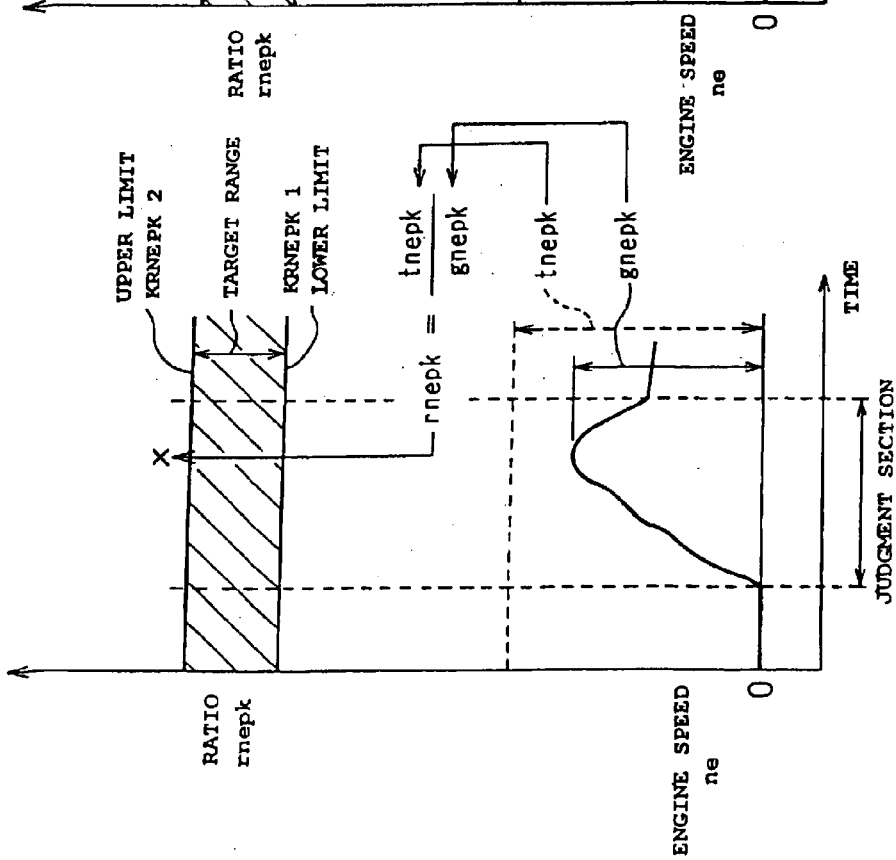

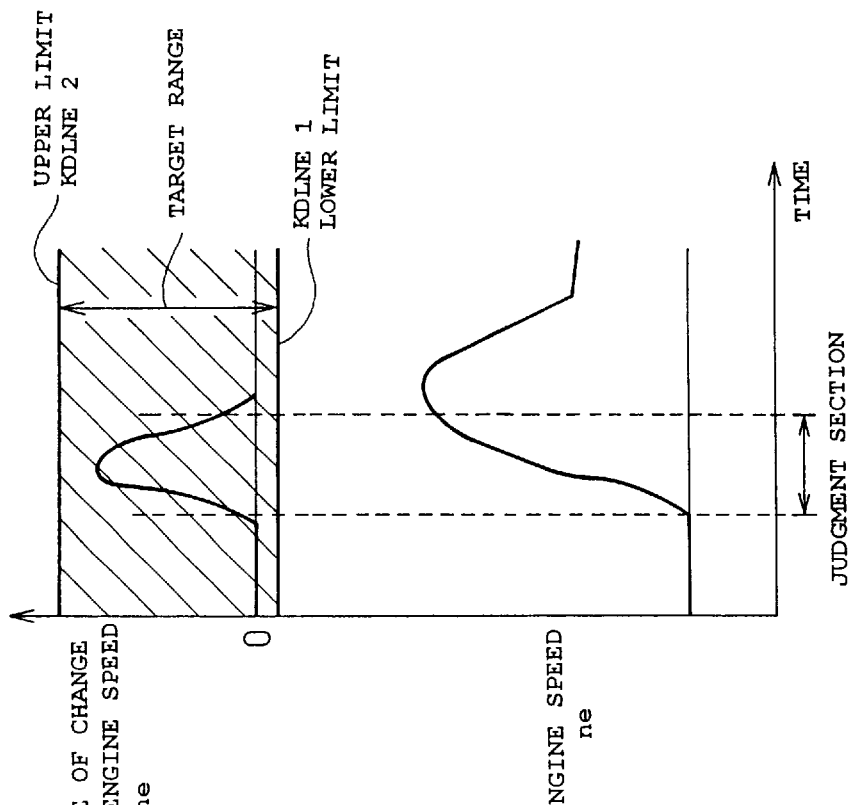
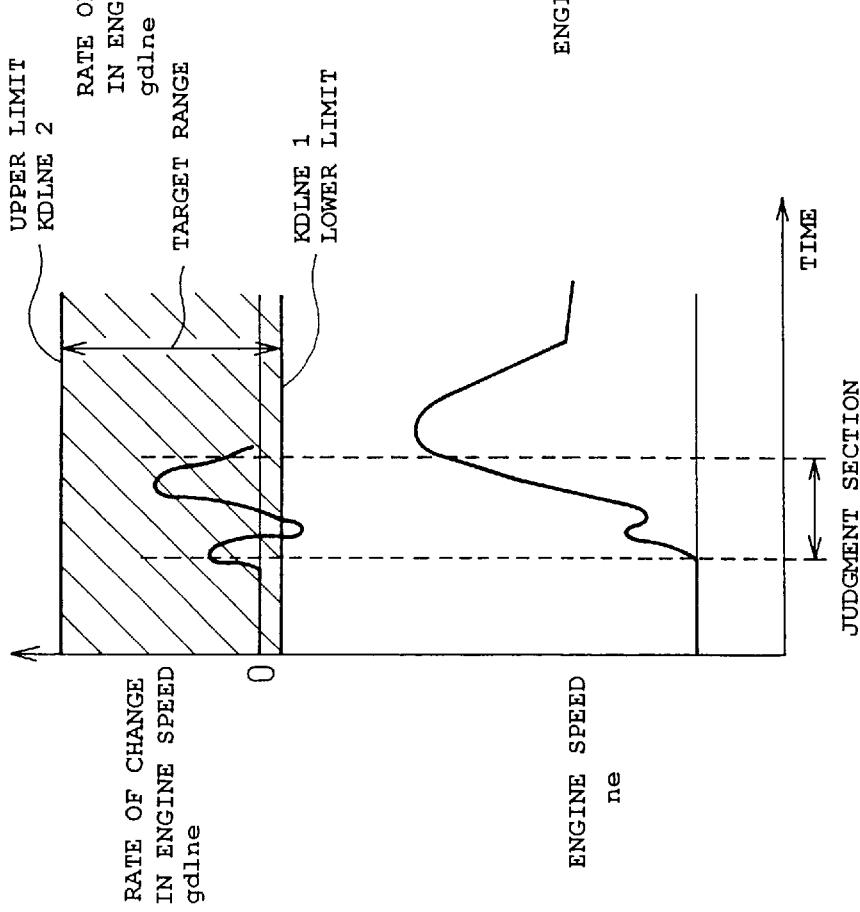

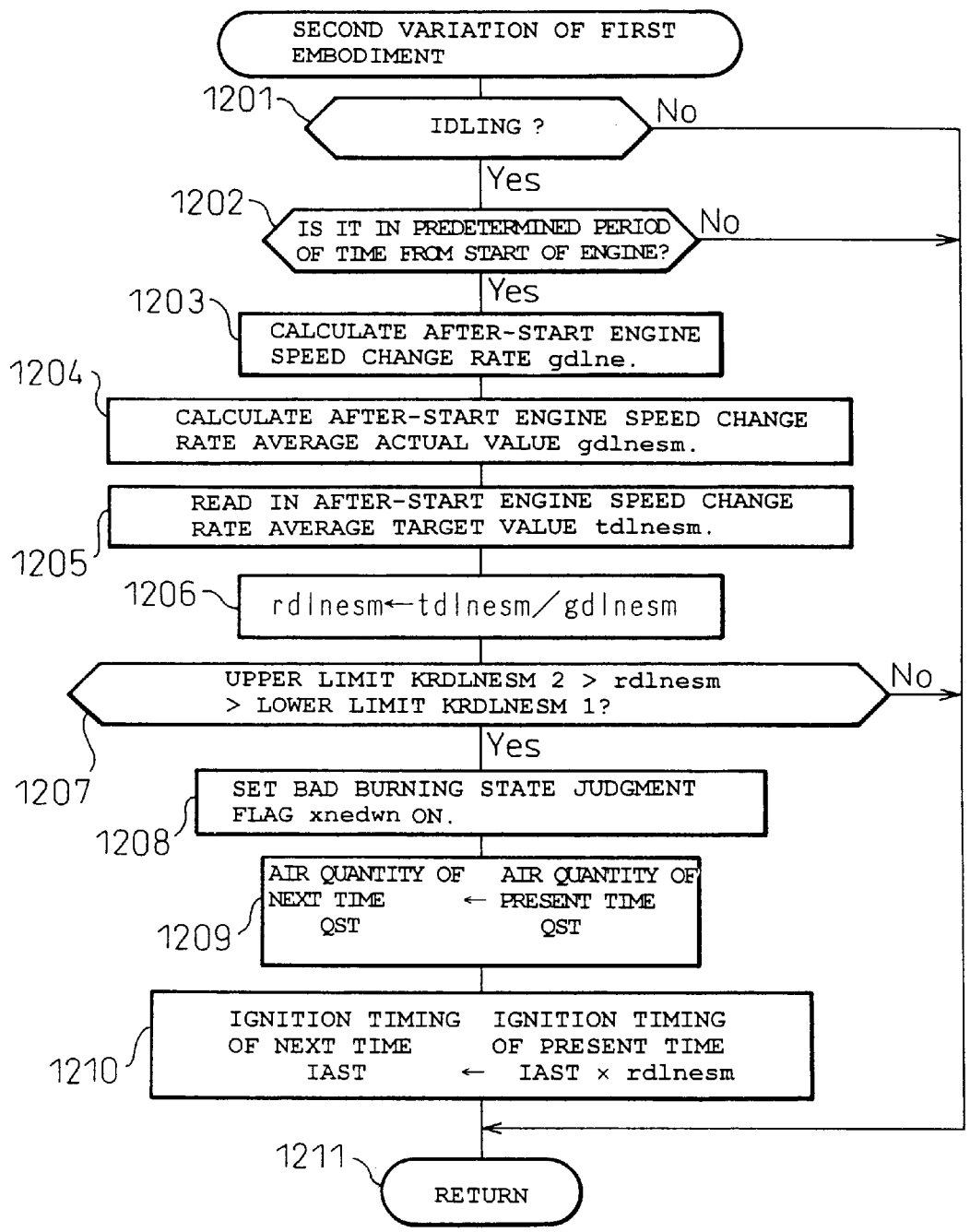

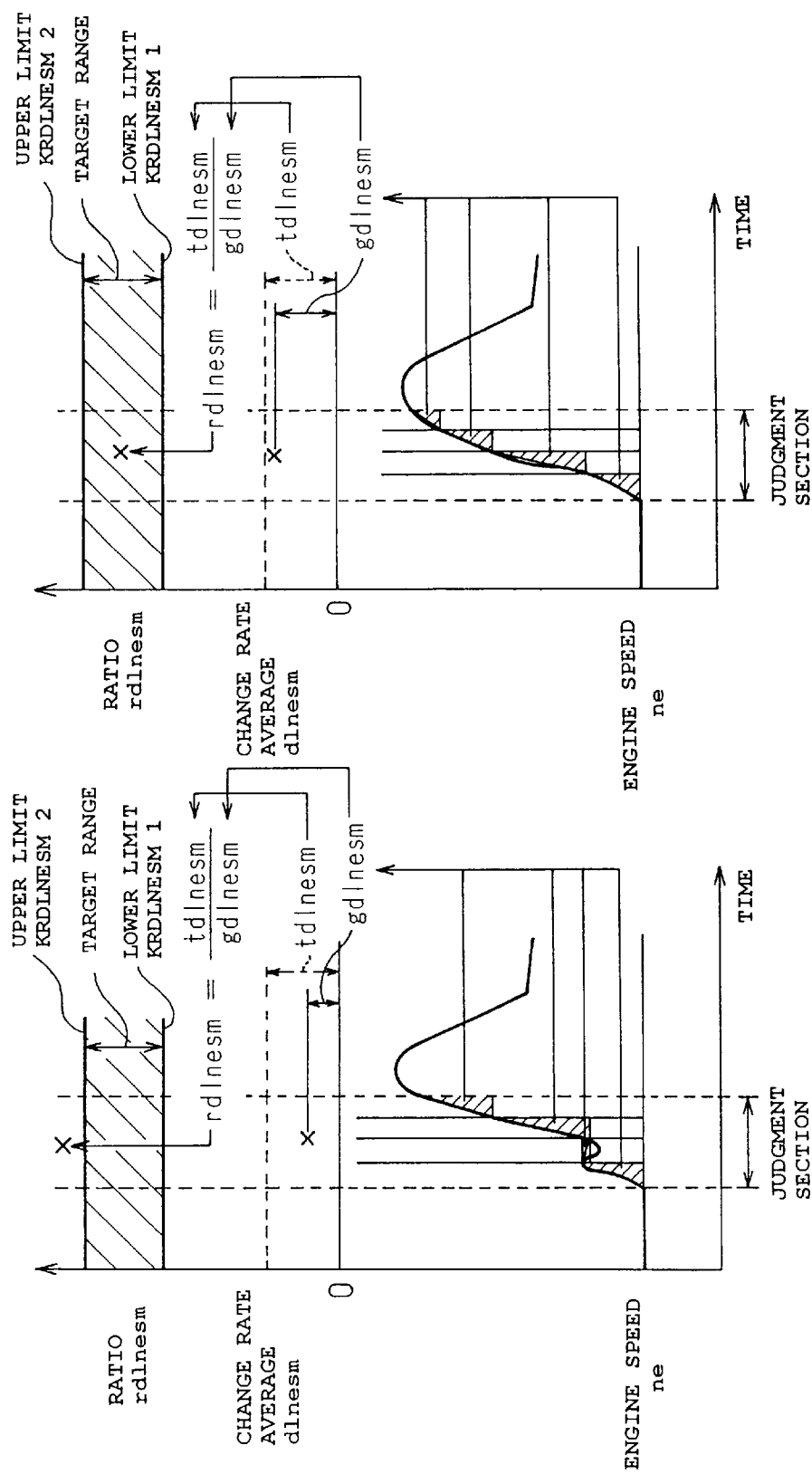

Fig.21
| dlne (rpm) | −50 | 0 | +50 |
|---|---|---|---|
| dlmia (°CA) | +A | 0 | −A |
Fig.22
| dlne (rpm) | −50 | 0 | +50 |
|---|---|---|---|
| dlmtau (sec) | +B | 0 | −B |
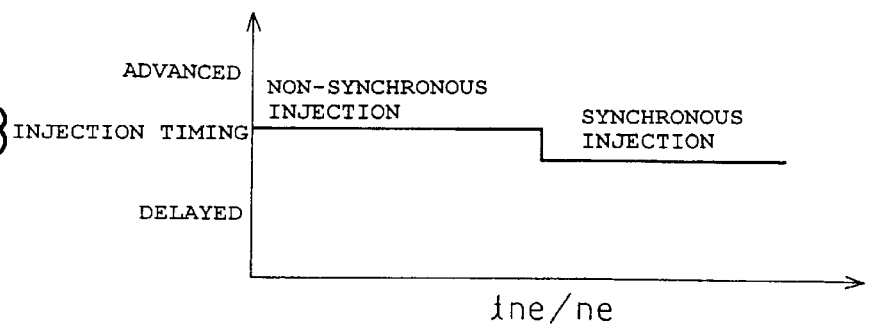
Fig.23
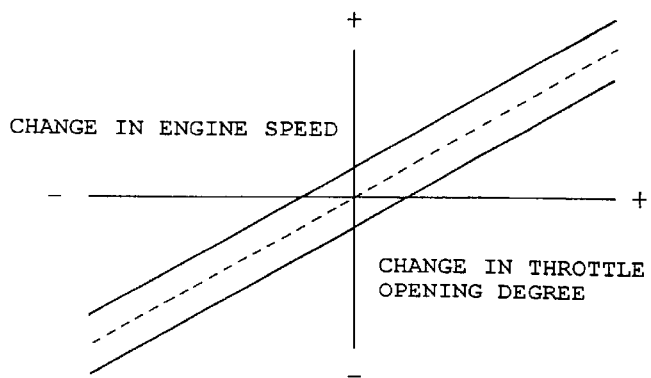
Fig.24

Fig.37

| dℓne (rpm) | -50 | 0 | +50 |
|---|---|---|---|
| dDTHA (°) | +A | 0 | -A |

Fig.38

| dℓne (rpm) | -50 | 0 | +50 |
|---|---|---|---|
| dDIA (°CA) | +B | 0 | -B |

Fig.39

| dℓne (rpm) | -50 | 0 | +50 |
|---|---|---|---|
| dDTAU (sec) | +C | 0 | -C |

Fig.40

|  |  | LOW TEMPERATURE COOLANT REGION | INTERMEDIATE TEMPERATURE COOLANT REGION | HIGH TEMPERATURE COOLANT REGION |
|---|---|---|---|---|
| RUNNING POSITION | A/C ON | $GTHA_{DLAO}$ | $GTHA_{DMAO}$ | $GTHA_{DHAO}$ |
|  | A/C OFF | $GTHA_{DLAF}$ | $GTHA_{DMAF}$ | $GTHA_{DHAF}$ |
| STOPPING POSITION | A/C ON | $GTHA_{NLAO}$ | $GTHA_{NMAO}$ | $GTHA_{NHAO}$ |
|  | A/C OFF | $GTHA_{NLAF}$ | $GTHA_{NMAF}$ | $GTHA_{NHAF}$ |

Fig.41

|  |  | LOW TEMPERATURE COOLANT REGION | INTERMEDIATE TEMPERATURE COOLANT REGION | HIGH TEMPERATURE COOLANT REGION |
|---|---|---|---|---|
| RUNNING POSITION | A/C ON | $GIA_{DLAO}$ | $GIA_{DMAO}$ | $GIA_{DHAO}$ |
|  | A/C OFF | $GIA_{DLAF}$ | $GIA_{DMAF}$ | $GIA_{DHAF}$ |
| STOPPING POSITION | A/C ON | $GIA_{NLAO}$ | $GIA_{NMAO}$ | $GIA_{NHAO}$ |
|  | A/C OFF | $GIA_{NLAF}$ | $GIA_{NMAF}$ | $GIA_{NHAF}$ |

Fig.42

|  |  | LOW TEMPERATURE COOLANT REGION | INTERMEDIATE TEMPERATURE COOLANT REGION | HIGH TEMPERATURE COOLANT REGION |
|---|---|---|---|---|
| RUNNING POSITION | A/C ON | $GTAU_{DLAO}$ | $GTAU_{DMAO}$ | $GTAU_{DHAO}$ |
|  | A/C OFF | $GTAU_{DLAF}$ | $GTAU_{DMAF}$ | $GTAU_{DHAF}$ |
| STOPPING POSITION | A/C ON | $GTAU_{NLAO}$ | $GTAU_{NMAO}$ | $GTAU_{NHAO}$ |
|  | A/C OFF | $GTAU_{NLAF}$ | $GTAU_{NMAF}$ | $GTAU_{NHAF}$ |

DEVICE FOR CONTROLLING ROTATIONAL SPEED OF INTERNAL COMBUSTION ENGINE

BACKGROUND OF THE INVENTION

1. Field of the Invention

The present invention relates to an engine speed control unit for controlling the engine speed of an internal combustion engine so that it can reach a target value.

2. Background Art

It is important to control the engine speed of an internal combustion engine so that it can reach a target value.

For example, in the case of an automobile, in order to purify exhaust gas to be cleaner or in order to improve drivability, it is necessary to control the engine speed of an internal combustion engine so that it can reach the target value in various conditions.

For example, as the engine speed of an internal combustion engine after the engine has started greatly affects the exhaust gas, that is, as the engine speed of an internal combustion engine in the period from the completion of the initial combustion at starting to the steady state of idling of the engine greatly affects the exhaust gas, it is necessary to control the engine speed after the start of the engine so that the engine speed can reach the target value.

In this connection, one of the reasons why the engine speed fluctuates after the start of an engine is that a failure in burning occurs in a cylinder. Accordingly, in order to prevent the engine speed from fluctuating after the start of an engine, it is necessary to detect the burning state in a cylinder after the engine has started and control the engine speed so that burning can be conducted properly. In order to control the engine speed of an internal combustion engine so that burning can be conducted properly, Japanese Unexamined Patent Publication No. 62-3139 discloses a device by which the degree of throttle opening is controlled to a target value corresponding to the temperature of an internal combustion engine at the start.

However, when a quantity of suction air is changed in the case of a failure in burning, the burning state is further deteriorated. The reason is described as follows. The failure in burning at the start of an engine is caused by a lean air/fuel ratio because fuel is not sufficiently atomized at the start of an engine but adheres onto a wall face of a suction port so that a sufficient quantity of fuel can not be introduced into a combustion chamber. When the degree of throttle opening is controlled so that it can be increased, negative pressure in a suction tube is reduced, and fuel atomization is further deteriorated and the air/fuel ratio becomes much leaner.

The engine speed of an internal combustion engine in the idling steady state greatly affects the exhaust gas. Therefore, it is also necessary to control the engine speed in the idling steady state so that it can reach the target value. In order to accomplish the above object, Japanese Unexamined Patent Publication No. 5-222997 discloses a suitable device. In this device, in the case of a failure of the suction air feedback control system, it is changed over to the ignition timing feedback control system, and when the engine temperature is low, ignition timing feedback control is subjected to restriction.

In the device disclosed in the above unexamined patent publication, in the case of a failure of the suction air feedback control system, it is changed over to the ignition timing feedback control system, however, even if a failure in burning is caused by feedback control conducted by the suction air feedback control system, it is impossible to detect the failure in burning.

Even if a load given to the engine is changed, it is necessary to keep the engine speed at the target value. In order to accomplish the object, Japanese Unexamined Patent Publication No. 59-3135 discloses a device by which feedback control is conducted so that the idling engine speed can be the target value by increasing the rate of control. However, according to the device of the above unexamined patent publication, it is disclosed that the rate of control is increased with respect to the fluctuation of a load given to the engine, however, the device is provided with only a feedback control means conducted by a quantity of suction air. Therefore, it is impossible to conduct feedback control with a parameter other than the quantity of suction air.

Japanese Unexamined Patent Publication No. 62-210240 discloses a device. In this device, in the case where the temperature of engine coolant is low, suction air feedback control is stopped and open control is conducted while the suction air is fixed at a value corresponding to the temperature of engine coolant. This device is characterized in that learning is conducted in the case of obtaining a value corresponding to the temperature of engine coolant. According to the device of the above unexamined patent publication, a quantity of suction air in the case where suction air feedback control is stopped and open control is conducted can be found by learning, and this open control can comply with a change with time or a difference between each products.

However, even in the process of suction air feedback control, of course, control is affected by the change with time or the difference between each products. Therefore, for example, in the case where the engine speed is subjected to feedback control by adding a correction value to a reference value of suction air quantity, a difference between the required value and the reference value is increased by the change with time or the difference between individual bodies. Accordingly, the correction value is increased. As a result, it takes a long period of time for the engine speed to reach the target value.

However, it is impossible for the device of the above unexamined patent publication to solve the above problems although learning is conducted by the device.

In view of the above problems, it is an object of the present invention to provide an engine speed control unit capable of controlling the engine speed so that it can reach the target value.

It is another object of the present invention to provide an engine speed control unit capable of controlling the engine speed at the start of the engine so that it can reach the target value. It is still another object of the present invention to provide an engine speed control unit capable of controlling the engine speed in the idling steady state so that it can reach the target value. It is still another object of the present invention to provide an engine speed control unit capable of controlling the engine speed so that it can reach the target value even if a load give to the engine fluctuates. It is still another object of the present invention to provide an engine speed control unit capable of controlling the engine speed in the idling steady state so that it can reach the target value. It is still another object of the present invention to provide an engine speed control unit capable of removing influences of a change with time and a difference in individual bodies upon feedback control of the engine speed.

SUMMARY OF THE INVENTION

The present invention provides an engine speed control unit of an internal combustion engine for controlling an engine speed so that it can reach a target, comprising: a first engine speed control means for controlling the engine speed by changing a quantity of suction air; a second engine speed control means for controlling the engine speed by changing a control value of a control parameter except for the quantity of suction air; and a burning state judgment means (also referred to as a means for judging a burning state), wherein the engine speed is controlled by the first engine speed control means in the case of a good burning state, and control by the first engine speed control means is stopped and the engine speed is controlled by the second engine speed control means in the case of a bad burning state.

In the engine speed control unit composed as described above, in the case of a good burning state, a quantity of suction air is changed by the first engine speed control means so as to control the engine speed. In the case of a bad burning state, the first engine speed control means stops controlling, and another control parameter, other than the quantity of suction air, is changed by the second engine speed control means without changing the quantity of suction air, so that the engine speed can be controlled. Therefore, the quantity of suction air is not changed and the burning state is not further deteriorated.

According to one aspect of the present invention, after the engine has been set in motion, that is, in a period from the completion of initial combustion at starting to an idling steady state, the engine speed is controlled so that it can reach a target value. Therefore, the first engine speed control means is made to be a first after-start engine speed control means for controlling the after-start engine speed, which is an engine speed from the completion of initial combustion at Starting to the idling steady state, so that the after-start engine speed can show a target change characteristic in the case where the burning state is judged to be good, the second engine speed control means is made to be a second after-start engine speed control means for controlling the after-start engine speed, which is an engine speed from the completion of explosion at the engine start to the idling steady state, so that the after-start engine speed can show a target change characteristic in the case where the burning state is judged to be bad, and the after-start engine speed from the completion of explosion at the engine start to the idling steady state is controlled.

In this case, for example, the second after-start engine speed control means changes at least one of the control values of ignition timing, quantity of fuel injection and fuel injection timing.

Further, an engine speed control unit of an internal combustion engine comprises a bad burning cylinder judgment means for judging a bad burning cylinder, wherein, when it is judged to be a bad burning state, the bad burning cylinder is distinguished from other cylinders and controlled by the second after-start engine speed control means so that the engine speed can show a target change characteristic.

According to another aspect of the present invention, after the engine has been set in motion, that is, in a period from the completion of explosion to an idling steady state, the engine speed is controlled so that it can reach a target value. Therefore, the first engine speed control means is made to be a first idling engine speed control means for controlling the engine speed in the idling steady state so that it can reach the target value by feedback control in the case where the burning state is judged to be good, the second engine speed control means is made to be a second idling engine speed control means for controlling the engine speed in the idling steady state so that it can reach the target value in the case where the burning state is judged to be bad, and the engine speed in the idling steady state is controlled so that it can reach the target value.

In this case, for example, when it is judged to be a bad burning state and the idling engine speed control by the first idling engine speed control means is stopped and the idling engine speed control by the second idling engine speed control means is executed, the feedback control by the first idling engine speed control means is executed again after that, the burning state is rejudged by the burning state judgment means in this state and, when it is again judged to be a bad burning state in the rejudgment of the burning state, the idling engine speed control is executed by the second engine speed control means.

The idling engine speed control executed by the second engine speed control means after the rejudgment of the burning state is conducted by the same parameter as that of the idling engine speed control executed by the second engine speed control means before the rejudgment of the burning state while the control value is being changed.

The idling engine speed control executed by the second engine speed control means after the rejudgment of the burning state is conducted by a different parameter from that of the idling engine speed control executed by the second engine speed control means before the rejudgment of the burning state.

The idling engine speed control conducted by the second engine speed control means before the rejudgment of the burning state and the idling engine speed control conducted by the second engine speed control means after the rejudgment of the burning state are executed being selected so that the idling engine speed control, the influence given to exhaust gas emission of which is smaller, is executed first.

Further, the engine speed control unit of an internal combustion engine comprises a bad burning cylinder discrimination means for discriminating a cylinder in a bad burning state, wherein when it is judged to be a bad burning state, the bad burning cylinder is discriminated from other cylinders and controlled by the second engine speed control means.

The idling engine speed control conducted by the second engine speed control means is also feedback control.

The idling engine speed control conducted by the second engine speed control means is a quantitative change control by which the control parameter is changed by a predetermined value so that the control parameter cannot exceed a guard value.

The internal combustion engine is provided with an air/fuel ratio feedback control means for controlling an air/fuel ratio by feedback control, and the idling engine speed is controlled by the first idling engine speed control means when the air/fuel ratio feedback control means is operated.

The idling engine speed is controlled by the first idling engine speed control means when the engine temperature is higher than a predetermined value.

The idling engine speed is controlled by the first idling engine speed control means when the lapse of time after the start of the engine is more than a predetermined value.

The burning state judgment means judges a burning state from a change in the engine speed with respect to a change in the quantity of suction air of feedback control conducted by the first engine speed control means.

According to another aspect of the present invention, in order to control the engine speed so that it can reach the target even when a load given to the engine is fluctuating, the first engine speed control means conducts feedback-control so that the engine speed in the idling steady state can be a target value when it is judged to be a good burning state, and the second engine speed control means continues feedback-control so that the engine speed can be an after-load-change engine speed target value, which has been previously set, when a load is changed in the process of executing engine speed control by the second engine speed control means.

In this case, for example, the after-load-change engine speed target value is the same as the before-load-change engine speed target value.

Alternatively, the after-load-change engine speed target value is different from the before-load-change engine speed target value.

Alternatively, an engine speed control unit of an internal combustion engine further comprises a load change detection means, wherein the after-load-change engine speed target value is determined by a change in the load.

Alternatively, the after-load-change control reference value corresponding to the after-load change engine speed target value is set, and the second engine speed control means conducts feedback control on the basis of the after-load-change control reference value.

Alternatively, an engine speed control unit of an internal combustion engine further comprises a load change detection means, wherein the after-load-change control reference value is determined by a change in the load.

Alternatively, the second engine speed control means conducts feedback control on the idling engine speed by one of the control parameters of the ignition timing and the quantity of fuel injection before a change in the load, and the second engine speed control means conducts feedback control on the engine speed by the same control parameter as that of before a change in the load even after a change in the load.

According to another aspect of the present invention, in order to remove the influence of a change with time and a difference in individual products on the feedback control of the engine speed, an engine speed control unit of an internal combustion engine according to claim 1, further comprises: a parameter reference value learning means for renewing and storing a parameter reference value according to a state of operation; a parameter correction value calculating means for calculating a parameter correction value necessary for making the engine speed close to a target value; and a parameter control means for controlling a parameter so as to provide a parameter execution value in which the parameter correction value is added to the parameter reference value, wherein the parameter reference value learning means renews a parameter reference value so that the parameter correction value can be reduced in the case where the parameter correction value exceeds a predetermined range, and the engine speed of the internal combustion engine is controlled so that it can reach a target value by feedback control of the control parameter selected according to the state of burning.

In this case, for example, the parameter reference value learning means stores a parameter reference value according to at least one of the engine temperature, the shift position of a transmission connected with the engine and the state of operation of the accessories.

Alternatively, a quantity of suction air is selected as a control parameter in the case of a good burning state.

Alternatively, ignition timing or a quantity of fuel injection is selected as a control parameter in the case of a bad burning state.

BRIEF DESCRIPTION OF THE DRAWINGS

FIG. 1 is a flow chart of control conducted in the first embodiment.

FIG. 2(A) is a view for explaining a burning state judgment in the case of a bad burning state in control conducted in the first embodiment.

FIG. 2(B) is a view for explaining a burning state judgment in the case of a good burning state in control conducted in the first embodiment.

FIG. 4(A) is a view for explaining a burning state judgment in the case of a bad burning state in control conducted in the first variation of the first embodiment.

FIG. 4(B) is a view for explaining a burning state judgment in the case of a good burning state in control conducted in the first variation of the first embodiment.

FIG. 5 is a flow chart of control conducted in the second variation of the first embodiment.

FIG. 6(A) is a view for explaining a burning state judgment in the case of a bad burning state in control conducted in the second variation of the first embodiment.

FIG. 6(B) is a view for explaining a burning state judgment in the case of a good burning state in control conducted in the second variation of the first embodiment.

FIG. 21 is a map used for the ignition timing feedback control in the fifth embodiment.

FIG. 22 is a map used for the fuel injection quantity feedback control in the first variation of the fifth embodiment.

FIG. 23 is a map used for the fuel injection timing control in the second variation of the fifth embodiment.

FIG. 24 is a view for explaining a burning state judgment in the suction air quantity feedback control of each embodiment.

FIG. 37 is a map of dTHA in control conducted in the fifteenth embodiment.

FIG. 38 is a map of dIA in control conducted in the sixteenth embodiment.

FIG. 39 is a map of dTAU in control conducted in the seventeenth embodiment.

FIG. 40 is a map of initial values of GTHA in control conducted in the fifteenth embodiment.

FIG. 41 is a map of initial values of GIA in control conducted in the sixteenth embodiment.

FIG. 42 is a map of initial values of GTAU in control conducted in the seventeenth embodiment.

THE MOST PREFERRED EMBODIMENT

Referring to the accompanying drawings, embodiments of the present invention will be explained below.

Figure 43:
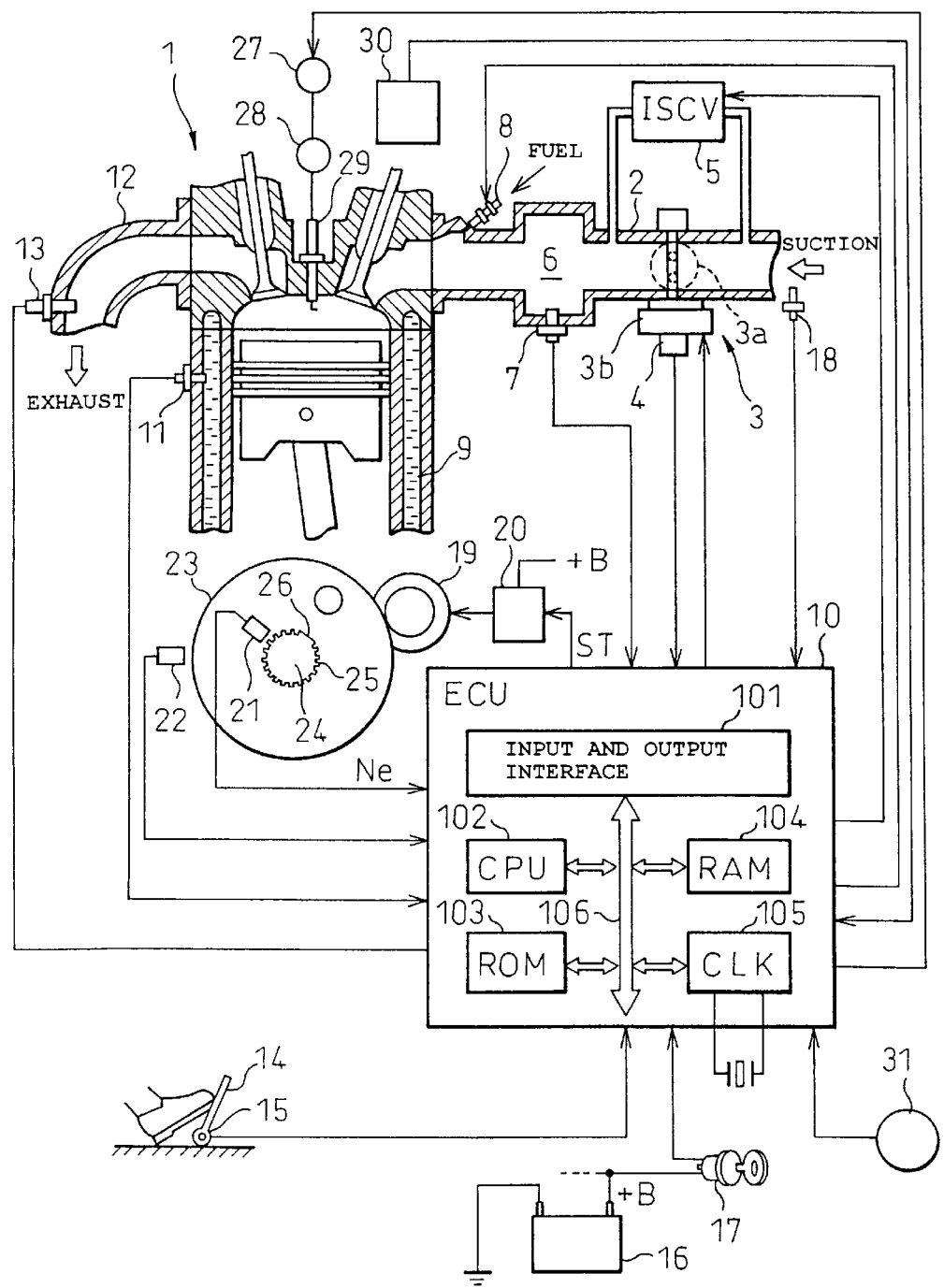
FIG. 43 is a view showing the structure of hardware common among the embodiments of the present invention.

FIG. 43 is a schematic illustration showing the structure of hardware that is common among the embodiments described later. As shown in FIG. 43, there is provided an electronic control throttle 3, which is located on the downstream side of an air cleaner not shown in the drawing, in the suction passage 2 of the internal combustion engine 1. In this electronic control throttle 3, the throttle valve 3a is opened and closed by the throttle motor 3b. When a command of the degree of opening is inputted from ECU (engine control unit) 10 into the electronic control throttle 3, the throttle motor 3b responds to this command and makes the throttle valve 3a follow the degree of opening of the command.

The throttle valve 3a is controlled from the fully closed state, which is shown by a solid line, to the fully opened state which is shown by a broken line. The degree of opening is detected by the throttle opening degree sensor 4. This degree of opening directed by the command is determined by an operating signal of the accelerator pedal (accelerator pedal opening degree signal) which is sent from the accelerator opening degree sensor 15, which is attached to the accelerator pedal 14, for detecting a quantity of operation of the accelerator pedal.

In this connection, it is thoroughly possible to control a quantity of suction air by this electronic throttle valve 3 in the process of idling. However, it is also possible to control a quantity of suction air by the idling speed control valve (ISCV) 5 which is arranged bypassing the throttle valve 3a as shown in the drawing.

On the upstream side of the throttle valve 3 in the suction air passage 2, there is provided an atmospheric pressure sensor 18. On the downstream side of the throttle valve 3 in the suction air passage 2, there is provided a surge tank 6. In this surge tank 6, there is provided a pressure sensor 7 for detecting pressure of suction air. On the downstream side of surge tank 6, there is provided a fuel injection valve 8 for supplying pressured fuel from the fuel supply system to the suction air port of each cylinder. Ignition is conducted at the ignition plug 29 by the ignition coil 28 according to a signal sent from ECU 10 to the igniter 27.

In the coolant passage 9 in the cylinder block of the internal combustion engine 1, there is provided a coolant temperature sensor 11 for detecting the coolant temperature. The coolant temperature sensor 11 generates an electric signal, as an analog voltage, corresponding to the coolant temperature. In the exhaust gas passage 12, there is provided a three way catalytic converter (not shown) which simultaneously purifies the three harmful components, HC, CO and NOx, contained in an exhaust gas. In the exhaust gas passage 12 on the upstream side of this catalytic converter, there is provided an $O_2$ sensor 13 which is one of the air/fuel ratio sensors. This $O_2$ sensor 13 generates an electric signal corresponding to the concentration of the oxygen component contained in exhaust gas. The signal generated by each sensor is inputted into ECU 10.

Further, the following signals are inputted into this ECU 10. They are: a key position signal (accessory position, ON-position and starter position) sent from the ignition switch 17 connected with the battery 16; a top dead centre signal TDC sent from the crank position sensor 21 arranged close to the timing rotor 24 which is integrated with the crank shaft timing pulley attached to one end of the crank shaft; a crank angle signal CA sent from the crank position sensor 21 at each predetermined angle; a reference position signal sent from the cam position sensor 30; and a lubricant temperature sent from the lubricant temperature sensor 22. The ring gear 23 attached to the other end of the crank shaft is rotated by the starter 19 when the internal combustion engine 1 is set into motion.

When the internal combustion engine 1 starts operating, ECU 10 is powered and the program is started, and an output signal sent from each sensor is accepted by ECU 10. Therefore, ECU 10 controls the throttle motor 3b for opening and closing the throttle valve 3a, and also ECU 10 controls the ISCV 5, fuel injection valve 8, igniter 27 and other actuators. Therefore, ECU 10 includes: an A/D converter for converting an analog signal, which is sent from each sensor, into a digital signal; an input and output interface 101 into which an input signal is inputted from each sensor and from which an output signal for driving each actuator is, outputted; CPU 102 for conducting calculation; memories such as ROM 103 and RAM 104; and a clock 105. They are connected with each other by the bus 106.

In this case, explanations will be made into detection of the engine speed ne and discrimination of cylinders.

In the timing rotor 24, there are provided signal teeth 25 at each 10° CA. In order to detect the top dead centre, there is provided a no-tooth portion 26 in which two teeth are not arranged. Therefore, the number of the signal teeth is 34 in the signal teeth 25. The crank position sensor 21 is composed of an electromagnetic pickup and outputs a crank rotation signal at each rotation angle 10°. The engine speed Ne can be obtained by measuring an interval (time) of these crank angle signals.

On the other hand, the cam position sensor 30 is attached to the cam shaft which is rotated by one revolution for two revolutions of the crank shaft 2. For example, a reference signal is generated by the cam position sensor 30 at the top dead centre of compression of the first cylinder. In the first embodiment described later, a cylinder in a bad burning state is discriminated by measuring the lapse time which has lapsed from the reference signal sent from the cam position sensor 30.

Control of each embodiment of the present invention, the structure of hardware of which is composed as described above, will be explained below.

In this case, the first to the fourth embodiments will be explained as the first group.

The fifth to the eighth embodiments will be explained as the second group.

The ninth to the fourteenth embodiments will be explained as the third group.

The fifteenth to the eighteenth embodiments will be explained as the fourth group.

Embodiments in the First Group

First, embodiments in the first group will be explained below. In each embodiment in the first group, there is provided an engine speed control unit for controlling the engine speed so that it can reach the target value without further deteriorating a bad burning state after the internal combustion engine has been set into motion in a period of time from the completion of explosion to the idling steady state.

In each embodiment in the first group, the burning state is judged by whether or not the engine speed is changing according to the target. In the case where the engine speed is not changing according to the target, it is judged that the burning state is bad. Therefore, control except for control of a quantity of suction air is conducted so that the engine speed can be changed according to the target.

First, as an index to be controlled as a target index, consideration is given to the following three indexes to be controlled.

(1) Peak engine speed after the start of the engine
(2) Rate, of change in the engine speed after the start of the engine
(3) Average of the rate of increase in the engine speed after the start of the engine First, as a control parameter for controlling the index to be controlled so that it can reach the target in the case of a bad burning state, consideration is given to the following three indexes.

(a) Ignition timing
(b) Quantity of fuel injection
(c) Fuel injection timing

The following are successively explained.
First Embodiment:
Index to be controlled (1)+Control parameter (a)
Its First Variation:
Index to be controlled (2)+Control parameter (a)
Its Second Variation:
Index to be controlled (3)+Control parameter (a)

Second Embodiment:
Index to be controlled (1)+Control parameter (b)
Third Embodiment:
Index to be controlled (1)+Control parameter (c)
Fourth Embodiment
Index to be controlled (2)+Control parameter (a)+ Cylinder discrimination The above embodiments are successively explained below.

First Embodiment

In the first embodiment, the operation is conducted as follows. The peak engine speed in a predetermined period after the start of the engine is learned (stored or renewed). When a ratio of this learning value to the target value, which is previously determined according to the engine temperature and stored in ECU 10, is out of the range of the target, it is judged that a bad burning state has occurred. The value of ignition timing (command value) of the present time is corrected so that this ratio can be in the range of the target after the next start of the engine, and thus a corrected value is used as the value of the next time. Concerning the quantity of suction air (command value), the value of the present time is also used as the value of the next time, as it is.

In this case, the value of the ignition timing of the next time is found in such a manner that the ignition timing of the present time is multiplied by the ratio of the learning value of the peak engine speed to the target value.

FIG. 1 is a flow chart of control conducted in the first embodiment. In step 1001, it is judged whether or not it is in an idling state. This judgment is conducted by a signal sent from the throttle opening degree sensor 4 or the accelerator opening degree sensor 15. In step 1002, it is judged whether or not it is in a predetermined period of time from the start of the engine. This judgment is conducted by a timer which is started simultaneously with the start of the engine when it is not true in steps 1001 and 1002, the program proceeds to step 1010 and returns. When it is true in both steps 1001 and 1002, the program proceeds to step 1003, and the after-start peak engine speed actual value "gnepk" of the present time is calculated. In step 1004, the after-start peak engine speed target "tnepk", which has been set according to the engine temperature, is read in from the map. In step 1005, the ratio "rnepk"="tnepk/gnepk" of the after-start peak engine speed actual value "gnepk" found in step 1003 to the after-start peak engine speed target value "tnepk" found in step 1004 is found.

Further in step 1006, it is judged whether or not the ratio "rnepk"="tnepk"/"gnepk" of the after-start peak engine speed actual value "gnepk" to the after-start peak engine speed target "tnepk" is in the target range (KRNEPK2 to KRNEPK1). If it is true, it can be considered that the burning state is good. Therefore, the program proceeds to step 1010 and returns.

On the other hand, when it is not true in step 1006, it can be considered that the burning state is bad. Therefore, the program proceeds to step 1007, and the flag "xnedwn" showing a bad burning state is set at ON.

In step 1008, the value (command value) of the next time of a quantity of suction air is set at the value of the present time, that is, the quantity of suction air is not changed. In step 1009, the value of the next time of ignition timing is found when the present time value of ignition timing is multiplied by the ratio "rnepk"="tnepk"/"gnepk", and the program proceeds to step 1010 and returns.

FIGS. 2(A) and 2(B) are views for explaining a judgment of the burning state of the first embodiment. FIG. 2(A) is a view showing a case in which the after-start peak engine speed actual value "gnepk" is much lower than the after-start peak engine speed target value "tnepk" due to a bad burning state, and the ratio "rnepk"="tnepk"/"gnepk" is higher than the upper limit KRNEPK2 of the target range. On the other hand, FIG. 2(B) is a view showing a case in which the burning state is good and the after-start peak engine speed actual value "gnepk" is approximately the same as the after-start peak engine speed target value "tnepk", and the ratio "rnepk"="tnepk"/"gnepk" is in the target range.

In the first variation of the first embodiment, when bad burning occurs after the start of the engine of the present time, the quantity of suction air of the next start of the engine is made to be the same as that of the quantity of suction air of the present start of the engine as described above. Instead of that, the ignition timing is changed. As a result, after the start of the engine of the next time, deterioration of the burning state, which is caused by a change in the quantity of suction air, does not occur. As a result of the change in the ignition timing, the ratio "rnepk"="tnepk"/"gnepk" of the after-start peak engine speed actual value "gnepk" to the after-start peak engine speed target value "tnepk" can be in the target range.

First Variation of the First Embodiment

The first variation of the first embodiment is operated as follows. Each rate of change of the engine speed in each minute period in a predetermined period after the start of the engine is detected. When a thus detected value is out of a predetermined target range, it is judged that a bad burning state has occurred, and the value of the present time of ignition timing (command) is corrected so that each rate of change of the engine speed in each minute period in a predetermined period after the start of the engine can be in the target range, and the thus corrected value is set as the value of the next time. The quantity of suction air (command value) of the present time is used for the next time, as it is.

However, the ignition timing of the next time is found by adding a predetermined correction value to the ignition timing of the present time.

Figure 3:
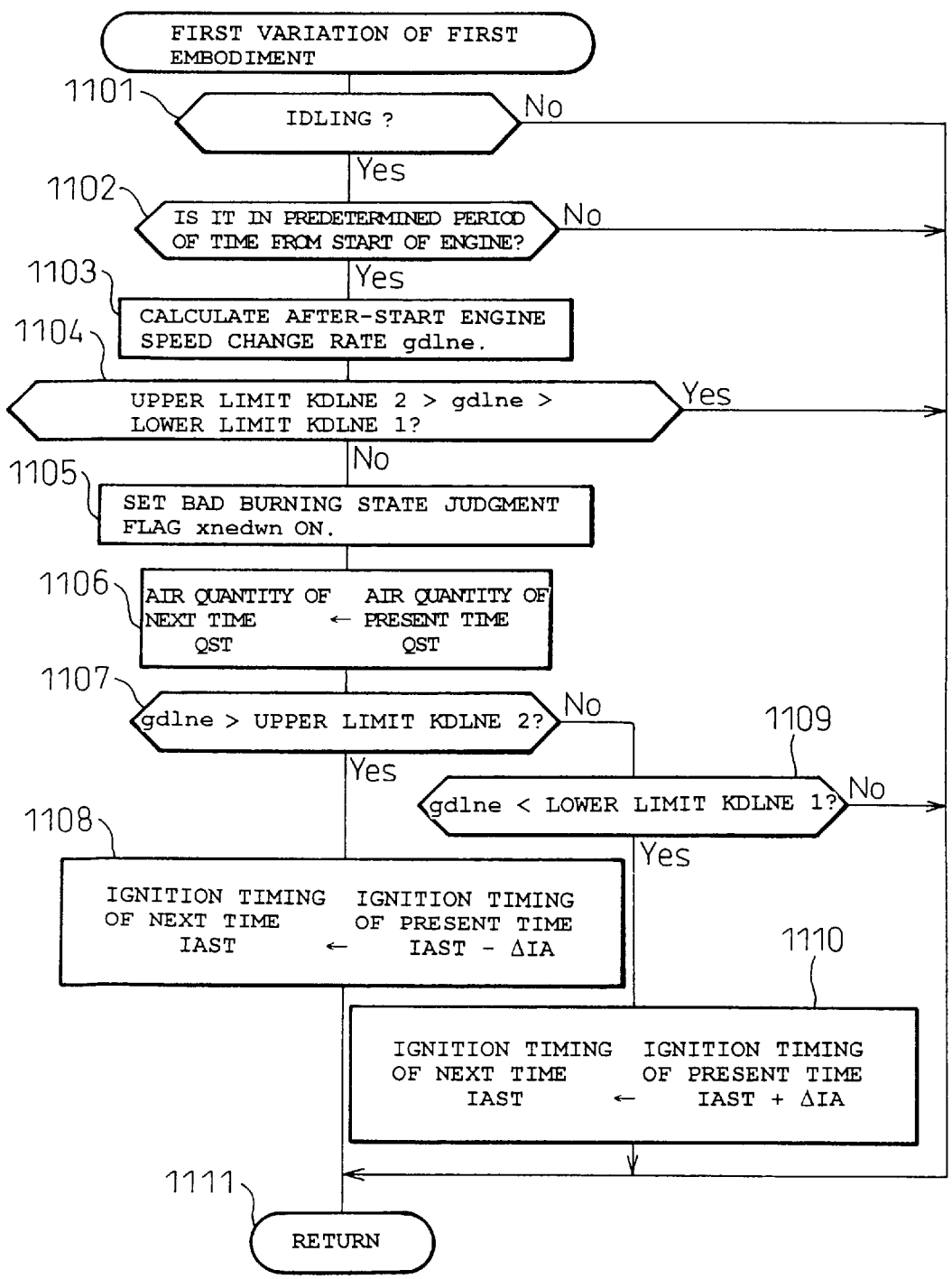
FIG. 3 is a flow chart of control conducted in the first variation of the first embodiment.

FIG. 3 is a flow chart in which control of the first variation of the first embodiment is conducted. Since the steps 1101 and 1102 are the same as those of the first embodiment, the explanations will be omitted here.

In step 1103, the rate of change "gdlne" of the engine speed in each minute period is calculated. In step 1104, it is judged whether or not the rate of change "gdlne" of the engine speed in each minute period, which has been calculated in step 1103, is in the target range (KDLNE2 to KDLNE1). If it is true, the burning state can be considered to be good. Therefore, the program proceeds to step 1111 as it is and returns.

On the other hand, if it is not true in step 1104, the burning state can be considered to be bad. Therefore, program proceeds to step 1105, and the flag "xnedwn", which expresses a bad burning state, is set at ON.

In step 1106, the quantity of suction air of the next time is made to be the same as the value of the present time, that is, a change in the quantity of suction air is prohibited.

In step 1107, it is judged whether or not the rate of change "gdlne" of the engine speed exceeds an upper limit. If it is true, that is, if the rate of change "gdlne" of the engine speed exceeds an upper limit, the after-start engine speed change rate "gdlne" of the present time is suddenly increased exceeding the upper limit KDLNE2 of the target value. Therefore, in step 1108, the correction value ΔIA is subtracted from the ignition timing IAST of the present time, so that the spark timing is delayed so as to decrease the engine speed. Then, the program proceeds to step 1111 and returns.

On the other hand, when it is not true in step 1107, the program proceeds to step 1109, and it is judged whether or not the rate of change "gdlne" of the engine speed is lower than the lower limit KDLNE1 in the target range. It is true in step 1109 when the after-start engine speed change rate "gdlne" of the present time is lower than the lower limit KDLNE1 of the target range and the engine speed is quickly decreased. Therefore, in step 1110, the correction ΔIA is added to the ignition timing IAST of the present time so that the spark timing can be advanced so as to increase the engine speed. Then, the program proceeds to step 1111 and returns. In this connection, it is essentially could not be occurred to deny in step 1109. Therefore, the program proceeds to step 1111 as it is and returns.

FIGS. 4(A) and 4(B) are views for explaining a judgment of the burning state of the first variation of the first embodiment described above. FIG. 4(A) shows a case in which the after-start engine speed decreases due to bad burning, so that the engine speed change rate "gdlne" becomes lower than the lower limit KDLNE1 of the target range. On the other hand, FIG. 4(B) shows a case in which the burning state is good and the engine speed change rate "gdlne" is in the target range.

As described above, in the first variation of the first embodiment, an operation is conducted as follows. In the case where bad burning occurs after the start of the engine of the present time, the quantity of suction air of the start of the engine of the next time is made to be the same as that of the present time. Instead of that, the ignition timing of the next time is changed. As a result, after the start of the engine of the next time, no deterioration is caused in the burning state by the change in the quantity of suction air, and the engine speed change rate "gdlne" in a minute period can be in the target range by the effect of changing the ignition timing.

In this connection, in the case of the first embodiment in which the peak engine speed is made to be the index to be controlled, it is possible to conduct an operation like the first variation in such a manner that the correction ΔIA is added to or subtracted from the ignition timing IAST of the present time so that it can be the ignition timing IAST of the next time.

Second Variation of the First Embodiment

Operation of the second variation of the first embodiment is conducted as follows. An average value of the engine speed change rate of in the minute period in the predetermined period after the start of the engine is learned (stored and renewed). In the case where a ratio of this learning value to the target value (stored in ECU 10), which is previously determined corresponding to the engine temperature, is out of the predetermined target range, it is judged that a bad burning state has occurred. Therefore, the ignition timing (command) of the present time is corrected so that this ratio can be in the target range in the next time. The thus obtained ignition timing is set to be the value of the next time. The quantity of suction air (command) of the present time is used for the value of the next time as it is.

FIG. 5 is a flow chart used for controlling the second embodiment. Steps 1201 to 1203 in the second embodiment are the same as steps 1101 to 1103 of the first variation. Therefore, the explanations will be omitted here.

In step 1204, the after-start engine speed change rate mean actual value "gdlnesm" is calculated. In this case, the after-start engine speed change rate mean actual value "gdlnesm" is obtained when the engine speed change rates in the minute periods in the predetermined periods are averaged. In this case, the average is not limited to a simple mean but may also be a weighted mean by which an appropriate judgment can be made.

Next, in step 1205, the after-start engine speed change rate average target value "tdlnesm" is read in from the map. In step 1206, the ratio "rdlnesm"="tdlnesm"/"gdlnesm" of the after-start engine speed change rate average actual value "gdlnesm" to the after-start engine speed change rate average target value "tdlnesm" is calculated.

In step 1207, it is judged whether or not the ratio "rdlnesm" found in step 1206 is in the target range (KRDLNESM2 to KRDLNESM1). When it is not true in step 1207, the program proceeds to step 1211 and returns. When it is true, it means that the after-start engine speed change rate mean actual value "gdlnesm" is greatly different from the after-start engine speed change rate average target value "tdlnesm" and burning is in a bad state. Therefore, the flag "xnedwn" showing the occurrence of bad burning is set at ON in step, 1208. In step. 1209, the quantity of suction air of the next time (command) is set at the quantity of suction air of the present time as it is. In step 1210, the ignition timing of the next time is set at a value obtained when the value of the present time is multiplied by the ratio "rdlnesm"="tdlnesm"/"gdlnesm" described before. Then, the program process to step 1211 and returns.

In this connection, the engine speed change rate "gdlne" is calculated in the same minute period as that of the first variation of the first embodiment. However, it is possible to make the period longer so far the judgment is not affected by the roughness of the period.

FIGS. 6(A) and 6(B) are views for explaining a judgment of the burning state of the second variation of the first embodiment. FIG. 6(A) shows a case in which the after-start engine speed decreases due to bad burning. As a result, FIG. 6(A) shows that the engine speed is decreased due to bad burning and the ratio "rdlnesm"="tdlnesm"/"gdlnesm" of the after-start engine speed change rate average actual value "gdlnesm" of the next time to the after-start engine speed change rate average target value "tdlnesm" exceeds the upper limit KRDLNESM2 of the target range. On the other hand, FIG. 6(B) shows that the burning state is good and the ratio "rdlnesm"="tdlnesm"/"gdlnesm" is in the target range.

As described above, in the second variation of the first embodiment, the operation is conducted as follows. In the case where bad burning occurs after the start of the engine of the present time, the quantity of suction air of the start of the engine of the next time is made to be the same as that of the present time. Instead of that, the ignition timing of the next time is changed. As a result, after the start of the engine of the next time, no deterioration is caused in the burning state by the change in the quantity of suction air. By the effect of the change in the ignition timing, the ratio "rdlnesm"="tdlnesm"/"gdlnesm" of the after-start engine speed change rate average actual value "gdlnesm" to the after-start engine speed change rate average target value "tdlnesm" is put into the target range.

In this connection, concerning the second variation, it is possible to conduct an operation like the first variation in such a manner that the correction ΔIA is added to or subtracted from the ignition timing IAST of the present time so that it can be the ignition timing IAST of the next time.

Second Embodiment

In the second embodiment, the operation is conducted as follows. The peak engine speed in a predetermined period after the start of the engine is learned (stored and renewed). When a ratio of this learning value to the target value (stored in ECU 10), which has been previously determined corresponding to the engine temperature, is out of the target range which has been previously determined, it is judged that the burning state is bad. Therefore, the quantity of fuel injection (command) of the present time is corrected and made to be the value of the next time so that the ratio can be in the target range after the start of the engine in the next time. The quantity of suction air (command) of the present time is used for the quantity of suction air of the next time as it is.

Figure 7:
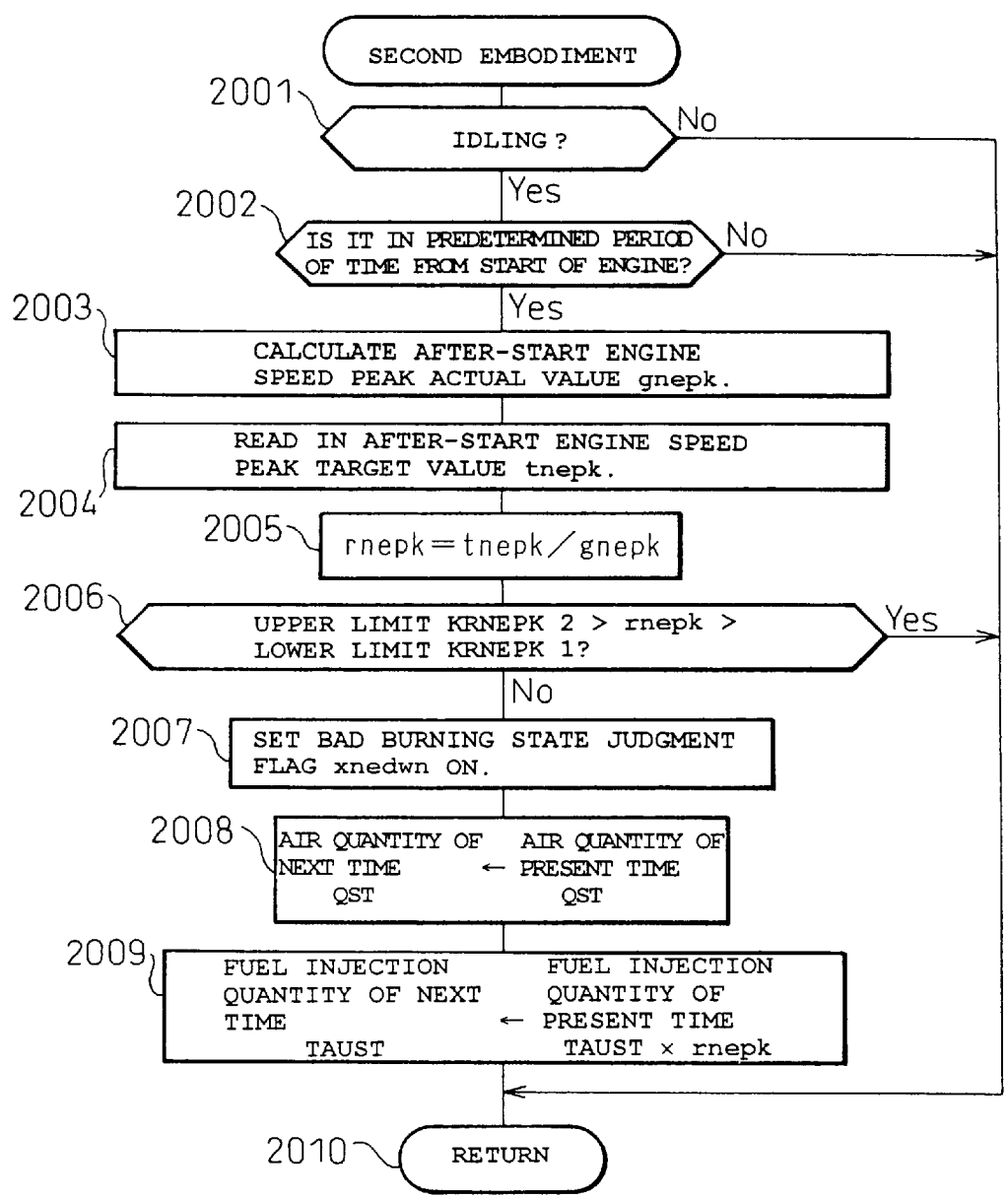
FIG. 7 is a flow chart of control conducted in the second embodiment.

FIG. 7 is a flow chart for conducting control of the second embodiment. Steps 2001 to 2008 and step 2010 of this flow chart are the same as steps 1001 to 1008 and step 1010 in the first embodiment. However, only step 2009 is different, that is, the quantity of fuel injection is changed, instead of the injection timing, in step 2009. In step 2009, the quantity of fuel injection (command) TAUST of the next time is determined in such a manner that the value TAUST of the present time is multiplied by the ratio "rnepk"="tnepk"/"gnepk" of the after-start peak engine speed actual value "gnepk" to the after-start peak engine speed target value "tnepk".

In the second embodiment, when bad burning occurs after the start of the engine of the present time, the quantity of suction air of the next start of the engine is made to be the same as that the quantity of suction air of the present start of the engine as described above. Instead of that, ignition timing is changed. As a result, after the start of the engine of the next time, deterioration of the burning state, which is caused by a change in the quantity of suction air, does not occur. As a result of the change in the quantity of fuel injection, the ratio "rnepk"="tnepk"/"gnepk" of the after-start peak engine speed actual value "gnepk" to the after-start peak engine speed target value "tnepk" can be in the target range.

In this connection, in this second embodiment, the quantity of fuel injection (command) TAUST of the next time is determined in such a manner that the value TAUST of the present time is multiplied by the ratio "rnepk"="tnepk"/"gnepk" of the after-start peak engine speed actual value "gnepk" to the after-start peak engine speed target value "tnepk". However, like the first variation of the first embodiment, it is possible to determined the quantity of fuel injection TAUST of the next time in such a manner that the correction ΔTAU is added to or subtracted from the quantity of fuel injection TAUST of the present time corresponding to the value of "tnepk"/"gnepk".

Concerning the index to be controlled, it is Possible to use the after-start engine speed change ratio instead of the peak engine speed as the first variation of the first embodiment, and also it is possible to use the after-start engine speed change ratio mean value as the second variation of the first embodiment.

Third Embodiment>

In the third embodiment, the operation is conducted as follows. The peak engine speed in a predetermined period after the start of the engine is learned (stored and renewed). When a ratio of this learning value to the target value (stored in ECU 10), which has been previously determined corresponding to the engine temperature, is out of the target range which has been previously determined, it is judged that the burning state is bad. Therefore, the quantity of fuel injection (command) of the present time is corrected and made to be the value of the next time so that the ratio can be in the target range after the start of the engine the next time. The quantity of suction air (command) of the present time is used for the quantity of suction air of the next time, as it is.

Figure 8:
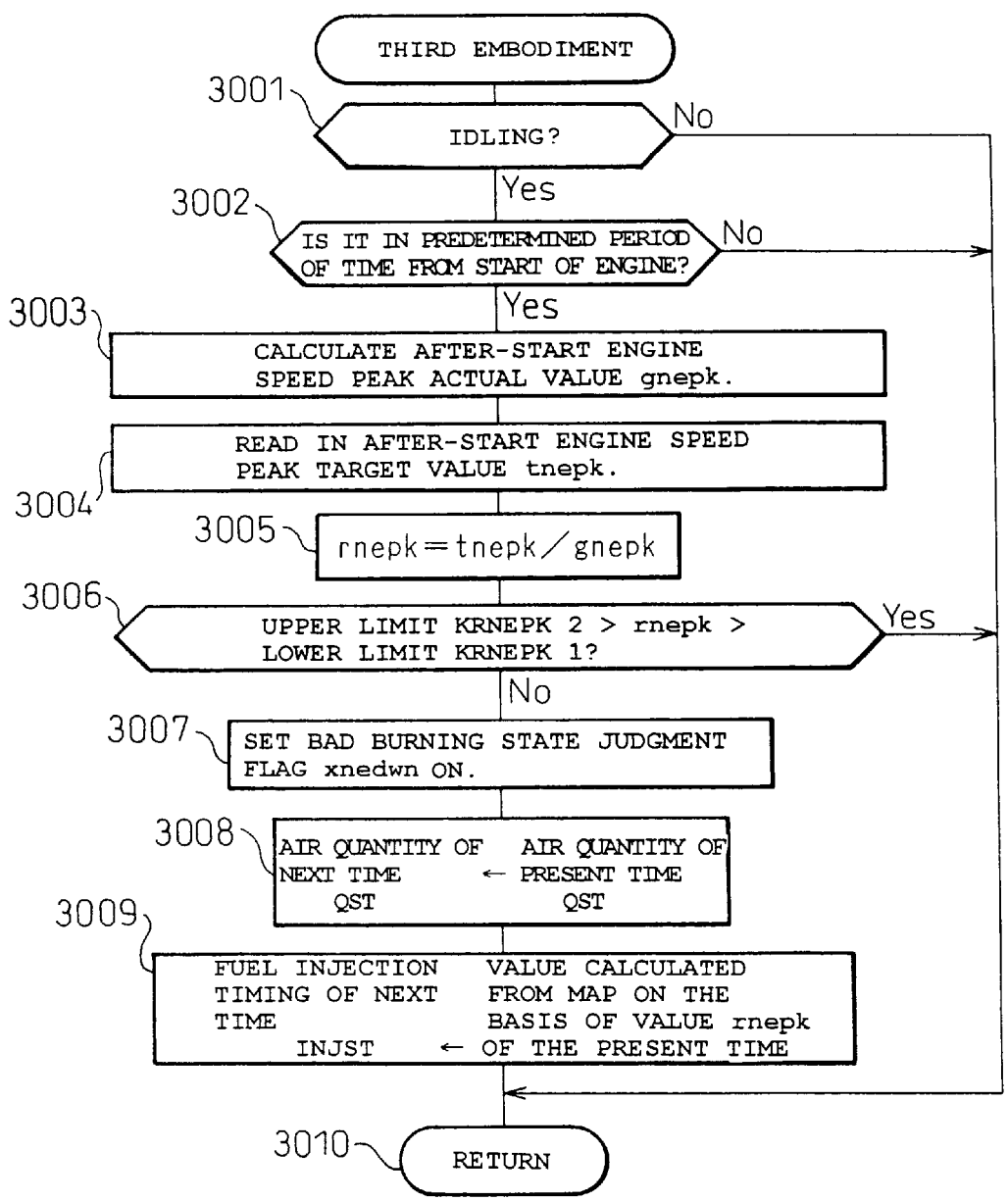
FIG. 8 is a flowchart of control conducted in the third embodiment.

FIG. 8 is a flow chart for conducting control of the third embodiment. Steps 3001 to 3008 and step 3010 of this flow chart are the same as steps 1001 to 1008 and step 1010 in the first embodiment. However, only step 3009 is different, that is, the fuel injection timing is changed instead of the ignition timing. In step 3009, the fuel injection timing of the next time (command) INJST is determined from a map according to the ratio "rnepk" of the after-start engine speed peak actual value "gnepk" to the after-start engine speed peak target value "tnepk".

Figure 9:
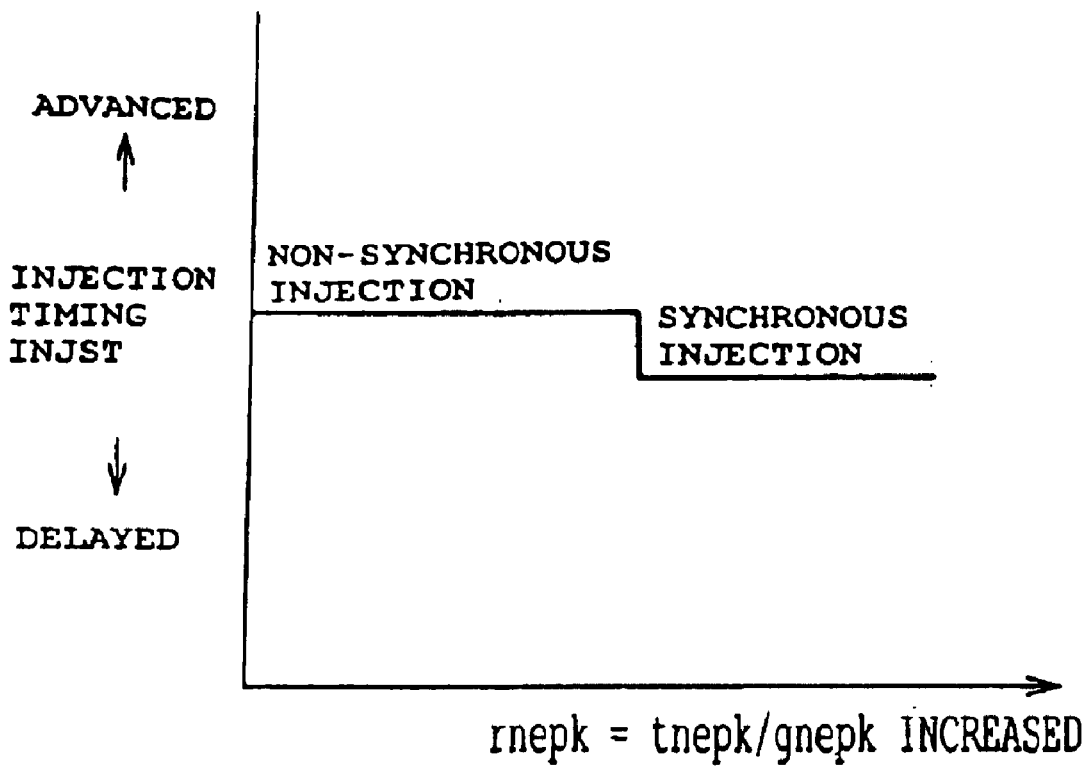
FIG. 9 is a view for explaining a change in injection timing in control of the third embodiment.

FIG. 9 is the map described above. The horizontal axis represents the ratio "rnepk"="tnepk"/"gnepk" of the after-start engine speed peak actual value "gnepk" to the after-start engine speed peak target value "tnepk", and the vertical axis represents INJST, that is, specifically, the vertical axis represents the time of completion of injection. According to the value of "rnepk"="tnepk"/"gnepk", fuel injection can be classified into non-synchronous injection and synchronous injection. In non-synchronous injection, injection is conducted before the suction valve is opened. In synchronous injection, injection is conducted while the suction valve is being opened. When non-synchronous injection is conducted in a cold state of the engine, drips of fuel stay on the reverse side of the suction valve, which could be a cause of bad burning. On the other hand, when synchronous injection is conducted in normal operation of the engine, the atomizing time becomes so short that the burning state is deteriorated.

In the third embodiment, when bad burning occurs after the start of the engine of the present time, the quantity of suction air of the next start of the engine is made to be the same as that the quantity of suction air of the present start of the engine as described above. Instead of that, the fuel injection timing is changed. As a result, after the start of the engine of the next time, deterioration of the burning state, which is caused by a change in the quantity of suction air, does not occur. As a result of the change in fuel injection timing, the ratio "rnepk"="tnepk"/"gnepk" of the after-start peak engine speed actual value "gnepk" to the after-start peak engine speed target value "tnepk" can be in the target range.

Concerning the index to be controlled, it is possible to use the after-start engine speed change ratio instead of the peak engine speed as the first variation of the first embodiment, and also it is possible to use the after-start engine speed change ratio mean value as the second variation of the first embodiment.

Fourth Embodiment

In the fourth embodiment, the operation is conducted as follows. The engine speed change rate in the minute period in the predetermined period after the start of the engine is detected. In the case where thus detected value is out of the target range, it is judged that a bad burning state has been caused. At the same time, a cylinder in which bad burning has occurred is discriminated. The ignition timing (command) of the cylinder, in which bad burning has occurred, of the present time is corrected so as to obtain the ignition timing of the next time so that the engine speed change rate in the minute period in the predetermined period after the start of the engine of the next time can not out of the judgment value, that is, the engine speed change rate in the minute period in the predetermined period after the start of the engine of the next time can exceed the judgment value. Concerning the quantity of suction air (command), the value of the present time is used for the value of the next time as it is.

The reason why the engine speed change rate in the minute period is used for the index to be controlled is that the engine speed change rate in the minute period is appropriate for judging a cylinder compared with the peak engine speed and the engine speed change rate average because the detection interval is short.

Figure 10:
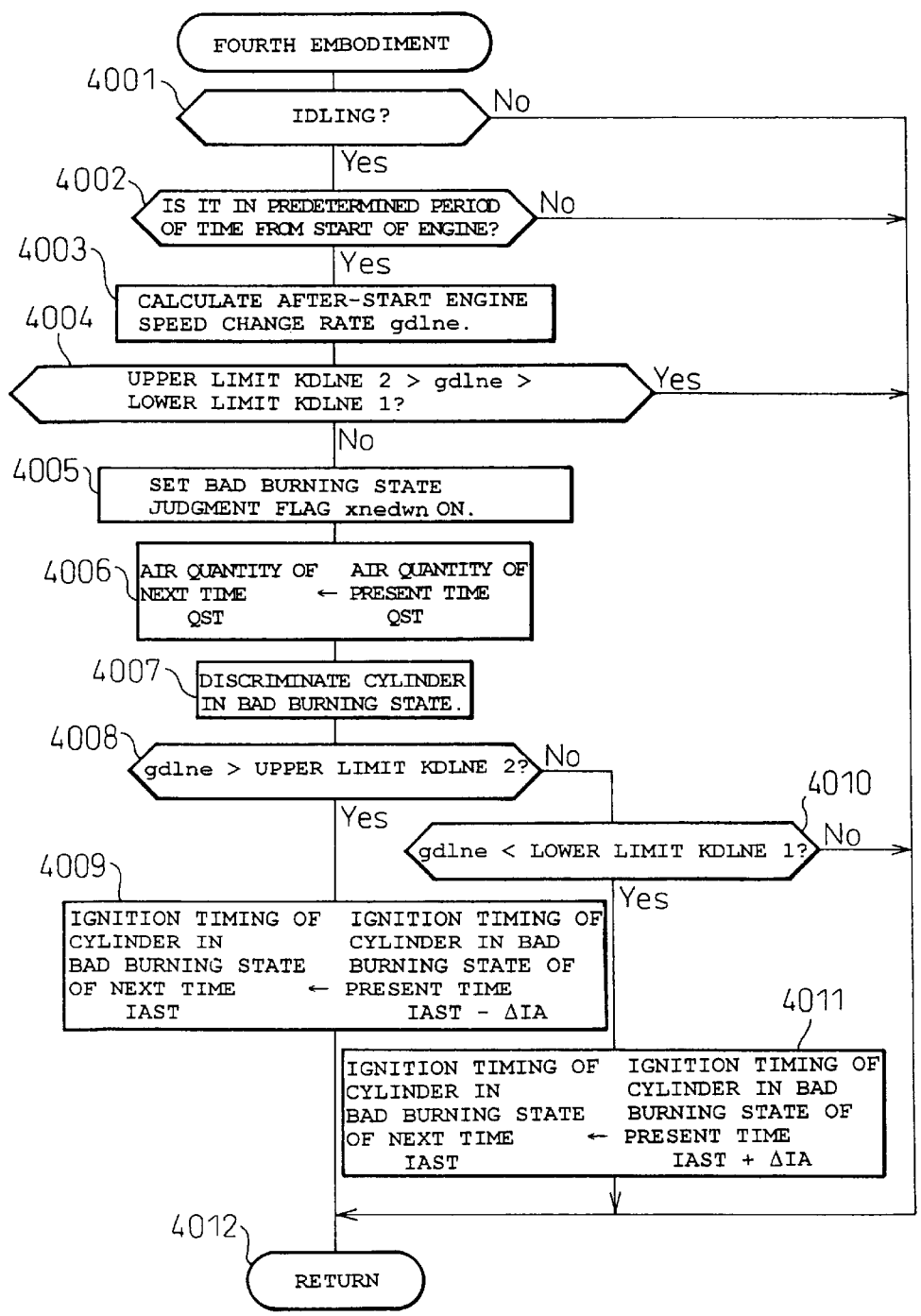
FIG. 10 is a flow chart of control conducted in the fourth embodiment.

FIG. 10 is a flow chart for controlling the fourth embodiment. This flow chart is composed as follows. After step 1106 in the flow chart of the first variation of the first embodiment, a step to discriminate a cylinder is inserted, and the ignition timing of only the cylinder in a bad burning state is corrected in steps 4009 and 4011 corresponding to steps 1108 and 1010 in the flow chart of the first variation of the first embodiment.

As described before, this cylinder discrimination is conducted as follows. Time (angle) from the reference signal generated by the cam position sensor 30 is measured on the basis of the signal generated by the crank position sensor 21.

In the fourth embodiment, as described before, when bad burning occurs after the start of the engine of the present time, the quantity of suction air of the next start of the engine is made to be the same as that the quantity of suction air of the present start of the engine. Instead of that, the ignition timing is changed. As a result, after the start of the engine of the next time, deterioration of the burning state, which is caused by a change in the quantity of suction air, does not occur. As a result of the change in the ignition timing, the engine speed change rate "gdlne" in the minute period can be put into the target range. In this case, a cylinder in a bad burning state is specified, and the ignition timing of only that cylinder is changed, and the ignition timing of other cylinders, the change of ignition timing of which is unnecessary, is not changed. Therefore, it is possible to prevent the deterioration of exhaust gas and drivability caused by taking a redundant countermeasure.

In this connection, concerning the index to be controlled, instead of the ignition timing, it is possible to use the quantity of fuel injection like the second embodiment, and it is also possible to use the fuel injection timing as in the third embodiment. Concerning the method of correction, the value of the present time may be multiplied by a ratio so as to obtain the value of the next time.

Embodiments of the Second Group

Next, the embodiment of the second group will be explained below. This embodiment of the second group is an idling engine speed control unit by which the engine speed in the idling steady state is controlled so that it can reach a target value. In this case, the idling steady state is an idling state from which the engine speed increasing state and the coasting state are excluded.

Therefore, in the idling engine speed control unit of the embodiment of the second group, a bad burning state, which occurs when the idling engine speed is subjected to feedback control of the quantity of suction air, is positively detected and control is changed over so that it can be conducted by another control parameter.

In this connection, in the initial state, the idling engine speed is controlled by the feedback control of the quantity of suction air.

Fifth Embodiment

In this embodiment, when it is judged that a bad burning state has occurred in feedback control of the quantity of suction air to control the idling engine speed, control is changed over to the idling engine speed control conducted by another control parameter. Especially when the burning state is bad although the idling engine speed is subjected to feedback control of the quantity of suction air and feedback control of the air/fuel ratio is not executed, control is changed over to feedback control of the ignition timing.

Figure 11:
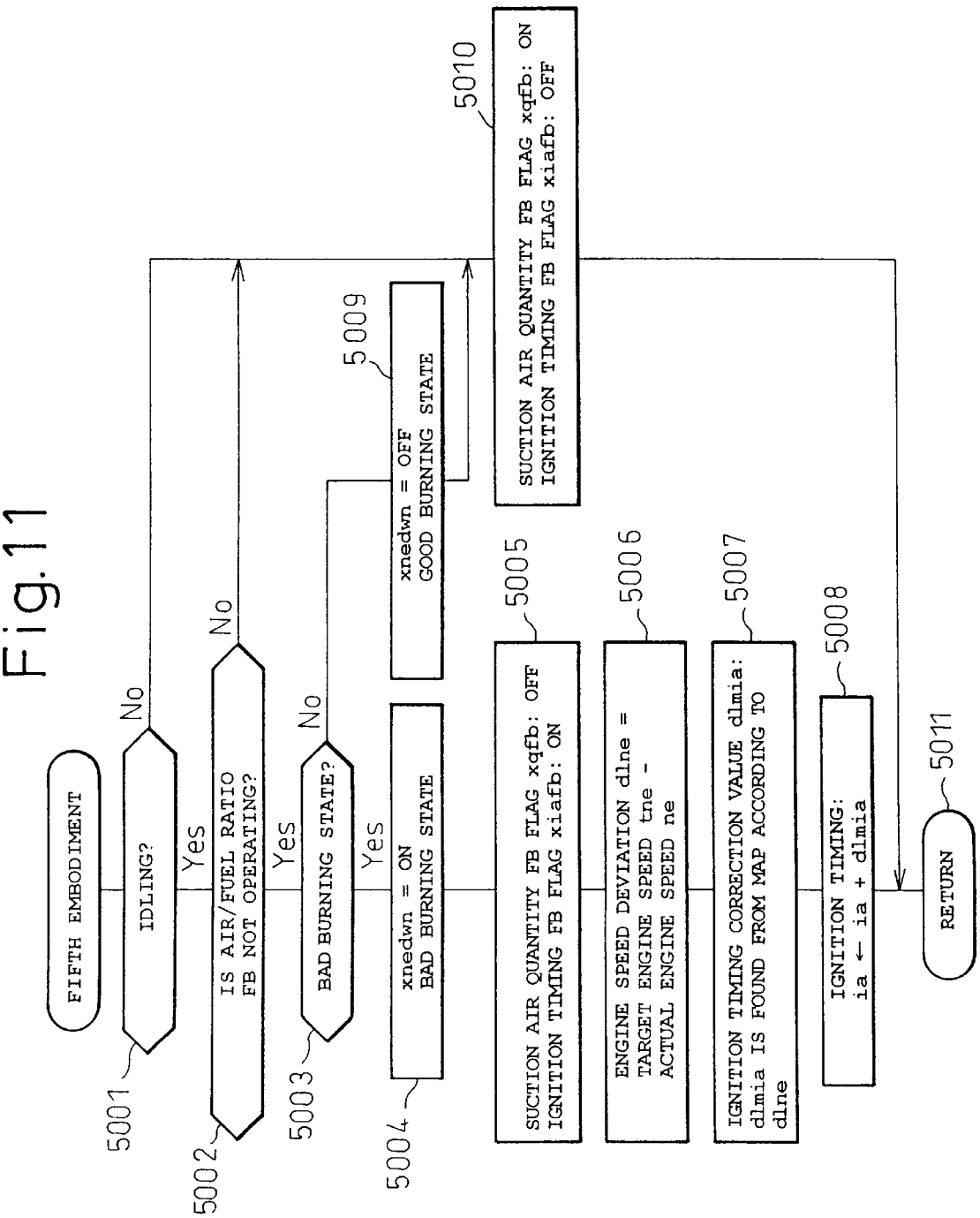
FIG. 11 is a flow chart of control conducted in the fifth embodiment.

FIG. 11 is a flow chart of the fifth embodiment. In step 5001, it is judged whether or not it is in an idling state. This judgment is conducted by the signal of the throttle opening degree sensor 4 or the accelerator opening degree sensor 15 and by the signal of the vehicle speed sensor 31. In step 5002, it is judged whether or not feedback control of the air/fuel ratio of the engine 1 is executed.

When it is not true in steps 5001 and 5002, the program proceeds to step 5010. When it is true in both steps 5001 and 5002, the program proceeds to step 5003, and it is judged whether or not the burning state is bad.

This judgment to judge whether or not the burning state is bad is conducted by what is the most appropriate for the idling speed control method executed at that time. For example, since feedback control of the quantity of suction air is executed at first, it is judged by whether or not a change in the engine speed with respect to the change in the throttle opening degree in feedback control of the quantity of suction air is in a predetermined region. FIG. 24 is a view to explain this judgment.

When it is true in step 5003 that the burning state is bad, the program proceeds to step 5004, and the bad burning state flag "xnedwn" is set ON and the program proceeds to step 5005. On the other hand, when it is not true in step 5003, the program proceeds to step 5009, and the bad burning state flag "xnedwn" is set OFF and the program proceeds to step 5010.

In step 5005, the suction air quantity feedback control execution flag "xqfb" is set OFF, and the ignition timing feedback control flag. "xiafb" is set ON. In step 5006, engine speed deviation "dlne" between the target engine speed "tne" and the actual engine speed "ne" is found. In step 5007, the ignition timing correction "dlmia" corresponding to engine speed deviation "dlne" is found from the map in FIG. 21. In step. 5008, the ignition timing correction "dlmia" calculated in step 5007 is added to the ignition timing "ia" of the present time so that the ignition timing "ia" of the next time is calculated. Then, the program proceeds to step 5011 and returns. On the other hand, when the program proceeds to step 5010, the suction air quantity feedback control execution flag "xqfb" is set at "ON" in step 5010, and the ignition timing feedback control flag "xiafb" is set at OFF. Then, the program proceeds to step 5011 and returns.

Since the first embodiment operates as described above, if the burning state is bad in suction air quantity feedback control, ignition timing feedback control is conducted.

In this connection, in the case where the program returns via step 5008, it is in the state of ignition timing feedback control. Therefore, the judgment to judge whether or not the burning state is bad, which is conducted in step 5003, is conducted by a method appropriate for this ignition timing feedback control. The method can be the same as that of the judgment conducted in suction air quantity feedback control, that is, it can be judged by whether or not engine speed fluctuation "dlne" with respect to ignition timing fluctuation "dlia" in ignition timing feedback control is in a predetermined region. Also, it is possible to judge by whether or, not engine speed deviation "dlne" is larger than the predetermined judgment value KDLNEA.

As described above, the judgment to judge whether or not the burning state is bad in step 5003, conducted after the program has returned, is conducted by a method appropriate for the control method executed at that time, which is the same in each embodiment described later.

First Variation of the Fifth Embodiment

In this variation, the operation is conducted as follows. When the idling engine speed is subjected to suction air quantity feedback control and the burning state is bad and when air/fuel ratio feedback control is not executed, control is changed over to fuel injection quantity feedback control.

Figure 12:
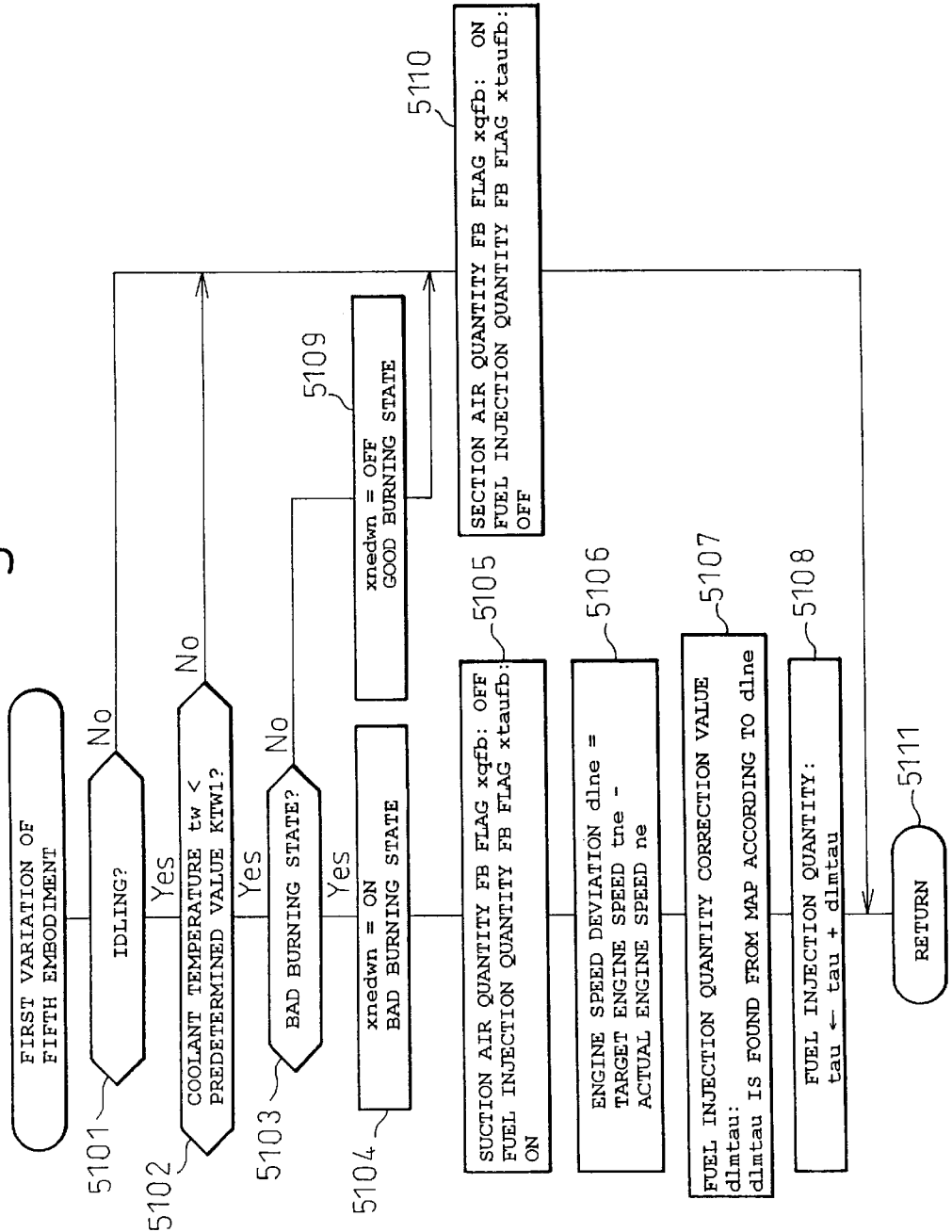
FIG. 12 is a flow chart of control conducted in the first variation of the fifth embodiment.

FIG. 12 is a flow chart of the first variation of the fifth embodiment. Step 5101 is the same as step 5001 in the fifth embodiment.

In step 5102, whether or not the engine temperature is lower than the predetermined temperature, that is, whether or not the engine is in an idling state is judged by whether or not the coolant temperature "tw" detected by the coolant temperature sensor 11 is lower than the predetermined value KTW1. When it is not true in steps 5101 and 5102, the program proceeds to step 5110. Only when it is true in both steps 5101 and 51Q2, does the program proceed to step 5103.

Steps 5103, 5104 and 5109 are the same as steps 5003, 5004 and 5009 in the first embodiment. Therefore, the explanations of those steps are omitted here.

In step 5105, the suction air quantity feedback control execution flag "xqfb" is set OFF, and the fuel injection quantity feedback control flag "xtaufb" is set ON. In steps 5106, 5107, the fuel injection quantity correction "dlmtau" corresponding to engine speed deviation "dlne" is found from the map in FIG. 22. In step 5108, the fuel injection quantity correction "dlmtau" calculated in step 5107 is added to the fuel injection quantity "tau" of the present time, so that the fuel injection quantity "tau" of the next time is calculated. Then, the program proceeds to step 5111 and returns.

On the other hand, in the case where the program proceeds to step 5100, the suction air quantity feedback control execution flag "xqfb" is set at ON in step 5110, and the fuel injection quantity feedback control flag "xtaufb" is set at OFF. Then, the program proceeds to step 5111 and returns.

The first variation of the first embodiment operates as described above. Therefore, when the burning state is bad in suction air quantity feedback control, fuel injection quantity feedback control is conducted.

Second Variation of the Fifth Embodiment

In this second variation of the fifth embodiment, when the burning state is bad even if the idling engine speed is subjected to suction air quantity feedback control and when a predetermined period of time has not passed after the start of the engine, control is changed over to fuel injection timing control.

Figure 13:
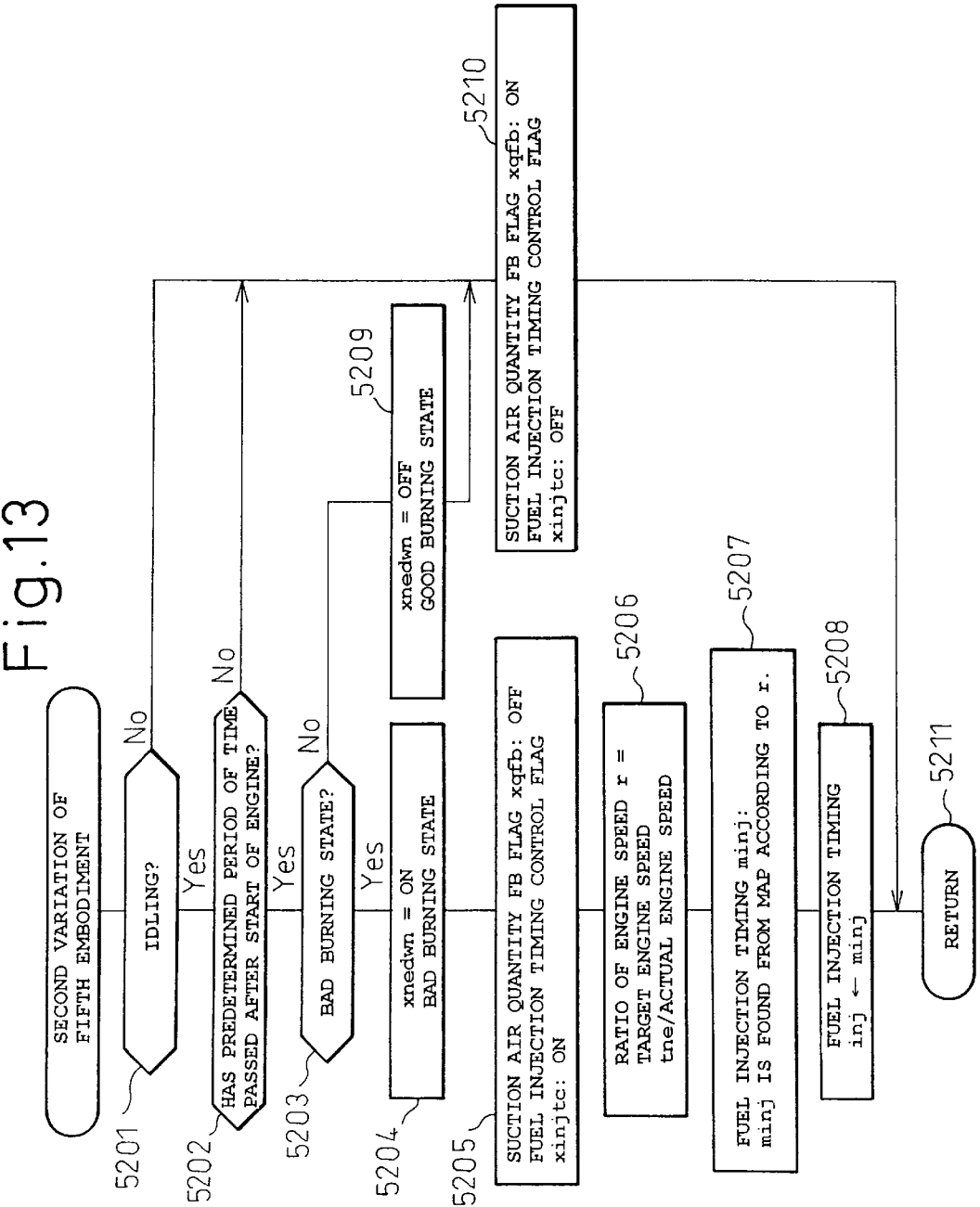
FIG. 13 is a flow chart of control conducted in the second variation of the fifth embodiment.

FIG. 13 is a flow chart of the second variation of the fifth embodiment. Step 5201 is the same as step 5001 in the fifth embodiment.

In step 5202, whether or not the elapse time after the start of the engine is longer than a predetermined period of time is judged by the timer in ECU 10.

In the case where it is not true in steps 5201 and 5202, the program proceeds to step 5210. Only when it is true in both steps 5201 and 5202, the program proceeds to step 5203.

Steps 5203, 5204 and 5209 are the same as steps 5003, 5004 and 5009 in the fifth embodiment. Therefore, the explanations of those steps are omitted here.

In step 5205, the suction air quantity feedback control execution flag "xqfb" is set at OFF, and the fuel injection timing control flag "xinjtc" is set at ON. In step 5206, the ratio "r"="tne"/"ne" of the target engine speed "tne" to the actual engine speed "ne" is calculated. In step 5207, fuel injection timing "minj" corresponding to the ratio "r"="tne"/"ne" calculated in step 5206 is found from the map in FIG. 23. In step 5208, fuel injection timing "minj" calculated in step 5207 is used as fuel injection timing "inj" of the next time, and the program proceeds to step 5211 and returns.

On the other hand, in the case where the program proceeds to step 5210, the suction air quantity feedback control execution flag "xqfb" is set at ON in step 5210, and the fuel injection timing control flag "xinjtc" is set at OFF. Then, the program proceeds to step 5211 and returns.

The second variation of the fifth embodiment operates as described above. Therefore, when the burning state is bad in suction air quantity feedback control, fuel injection timing feedback control is conducted.

Sixth Embodiment

The sixth embodiment operates as follows. When it is judged that the burning state is bad by suction air quantity feedback control of the engine speed, the suction air quantity feedback control is stopped, and control is conducted by another control parameter. After that, suction air quantity feedback control is conducted again. In the above state, the burning state is rejudged. When the burning state is bad, suction air quantity feedback control is stopped and control is conducted by another control parameter.

Especially when the burning state is bad in suction air quantity feedback control, the suction air quantity feedback control is stopped, and the ignition timing is advanced by a predetermined angle. After that, control is returned to suction air quantity feedback control. When the burning state is bad, the suction air quantity feedback control is stopped, and the ignition timing is further advanced by a predetermined angle. In this case, the spark advance is limited by the guard value.

Figure 14:
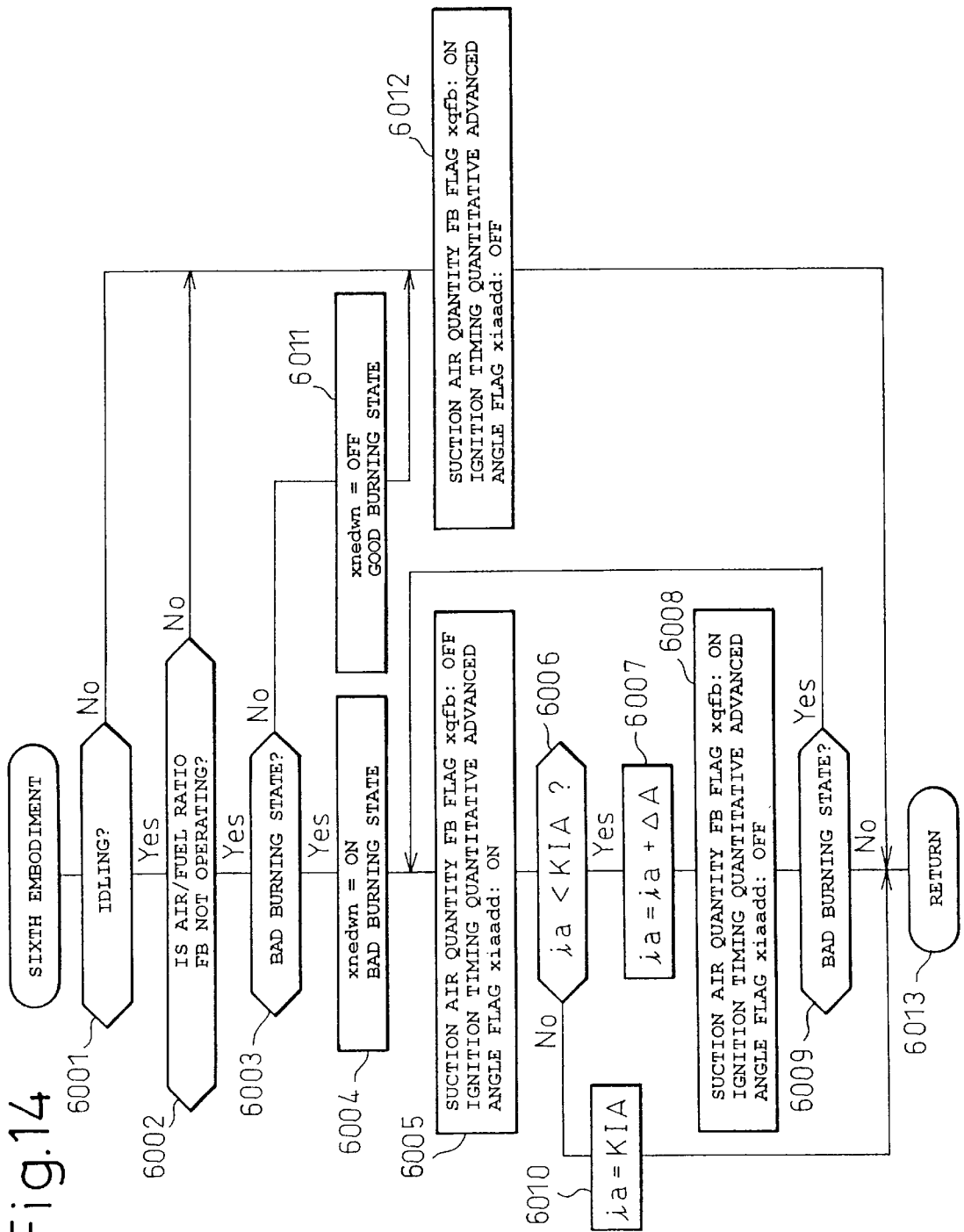
FIG. 14 is a flow chart of control conducted in the sixth embodiment.

FIG. 14 is a flow chart of the sixth embodiment. Steps 6001 and 6002 are the same as steps 5001 and 5002 in the first embodiment.

In the case where it is not true in step 6001 or 6002, the program proceeds to step 6012. Only when it is true in both steps 6001 and 6002, the program proceeds to step 6003.

Steps 6003, 6004 and 6011 are the same as steps 5003, 5004 and 5009 in the fifth embodiment. Therefore, the explanations of those steps are omitted here.

In step 6005, the suction air quantity feedback control execution flag "xqfb" is set at OFF, and the ignition timing quantitative advance angle flag "xiaadd" is set at ON. Then the program proceeds to step 6006, and it is judged whether or not ignition timing "ia" is not more than the upper limit guard value KIA.

When it is not true in step 6006, the program proceeds to step 6010, and ignition timing "ia" is fixed at the guard value. Then, the program proceeds to step 6013 and returns. On the other hand, in the case where it is true in step 6006, ignition timing "ia" is advanced by a predetermined value in step 6007, for example, ignition timing "ia" is advanced by ΔA in step 6007, and then the program proceeds to step 6008 and the suction air quantity feedback control execution flag "xqfb" is set at ON and the ignition timing quantitative advance angle flag "xiaadd" is set at OFF. Due to the foregoing, suction air quantity feedback control is executed again. Therefore, it is judged in step 6009 whether or not the burning state is bad. In the case where it is not true in step 6009, the program proceeds to step 6013 and returns. In the case where it is not true in step 6009, steps after step 6005 are repeated.

On the other hand, in the case of proceeding to step 6012, the suction air quantity feedback control execution flag "xqfb" is set at ON and the ignition timing quantitative advance angle flag "xiaadd" is set at OFF. Then, the program proceeds to step 6013 and returns.

Since the sixth embodiment operates as described above, when the burning state is bad in suction air quantity feedback control, suction air quantity feedback control is stopped and ignition timing is advanced by a predetermined angle. After that, control is returned to suction air quantity feedback control, and when the burning state is bad, suction air quantity feedback control is stopped, and ignition timing is further advanced by a predetermined angle.

Variation of the Sixth Embodiment

This variation operates as follows. When the burning state is bad in suction air quantity feedback control, suction air quantity feedback control is stopped, and the fuel injection quantity is increased by a predetermined value. After that, control is returned to suction air quantity feedback control, and when the burning state is bad, the suction air quantity feedback control is stopped and the fuel injection quantity is further increased by a predetermined value. In this case, the increase is limited by the guard value.

Figure 15:
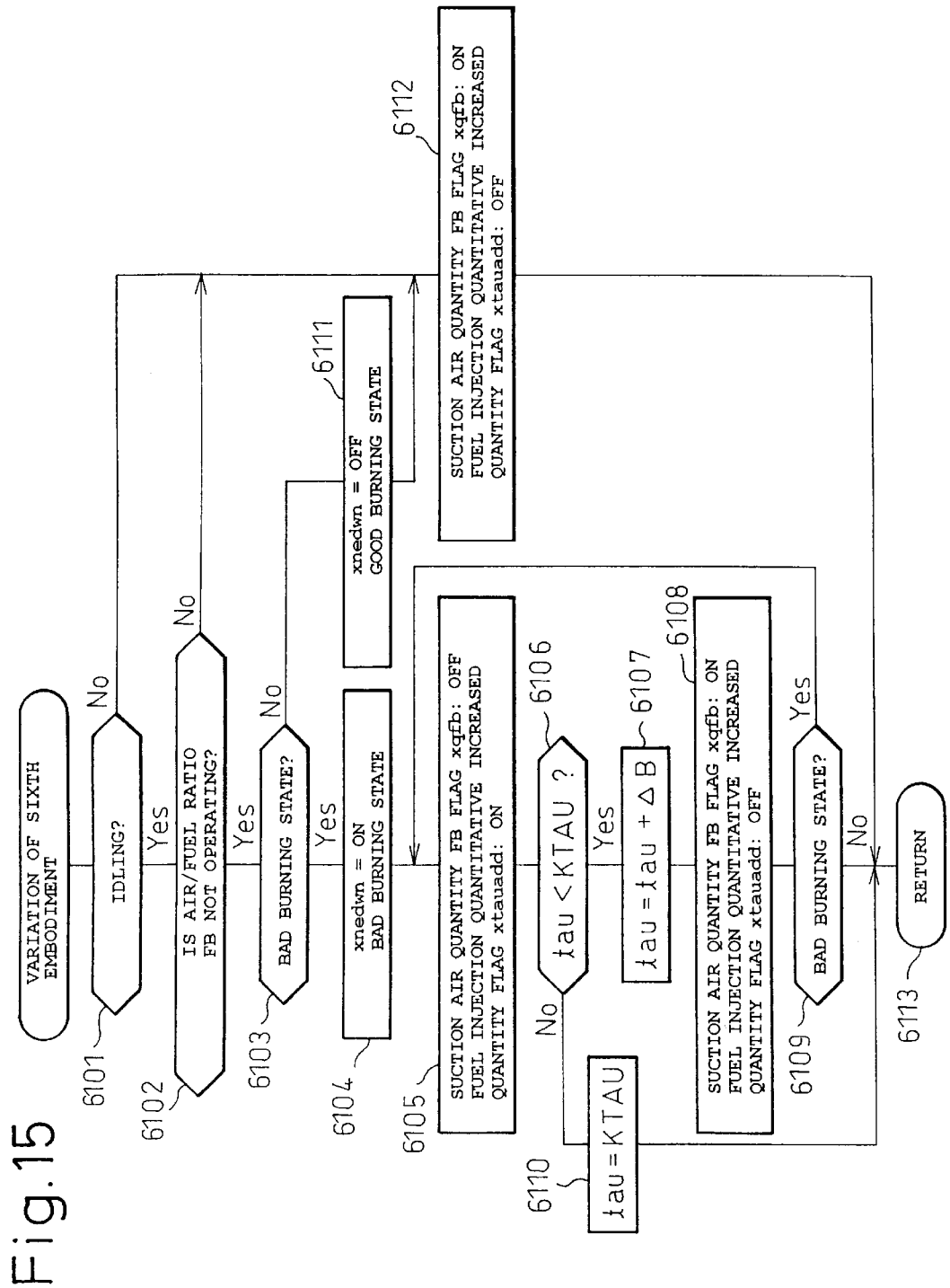
FIG. 15 is a flow chart of control conducted in the variation of the sixth embodiment.

FIG. 15 is a flow chart of the variation of the sixth embodiment. In this flow chart shown in FIG. 15, the ignition timing in the flow chart of the sixth embodiment is replaced with the fuel injection quantity. Therefore, the detailed explanation will be omitted here.

Seventh Embodiment

The seventh embodiment operates as follows. When it is judged by suction air quantity feedback control of the idling engine speed that the burning state is bad, control is carried out by another control parameter. After that, suction air quantity feedback control is conducted again, and when the burning state is bad in this state, control is further conducted by still another control parameter. When the burning state is bad in suction air quantity feedback control, the suction air quantity feedback control is stopped, and fuel injection timing is set at the fuel injection timing of non-synchronous injection. After that, control is returned to suction air quantity feedback control. When the burning state is bad, the suction air quantity feedback control is stopped, and ignition timing is advanced by a predetermined value. In this case, the advance value is limited by the guard value.

In this case, the reason why fuel injection timing control is executed first and ignition timing quantitative advance angle control is executed next is described as follows. Since fuel injection timing control has less influence on exhaust gas emission than ignition timing quantitative advance angle control, first, control is conducted by the fuel injection timing control having less influence on exhaust gas emission, and when the burning state is bad even if fuel injection timing control is executed, ignition timing quantitative advance angle control having more influence on exhaust gas emission is executed, so that the deterioration of exhaust gas emission can be reduced to as small as possible.

In this connection, the influence given to exhaust gas emission is increased in the order of control of the suction air quantity, control of fuel injection timing, control of ignition timing and control of the fuel injection quantity.

Figure 16:
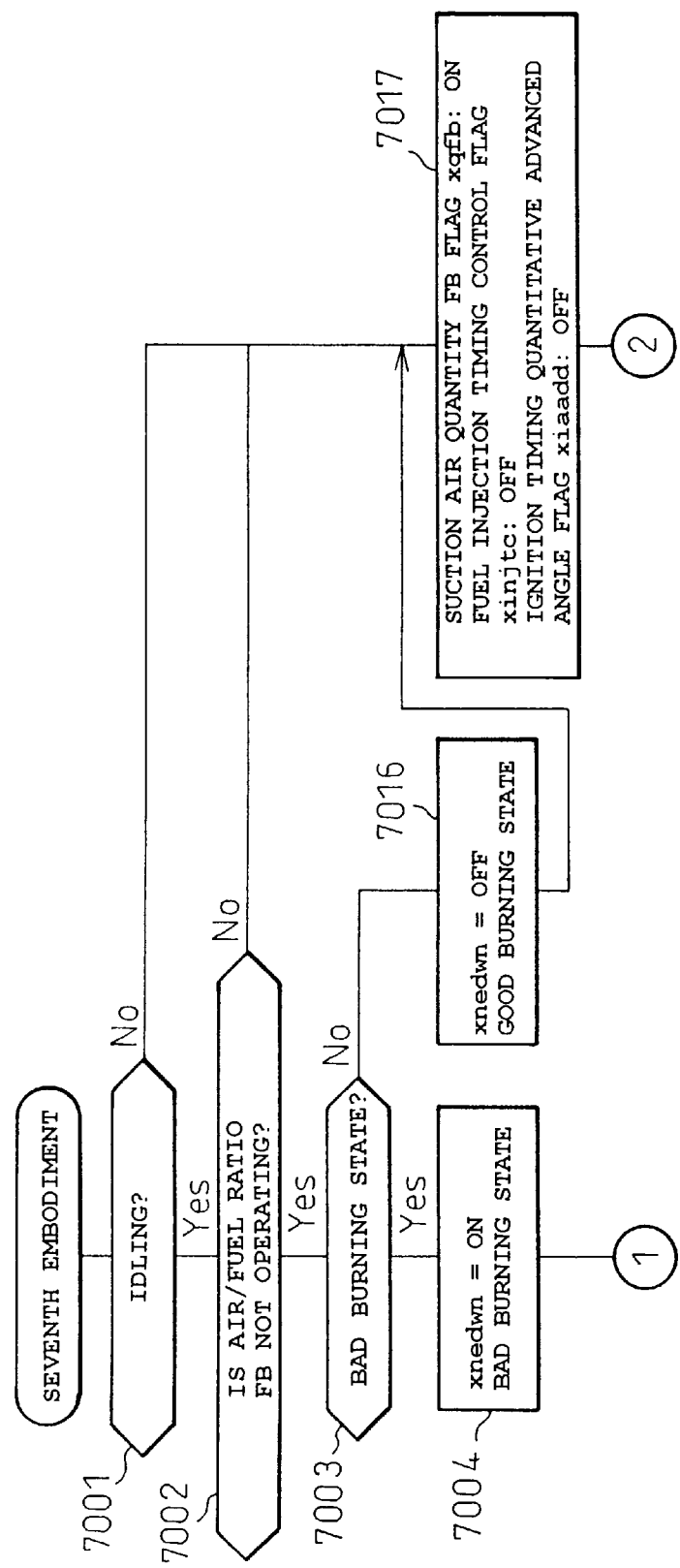
FIG. 16 is a flow chart of control conducted in the seventh embodiment.
Figure 17:
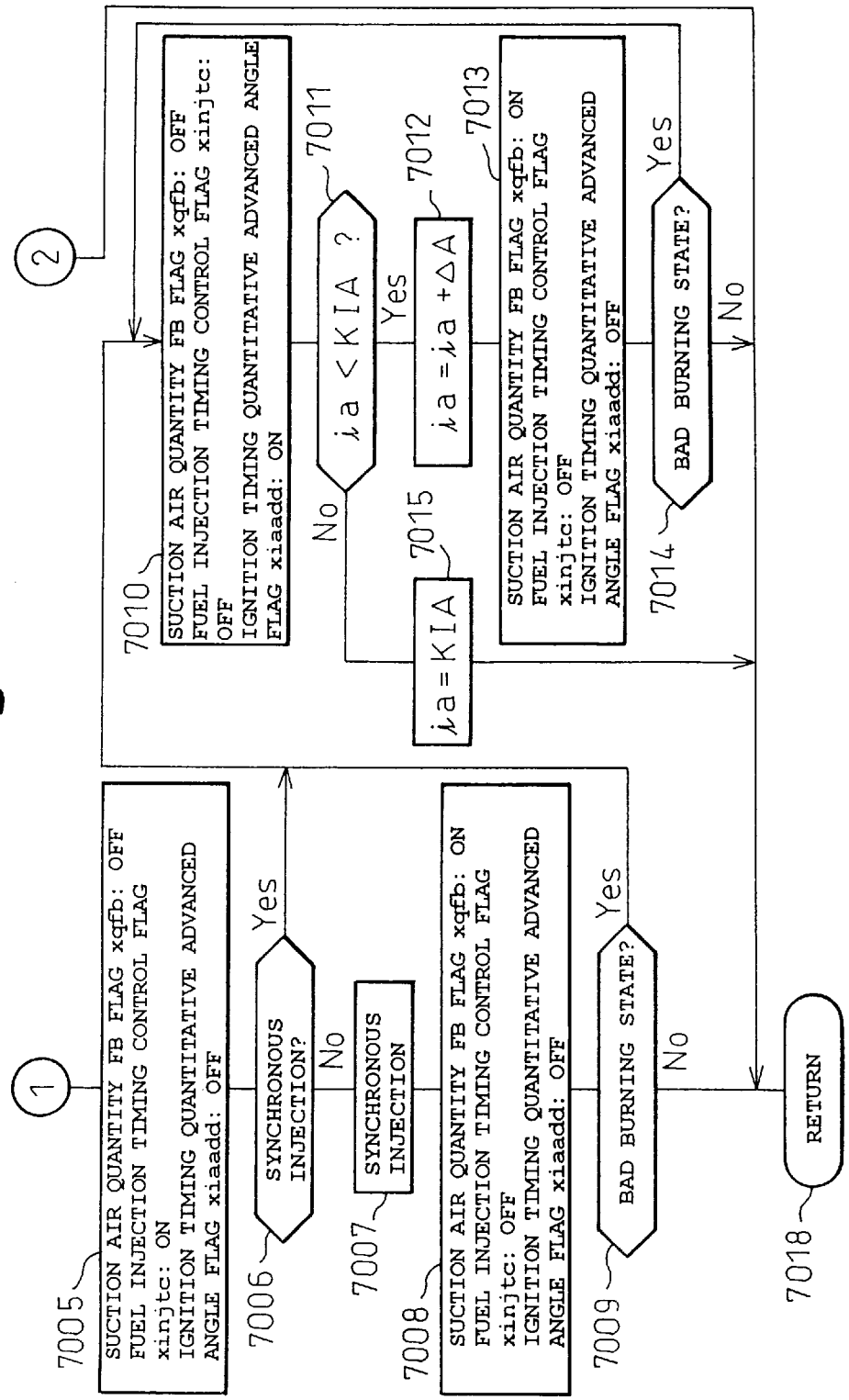
FIG. 17 is a flow chart of control conducted in the seventh embodiment.

FIGS. 16 and 17 are views showing a flow chart of the seventh embodiment. Steps 7001 and 7002 in this flow chart are the same as steps 5001 and 5002 in the fifth embodiment.

When it is not true in steps 7001 or 7002, the program proceeds to step 7017. Only when it is true in both steps 7001 and 7002, the program proceeds to step 7003.

Since steps 7003, 7004 and 7016 are the same as steps 5003, 5004 and 5009 in the fifth embodiment, the explanations are omitted here.

In step 7005, the suction air quantity feedback control execution flag "xqfb" is set OFF, and the fuel injection timing control flag "xinjtc" is set ON, and the ignition timing quantitative advance angle flag "xiaadd" is set OFF and the program proceeds to step 7006 and it is judged whether or not the fuel injection timing is set at the injection timing of synchronous injection.

When it is not true in step 7006, the program proceeds to step 7007, and the fuel injection timing is set at the injection timing of synchronous injection. Then, the program proceeds to step 7008, and the suction air quantity feedback control execution flag "xqfb" is set ON, and the fuel injection timing control flag "xinjtc" is set OFF, and the ignition timing quantitative advance angle flag "xiaadd" is set OFF. Due to the foregoing, suction air quantity feedback control is executed again. Therefore, it is judged whether or not the burning state is bad in step 7009. When it is true in step 7009, the program proceeds to step 7018 and returns.

On the other hand, when it is true in step 7006 and when it is true in step 7009, the program proceeds to step 7010 and the suction air quantity feedback control execution flag "xqfb" is set OFF, and the fuel injection timing control flag "xinjtc" is set OFF, and the ignition timing quantitative advance angle flag "xiaadd" is set ON. Then, the program proceeds to step 7011.

In step 7011, it is judged whether or not the ignition timing is lower than the predetermined guard value KIA. When it is true in step 7011, the ignition timing "ia" is advanced by a predetermined advance angle, for example, the ignition timing "ia" is advanced by ΔA in step 7012. Then, the program proceeds to step 7013, and the suction air quantity feedback control execution flag "xqfb" is set at ON, and the fuel injection timing control flag "xinjtc" is set at OFF, and the ignition timing quantitative advance angle flag "xiaadd" is set at OFF. Due to the foregoing, suction air quantity feedback control is executed again. Therefore, it is judged whether or not the burning state is bad in step 7014.

When it is true in step 7014, steps after step 7010 are repeated. When it is not true in step 7014, the program proceeds to step 7018 and returns. When it is not true instep 7011, the ignition timing "ia" is fixed at the guard value KIA in step 7015, and then the program proceeds to step 7018 and returns.

On the other hand, when the program proceeds to step 7017, the suction air quantity feedback control execution flag "xqfb" is set at ON, and the ignition timing quantitative advance angle flag "xiaadd" is set at OFF, and the program proceeds to step 7018 and returns.

Since the seventh embodiment operates as described above, when the burning state is bad in suction air quantity feedback control, suction air quantity feedback control is stopped and the fuel injection timing is set at the timing of non-synchronous injection. After that, control is returned to suction air quantity feedback control. When the burning state is bad even after that, suction air quantity feedback control is stopped, and ignition timing quantitative advance angle control is executed.

Variation of the Seventh Embodiment

The variation of the seventh embodiment operates as follows. When the burning state is bad in suction air quantity feedback control, suction air quantity feedback control is stopped, and the ignition timing is advanced by a predetermined angle. After that, control is returned to suction air quantity feedback control. When the burning state is bad even after that, suction air quantity feedback control is stopped, and the quantity of fuel injection is increased by a predetermined value. In this case, the advance angle is limited to the guard value, and also the value of increase in fuel injection is limited to the guard value.

In this case, the reason why ignition timing control is executed first and fuel injection quantity control is executed next is described as follows. Since ignition timing control has less influence on exhaust gas emission than fuel injection quantity control, first, control is conducted by the ignition timing control having less influence on exhaust gas emission in the same manner as that of the third embodiment, and when the burning state is bad even if ignition timing control is executed, fuel injection quantity control having more influence on exhaust gas emission is executed, so that the deterioration of exhaust gas emission can be reduced as small as possible.

Figure 18:
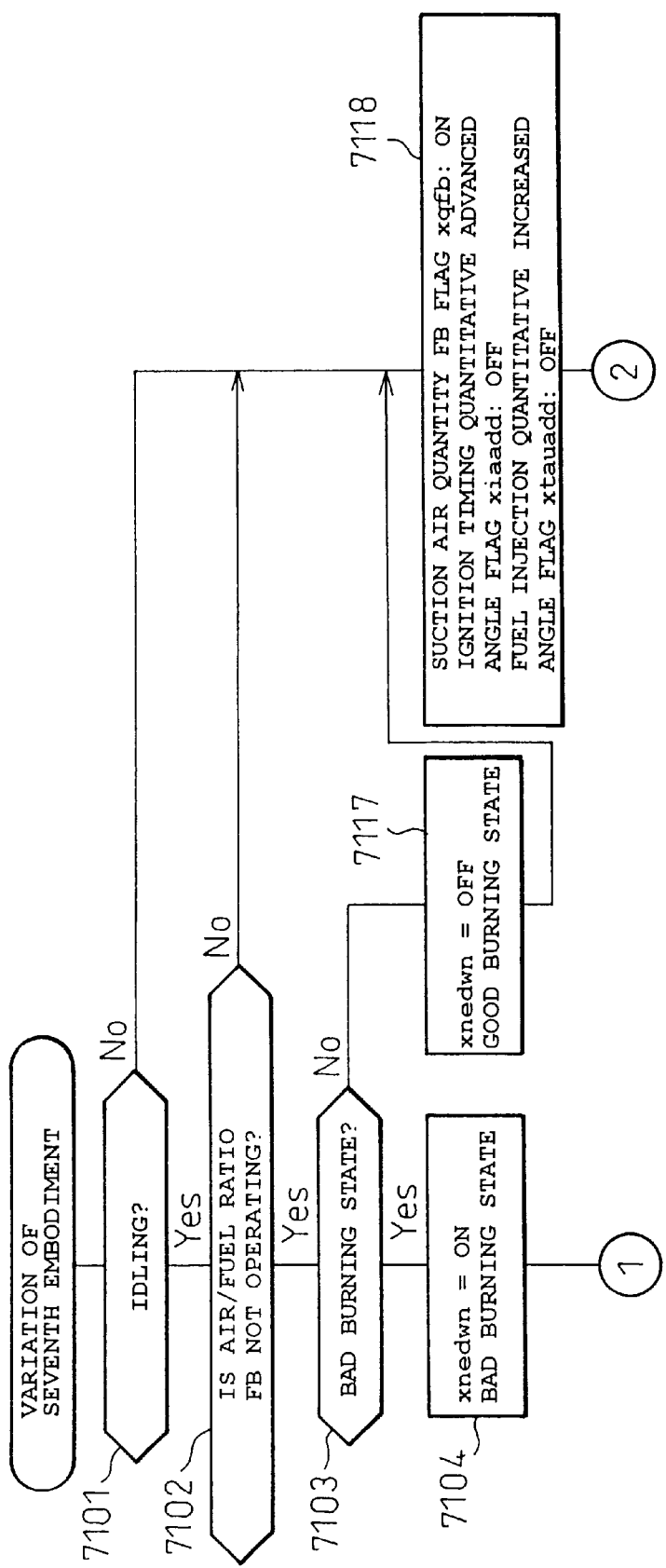
FIG. 18 is a flow chart of control conducted in the variation of the seventh embodiment.
Figure 19:
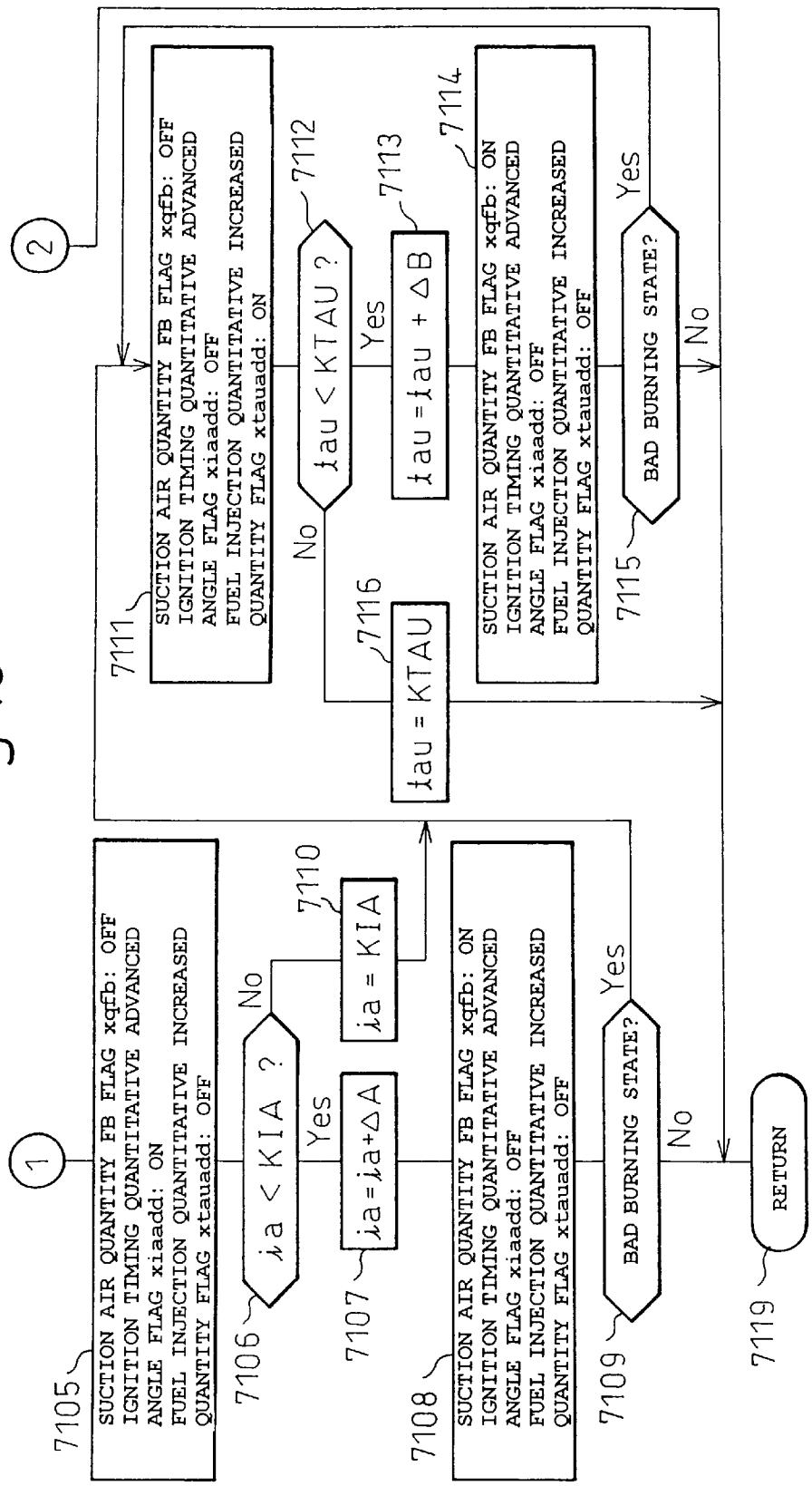
FIG. 19 is a flow chart of control conducted in the variation of the seventh embodiment.

FIGS. 18 and 19 are views showing a flow chart of the variation of the seventh embodiment. Steps 7101 and 7102 in this flow chart are the same as steps 7001 and 7002 in the seventh embodiment.

When it is not true in steps 7101 or 7102, the program proceeds to step 7118. Only when it is true in both steps 7101 and 7102, does the program proceed to step 7103.

Since steps 7103, 7104 and 7117 are the same as steps 7003, 7004 and 7016 in the third embodiment, the explanations are omitted here.

In step 7105, the suction air quantity feedback control execution flag "xgfb" is set at OFF, and the ignition timing quantitative advance angle flag "xiaadd" is set at ON, and the fuel injection quantitative increase flag "xtauadd" is set at OFF, and the program proceeds to step 7106, and it is judged whether or not the ignition timing is lower than the predetermined guard value KIA. When it is true in step 7106, the ignition timing "ia" is advanced by a predetermined angle in step 7107, for example, the ignition timing "ia" is advanced by ΔA, and then the program proceeds to step 7108, and the suction air quantity feedback control execution flag "xgfb" is set at "ON" and the ignition timing quantitative advance angle flag "xiaadd" is set at OFF, and the fuel injection quantitative increase flag "xtauadd" is set at OFF. Due to the foregoing, suction air quantity feedback control is executed again. Therefore, it is judged in step 7109 whether or not the burning state is bad. When it is not true in step 7109, the program proceeds to step 7119 and returns.

On the other hand, when it is not true in step 7106 and when it is true in step 7109, the program proceeds to step 7111 and the suction air quantity feedback control execution flag "xgfb" is set OFF, and the ignition timing quantitative advance angle flag "xiaadd" is set OFF, and the fuel injection quantitative increase flag "xtauadd" is set ON. Then, the program proceeds to step 7112.

In step 7112, it is judged whether or not the fuel injection quantity "tau" is lower than the predetermined guard value KTAU.

When it is true in step 7112, the fuel injection quantity "tau" is increased in step 7113 by a predetermined correction quantity, for example, the fuel injection quantity "tau" is increased in step 7113 by ΔB. Then, the program proceeds to step 7114, and the suction air quantity feedback control execution flag "xqfb" is set at ON, and the ignition timing quantitative advance angle flag "xiaadd" is set at OFF, and the fuel injection quantitative increase flag "xtauadd" is set at OFF. Due to the foregoing, suction air quantity feedback control is executed again. Therefore, it is judged in step 7115 whether or not the burning state is bad. When it is true in step 7115, steps after step 7111 are repeated, and when it is not true, the program proceeds to step 7119 and returns. When it is not true in step 7112, the fuel injection quantity "tau" is fixed at the guard value KTAU in step 7116, and then the program proceeds to step 7119 and returns.

On the other hand, when the program proceeds to step 7118, the suction air quantity feedback control execution flag "xqfb" is set at ON, and the ignition timing quantitative advance angle flat "xiaadd" is set at OFF, and then the program proceeds to step 7118 and returns.

Since the variation of the seventh embodiment operates as described above, when the burning state is bad in suction air quantity feedback control, suction air quantity feedback control is stopped and the ignition timing is advanced by a predetermined angle. After that, control is returned to suction air quantity feedback control. When the burning state is bad even after that, suction air quantity feedback control is stopped, and fuel injection quantitative increase control is executed.

Eight Embodiment

In the eighth embodiment, when it is judged in suction air quantity feedback control that the burning state is bad, control is executed by another control parameter. In this case, a cylinder, the burning state of which is bad, is discriminated, and control is executed by another control parameter. When the idling engine speed is subjected to suction air quantity feedback control and the burning state is bad and the air/fuel ratio feedback control is not executed, control is changed to ignition timing feedback control.

Figure 20:
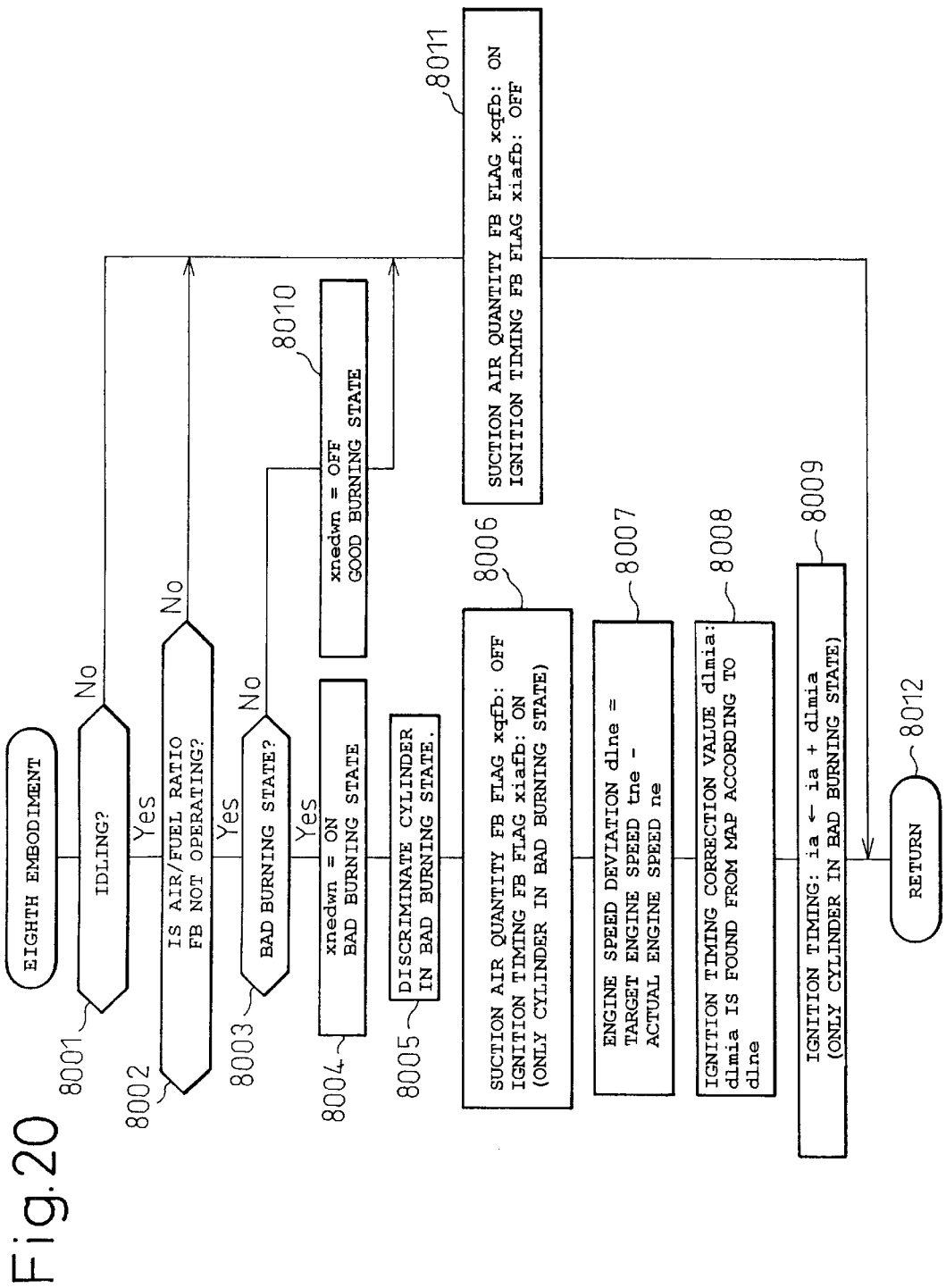
FIG. 20 is a flow chart of control conducted in the eighth embodiment.

FIG. 20 is a flow chart to conduct controlling of the eighth embodiment. In this flow chart, after step 5004 of the fifth embodiment, the step to discriminate a cylinder is inserted, and the ignition timing of a cylinder, the burning state of which is bad, is corrected in steps 8006, 8008, 8009 corresponding to steps 5005, 5007, 5008 in the flow chart of the fifth embodiment.

As described before, this discrimination of a cylinder, the burning state of which is bad, is conducted by measuring a period of time (angle) from a reference signal generated by the cam position sensor 30 on the basis of the signal of the crank position sensor 21.

As described above, in the eighth embodiment, in the case where the burning state is bad in suction air quantity feedback control, the cylinder, the burning state of which is bad, is specified, and ignition timing feedback control is conducted only on this cylinder, and ignition timing feedback control is not conducted on other cylinders for which ignition timing feedback control is unnecessary. Therefore, the deterioration caused by exhaust gas and the deterioration of drivability, which are caused by a redundant countermeasure, can be prevented. In this connection, the above method in which the cylinder, the burning state of which is bad in suction air quantity feedback control, is specified and another control is conducted only on the cylinder, the burning state of which is bad, can be applied to not only the fifth embodiment but also other embodiments.

Embodiments of the Third Group

Embodiments of the third group will be explained below. This embodiment is an engine speed control unit characterized as follows. In the embodiments of the third group, in the case where the burning state is bad while suction air quantity feedback control is being conducted and a load change is caused while feedback control conducted by the ignition timing or the fuel injection quantity is being executed, the engine speed is controlled so that it can reach the target value.

Ninth Embodiment

In the ninth embodiment, a load change is relatively small, and the target engine speed is not changed, and the reference value of the control parameter is changed.

As an example, there is shown a case in which a load change is caused by the influence of a power steering device while feedback control by the ignition timing is being conducted.

Figure 25:
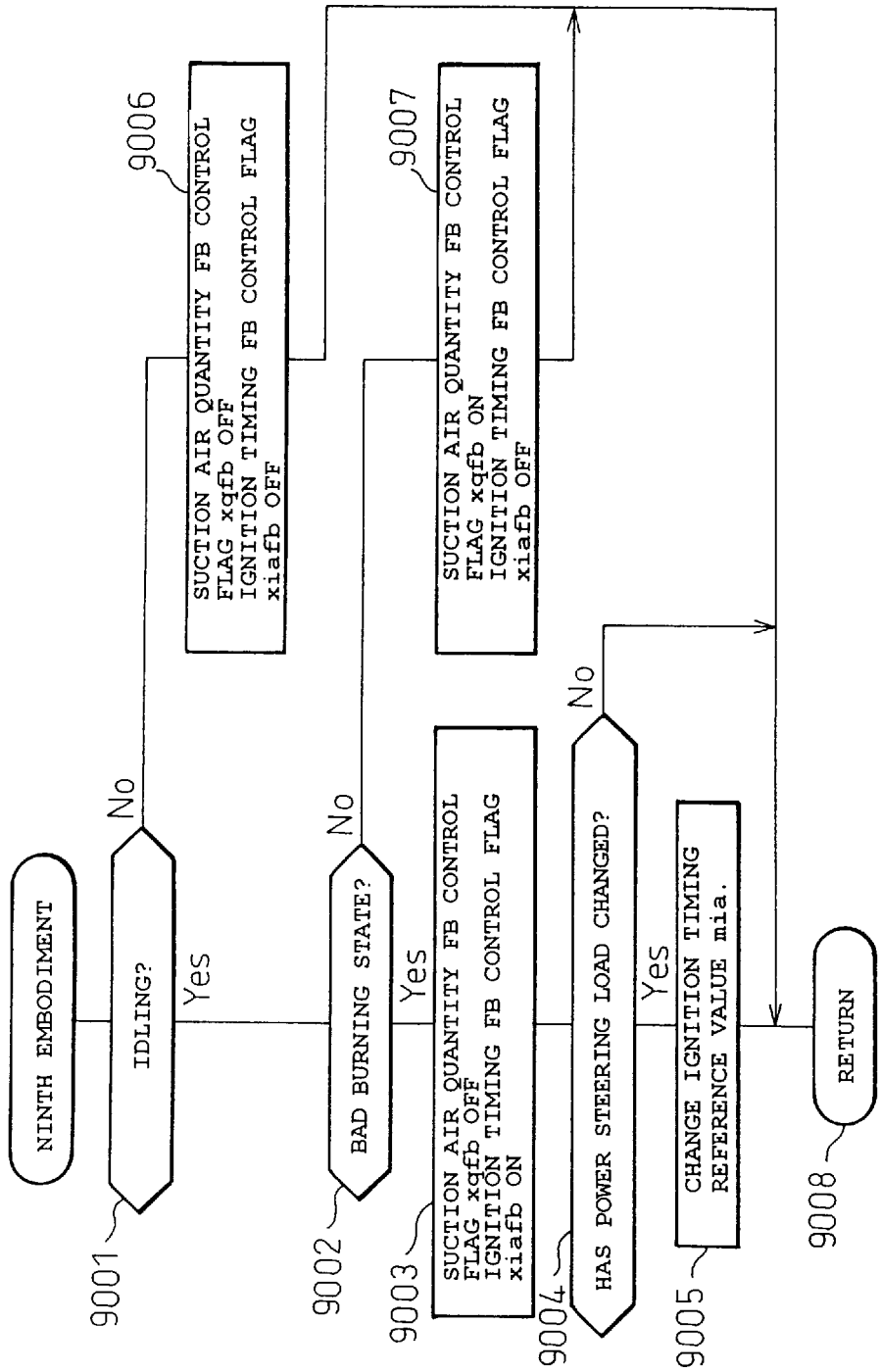
FIG. 25 is a flow chart of control conducted in the ninth embodiment.

FIG. 25 is a flow chart of the ninth embodiment. In step 9001, it is judged whether or not it is in an idling state. This judgment is conducted by the signal sent from the throttle opening degree sensor 4 or the accelerator opening degree sensor 15 and also by the signal sent from the vehicle speed sensor 31. In step 9002, it is judged whether or not the burning state is bad.

In this connection, the method of judging whether or not the burning state is bad is not limited to a specific method. For example, whether or not the burning state is bad can be judged by a rise of the engine speed immediately after the start of the engine. Also, whether or not the burning state is bad can be judged by a ratio of the change in a suction air quantity to the change in the engine speed in the idling state.

When it is not true in step 9001, both the suction air quantity feedback control flag "xqfb" and the ignition timing feedback control flag "xiafb" are set OFF in step 9006, and the program proceeds to step 9008 and returned.

When it is not true in step 9002, the program proceeds to step 9007, and the ignition timing feedback control flag. "xiafb" is set OFF in step 9007, and ignition timing feedback control is stopped, and the suction air quantity feedback control execution flag "xqfb" is set at ON so as to conduct suction air quantity feedback control, and then the program proceeds to step 9008 and returns.

When it is true in both steps 9001 and 9002, the program proceeds to step 9003, and the suction air quantity feedback control flag "xqfb" is set at OFF so as to stop suction air quantity feedback control, and the ignition timing feedback control flag "xiafb" is set at ON so as to conduct ignition timing feedback control. Then, the program proceeds to step 9004, and it is judged whether or not a load of the power steering device has been changed. When it is not true in step 9004, the program proceeds to step 9008 as it is and returns. The change in the load of the power steering device is detected by the power steering load detection means 32 shown in FIG. 43.

When it is true in step 9004, the program proceeds to step 9005, and the ignition timing reference value "mia" is changed, and the program proceeds to step 9008 and returns.

In this connection, when the load change is very small and the controllability can be kept without changing the ignition timing reference value "mia", step 9005 may be omitted.

Variation of the Ninth Embodiment

Figure 26:
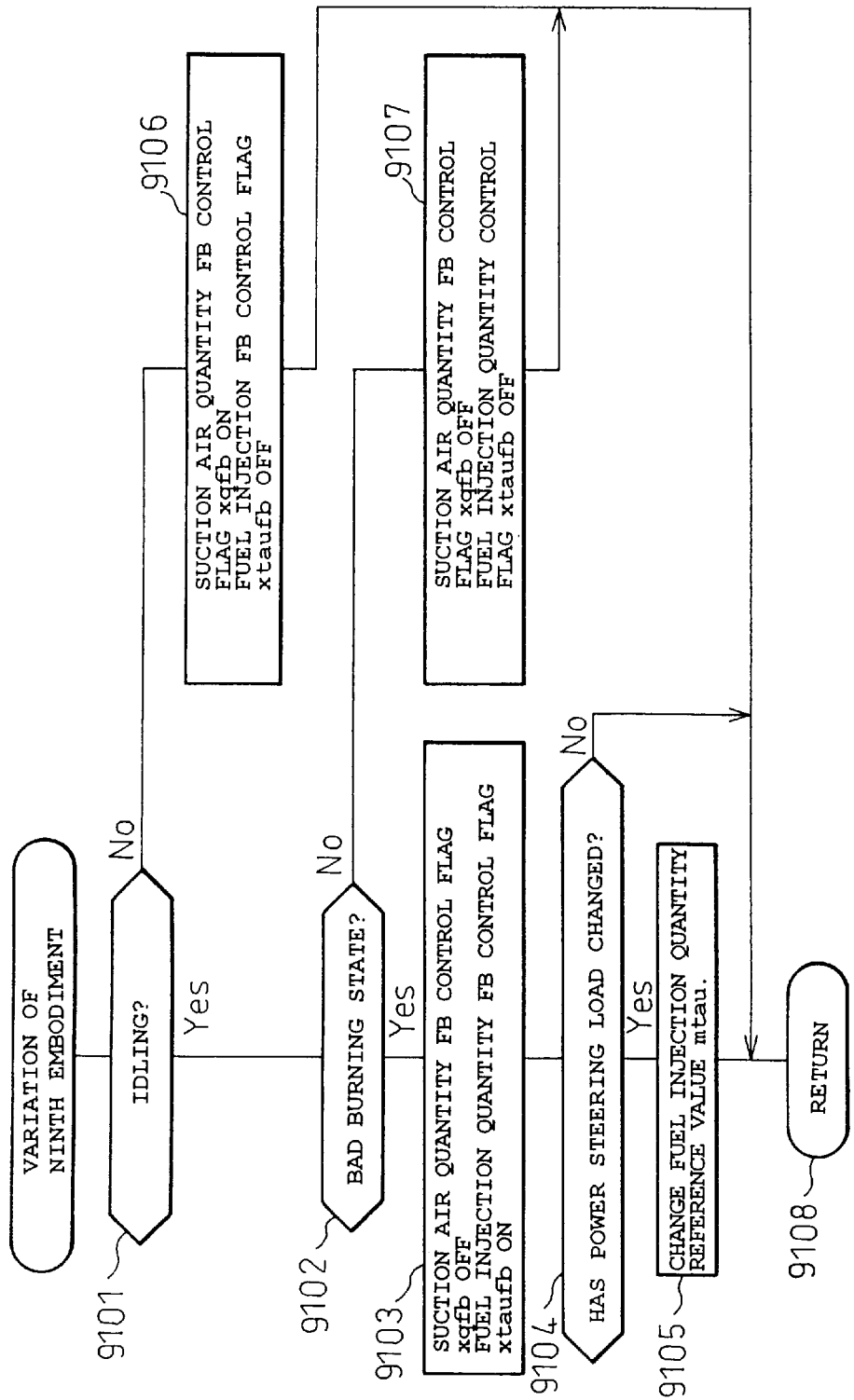
FIG. 26 is a flow chart of control conducted in the variation of the ninth embodiment.

FIG. 26 is a flow chart of control conducted in the variation of the ninth embodiment. This variation of the ninth embodiment is essentially the same as the ninth embodiment. Therefore, the explanations will be omitted here.

In this case, the ignition timing reference value "mia" and the fuel injection quantity reference value "mtau" will be explained here. The ignition timing reference value "mia" and the fuel injection quantity reference value "mtau" are values previously stored on the map in ECU 10 corresponding to the coolant temperature according to the results of experiments when ignition timing feedback control or fuel injection quantity feedback control is conducted. In the case where the idling engine speed does not coincide with the target value, the change correction is increased or decreased by this reference value so that the difference can be compensated.

Accordingly, in the case where the load change is large, unless the reference value is shifted corresponding to it, the correction is increased and it takes long time to conduct controlling. On the other hand, when the load change is small, the change in the correction is also small. Therefore, it is unnecessary to shift the reference value. In this connection, these reference values may be respectively stored according to the load. Alternatively, only the reference value in the normal state may be stored and corrected by a predetermined value.

In this connection, the suction air quantity reference value is also prepared for suction air quantity feedback control executed in a good burning state.

The ninth embodiment and its variation operate as described above. Therefore, when the burning state becomes bad in suction air quantity feedback control and the power steering load is changed while ignition timing feedback control or fuel injection quantity feedback control is being conducted, the ignition timing reference value "mia" or the fuel injection quantity reference value "tau" is changed and feedback control can be continued.

Tenth Embodiment

Next, the tenth embodiment will be explained below. In this tenth embodiment, a change in the load is detected, and the control reference value is changed according to the change in the load. As an example, there is shown a case in which the ignition timing reference value "mia" is changed according to the change in the load given to the power steering device.

Figure 27:
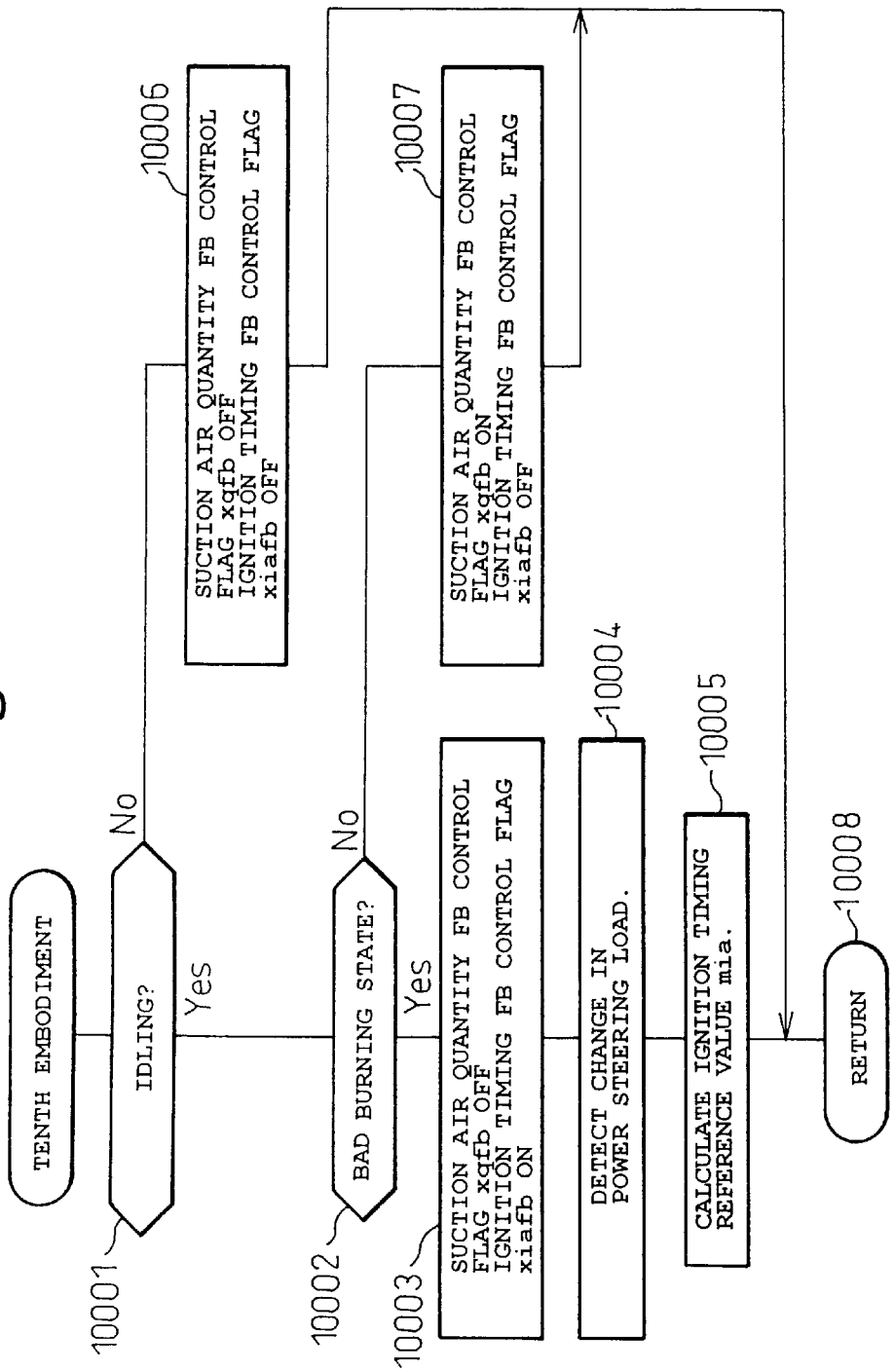
FIG. 27 is a flow chart of control conducted in the tenth embodiment.

FIG. 27 is a flow chart of the tenth embodiment. Steps 10001 to 10003 are the same as steps 9001 to 9003 of the first embodiment, and steps 10006 to 10007 are the same as steps 9006 to 9007 of the ninth embodiment. Therefore, the explanations are omitted here.

In the case where the program proceeds to step 10004, a change of the load given to the power steering device is detected in step 10004. In step 10005 the ignition timing reference value "mia" corresponding to the change of the load given to the power steering device is calculated. Then, the program proceeds to step 10008 and returns.

The tenth embodiment operates as described above. Therefore, when the burning state becomes bad in the process of suction air quantity feedback control and ignition timing feedback control is conducted, the ignition timing reference value "mia" is changed corresponding to the load given to the power steering device and feedback control is continued. In this connection, concerning this tenth embodiment, as the variation of the ninth embodiment, it is possible to devise a variation in which feedback control is conducted by the fuel injection quantity. However, the explanation will be omitted here.

Eleventh Embodiment

Next, the eleventh embodiment will be explained below. In this eleventh embodiment, when a load given to the engine is changed, the target value "tne" of the idling engine speed is changed. Explanations will be made into an example in which a load given to the engine by electric auxiliary machines, which is referred to as an electric load hereinafter, is changed when ignition timing feedback control is conducted.

Figure 28:
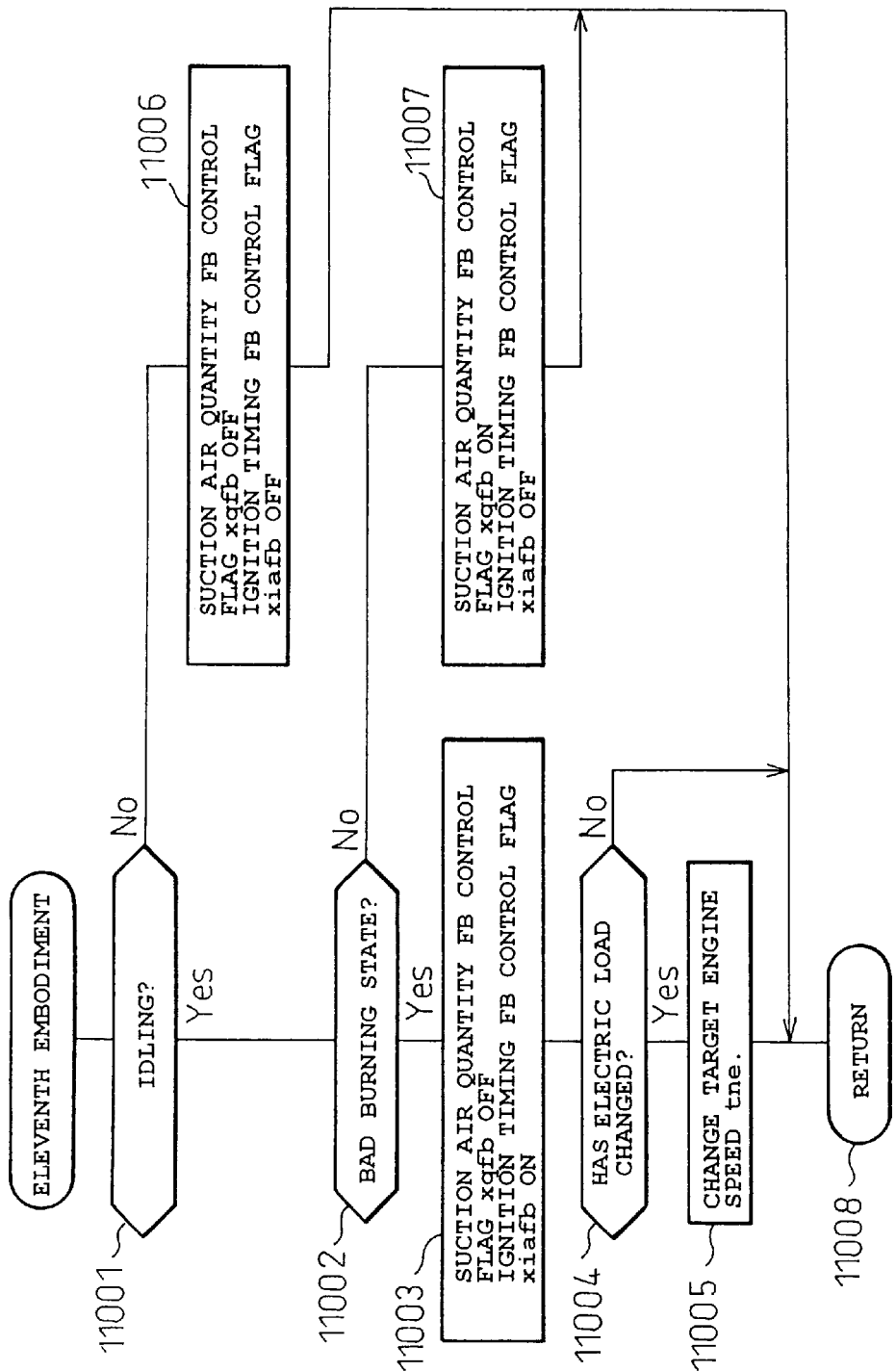
FIG. 28 is a flow chart of control conducted in the eleventh embodiment.

FIG. 28 is a flow chart of the eleventh embodiment. Steps 11001 to 11003 are the same as steps 9001 to 9003 of the ninth embodiment, and steps 11006, 11007 are the same as steps 9006 to 9007 of the ninth embodiment. Therefore, the explanations are omitted here. In this connection, whether or not the electric load is changed is judged by ECU 10 according to signals sent the auxiliary machines.

After the program has proceeded to step 11004, it is judged whether or not the electric load is changed in step 11004. When it is true, the target engine speed "tne" is changed in step 11005, and the program proceeds to step 11008 and returns. When it is not true in step 11004, the program proceeds to step 11008 as it is and returns.

Eleventh embodiment operates as described above. Therefore, when the burning state becomes bad in the process of suction air quantity feedback control and ignition timing feedback control is conducted, the target engine speed "tne" is changed when the electric load is changed, and feedback control is continued. In this connection, concerning this eleventh embodiment, as the variation of the ninth embodiment, it is possible to devise a variation in which feedback control is conducted by the fuel injection quantity. However, the explanation will be omitted here.

Twelfth Embodiment

Next, the twelfth embodiment will be explained below. In this twelfth embodiment, when a load given to the engine is changed, the target value "tne" of the idling engine speed is changed and also the control reference value corresponding to the target value is changed. Explanations will be made into an example in which an electric load is changed when ignition timing feedback control is conducted.

Figure 29:
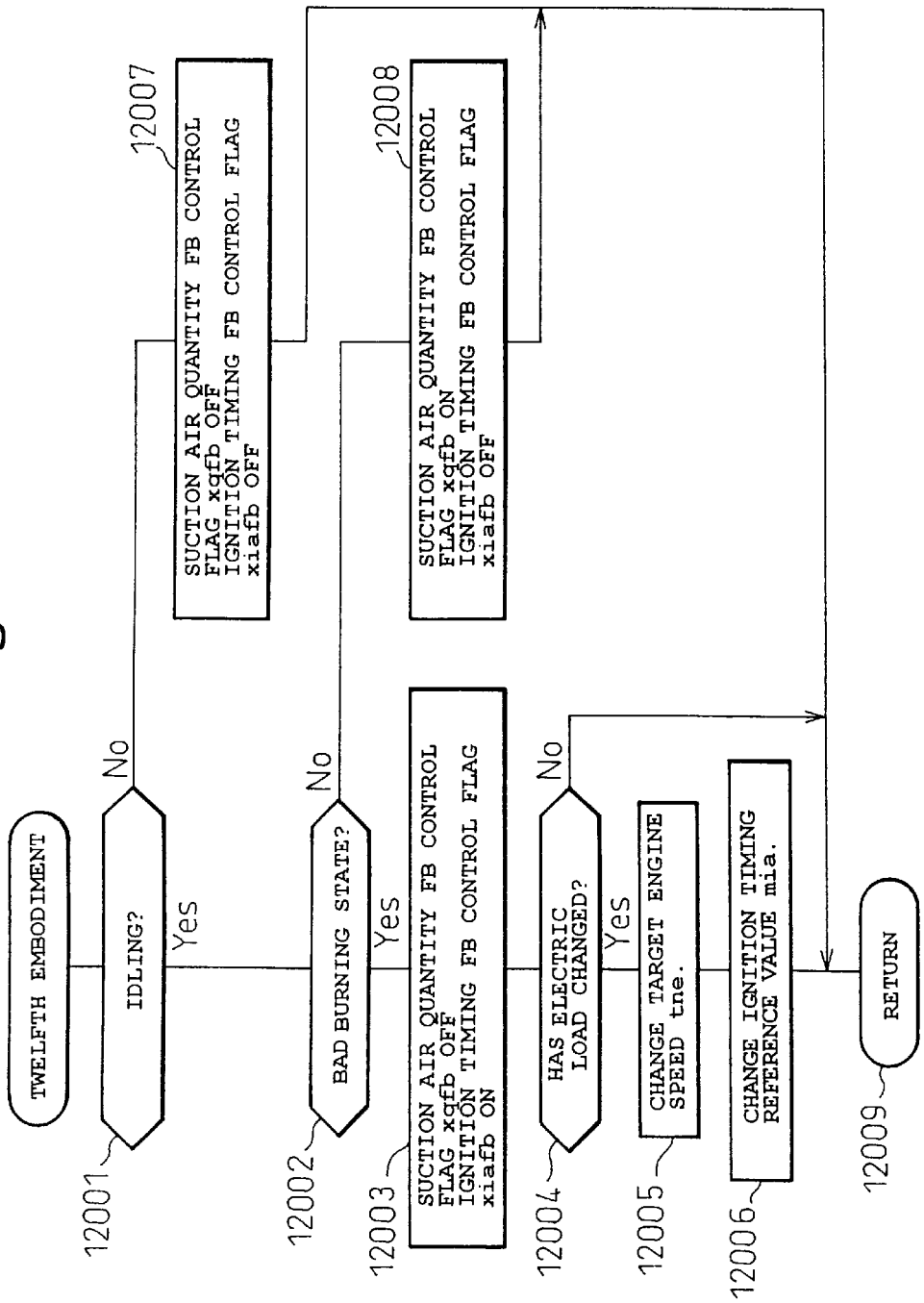
FIG. 29 is a flow chart of control conducted in the twelfth embodiment.

FIG. 29 is a flow chart of the twelfth embodiment. Steps 12001 to 12003 are the same as steps 9001 to 9003 of the first embodiment, and steps 12007, 12008 are the same as steps 9006, 9007 of the first embodiment. Therefore, the explanations are omitted here.

After the program has proceeded to step 12004, it is judged whether or not the electric load is changed in step 12004. When it is true, the target engine speed "tne" is changed in step 12005, and the ignition timing reference value "mia" is changed in step 12006, and then the program proceeds to step 12009 and returns. When it is not true in step 12004, the program proceeds to step 12009 as it is and returns.

Twelfth embodiment operates as described above. Therefore, when the burning state becomes bad in the process of suction air quantity feedback control and ignition timing feedback control is conducted, the target engine speed "tne" and the ignition timing reference value "mia" are changed when the electric load is changed, and feedback control is continued. In this connection, concerning this twelfth embodiment, like the variation of the ninth embodiment, it is possible to devise a variation in which feedback control is conducted by the fuel injection quantity. However, the explanation will be omitted here.

Thirteenth Embodiment

Next, the thirteenth embodiment will be explained below. In this thirteenth embodiment, a change in the load is detected, and the target engine speed and the control reference value are changed corresponding to this change in the load. As an example, there is shown a case in which the target engine speed "tne" and the ignition timing reference value "mia" are changed corresponding to a change in the electric load.

Figure 30:
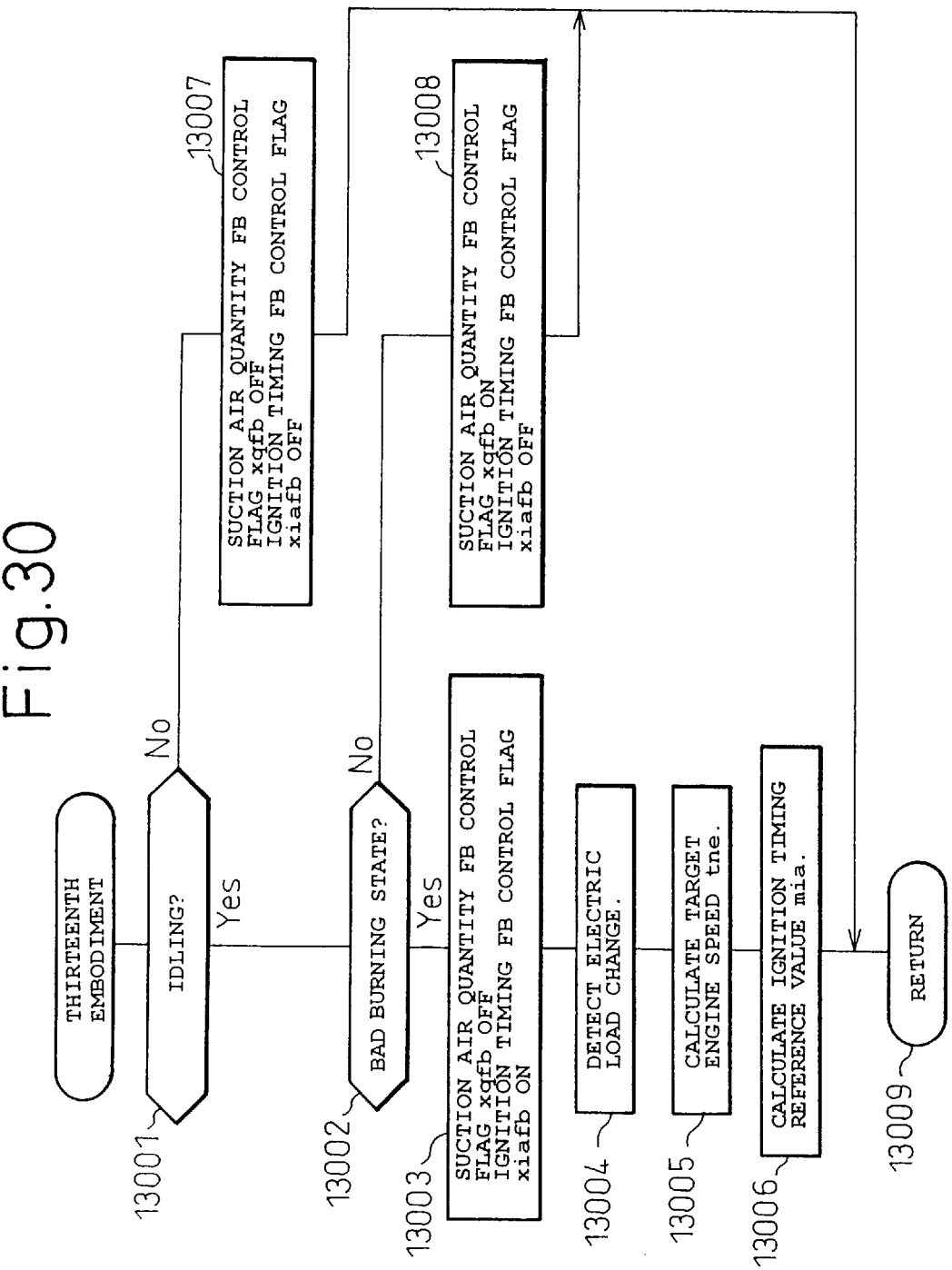
FIG. 30 is a flow chart of control conducted in the variation of the thirteenth embodiment.

FIG. 30 is a flow chart of the thirteenth embodiment. Steps 13001 to 13003 are the same as steps 9001 to 9003 of the ninth embodiment, and steps 13007, 13008 are the same as steps 9006, 9007 of the first embodiment. Therefore, the explanations are omitted here.

When the program proceeds to step 13004, a change in the electric load is detected in step 13004. In step 13005, the target engine speed "tne" is calculated corresponding to the change in the electric load detected in step 13004. In step 13006, the ignition timing reference value "mia" is calculated, and the program proceeds to step 13009 and returns.

Thirteenth embodiment operates as described above. Therefore, when the burning state becomes bad in the process of suction air quantity feedback control and ignition timing feedback control is conducted, the target engine speed "tne" and the ignition timing reference value "mia" are changed when the electric load is changed, and feedback control is continued.

In this connection, concerning this thirteenth embodiment, like the variation of the ninth embodiment, it is possible to think a variation in which feedback control is conducted by tho fuel injection quantity. However, the explanation will be omitted here.

Fourteenth Embodiment

Next, the fourteenth embodiment will be explained below. This fourteenth embodiment complies with a case in which a change in the load is large. In this embodiment, the target value of the idling engine speed is increased and the reference value of a parameter of feedback control is shifted and further other parameters are quantitatively changed.

As an example, there is shown a case in which a shift position of the transmission connected with the engine 1 is moved between the stopping position (P, N) and the running position (D, R, 4, 3, 2, L) while ignition timing feedback control is being conducted. This movement of the shift position of the transmission is judged by a signal sent from the shift position sensor 33.

Figure 31:
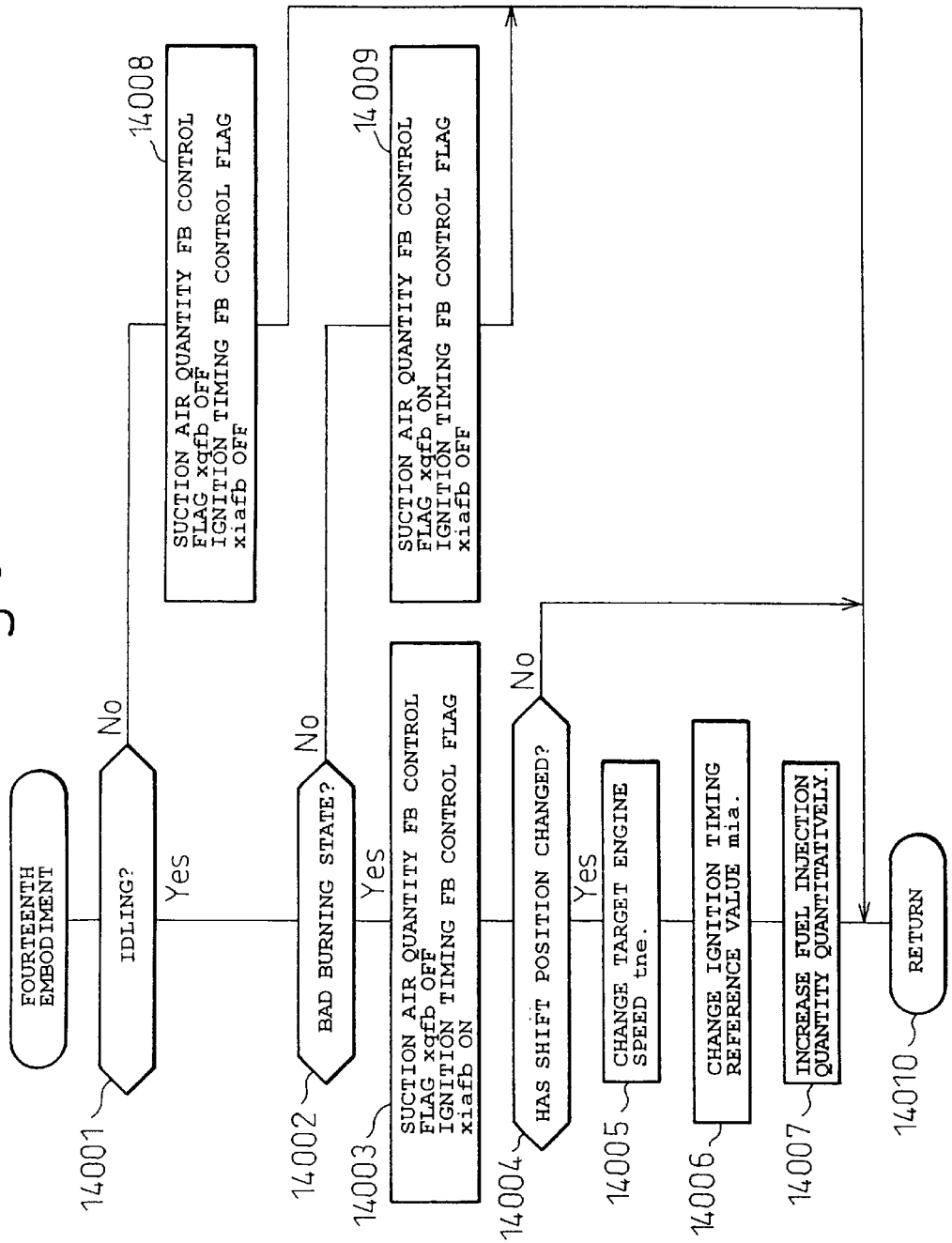
FIG. 31 is a flow chart of control conducted in the variation of the fourteenth embodiment.

FIG. 31 is a flow chart of the fourteenth embodiment. Steps 14001 to 14003 are the same as steps 9001 to 9003 of the ninth embodiment, and steps 14007, 14009 are the same as steps 9006, 9007 of the ninth embodiment. Therefore, the explanations are omitted here.

In step 14004, it is judged whether or not the shift position is changed. When it is not true, the program proceeds to step 14010 as it is and returns. When it is true, the target engine speed "tne" is changed in step 14005. In step 14006, the ignition timing reference value "mia" is changed. In step 14007, the fuel injection quantity is changed by a predetermined value, and the program proceeds to step 14010 and returns.

The fourteenth embodiment operates as described above. Therefore, when the burning state becomes bad in the process of suction air quantity feedback control and the shift position is changed while ignition timing feedback control is being conducted, the target engine speed "tne" and the ignition timing reference value "mia" are changed, and further the fuel injection quantity is changed by a predetermined value, and feedback control conducted by ignition timing is continued.

In this connection, concerning this fourteenth embodiment, like the variation of the ninth embodiment, it is possible to devise a variation in which feedback control is conducted by the fuel injection quantity. However, the explanation will be omitted here.

Embodiment of the Fourth Group

Next, embodiments of the fourth group will be explained below. Each embodiment of the fourth group relates to an engine speed control unit characterized in that: influences given to engine speed feedback control by a change with time and a difference in individual products can be prevented.

Fifteenth Embodiment

First, the fifteenth embodiment will be explained below. In this fifteenth embodiment, the burning state is good and the idling engine speed is subjected to suction air quantity feedback control.

Figure 32:
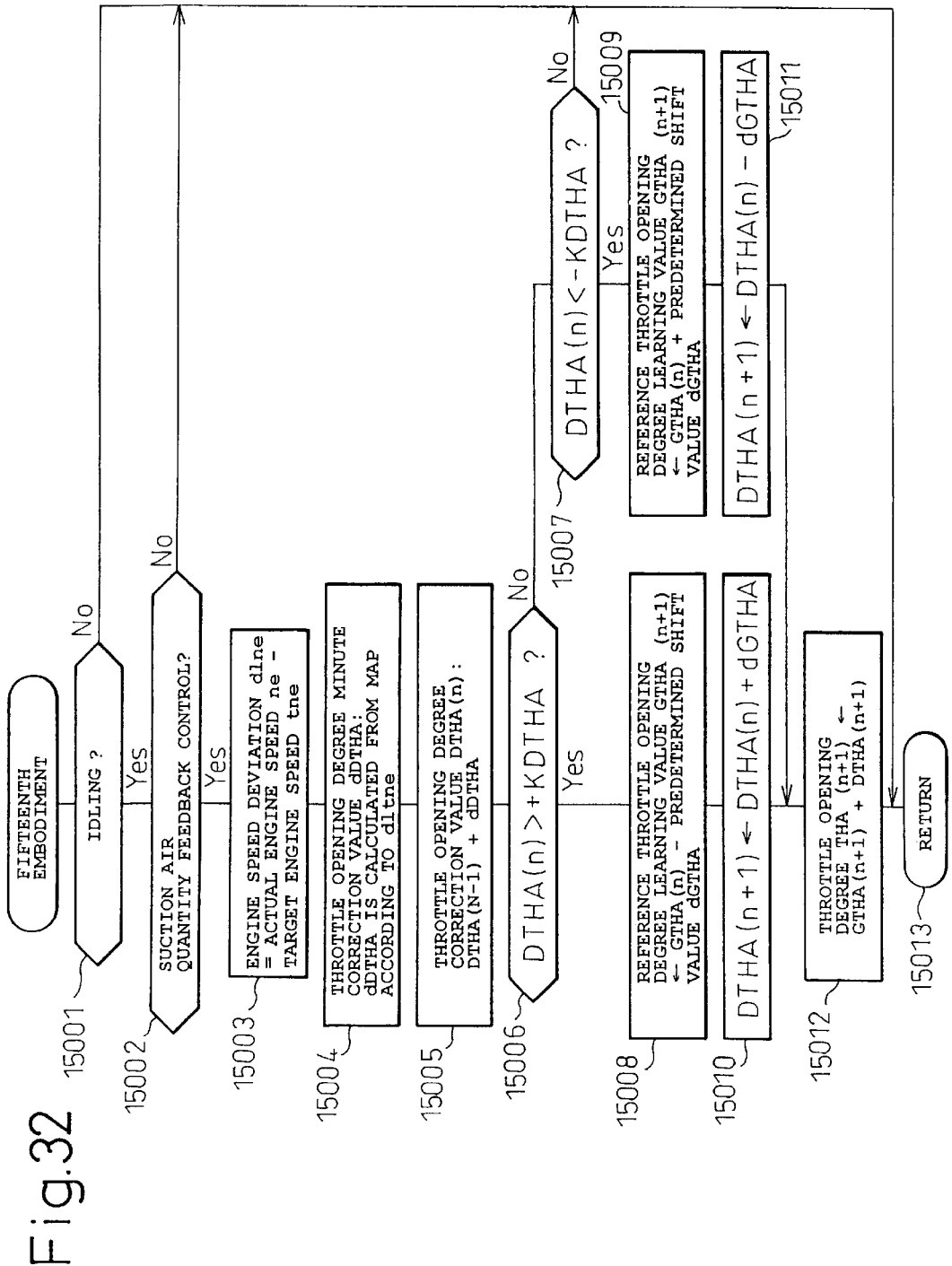
FIG. 32 is a flow chart of control conducted in the fifteenth embodiment.

FIG. 32 is a flow chart of the fifth embodiment. In step 15001, it is judged whether or not the engine is in an idling state. Whether or not the engine is in an idling state is judged by a signal sent from the throttle opening degree sensor 4 or the accelerator opening degree sensor 15 and also judged by a signal sent from the vehicle speed sensor 31. In step 15002, it is judged whether or not suction air quantity feedback control of the engine 1 is conducted.

When it is not true in steps 15001, 15002 the program proceeds to step 15013. When it is true in both steps 15001 and 15002, the program proceeds to step 15003. In step 15003, the engine speed deviation "dltne", which is a difference between the target engine speed "tne" and the actual engine speed "ne", is found. In step 15004, a correction value of the throttle opening degree corresponding to the engine speed deviation "dltne" is found from the map shown in FIG. 6 which is previously stored in ECU 10. Since this correction value is minute, it is referred to as a throttle opening degree minute correction value and represented by "dDTHA".

Next, in step 15005, a total correction value is found by adding the correction value of the this time to the correction value up to this time. This is simply referred to as a throttle opening degree correction value and represented by "DTHA".

This throttle opening degree correction value DTHA is added to the reference throttle opening degree value GTHA, which is previously set according to the condition, and made to be the execution throttle opening degree THA. This relation can be expressed by GTHA+DTHA=THA. This is executed in step 15012 at last.

However, before the program reaches step 15012, the reference throttle opening degree value GTHA and the throttle opening degree correction value DTHA are learned with respect to the present invention.

Therefore, this learning of the reference throttle opening degree value GTHA and the throttle opening degree correction value DTHA is explained. First of all, the reference throttle opening degree value GTHA is explained below.

Even when the same idling engine speed is obtained, work generated by the engine 1 is different because a load given to the engine 1 is different according to the operating condition of the engine 1.

For example, work generated by the engine 1 is different according to the engine temperature. Further, work generated by the engine 1 is different according to the state of the air conditioner. Furthermore, when the engine 1 is combined with an automatic transmission, work generated by the engine 1 is different according to the shift position of the automatic transmission, that is, work generated by the engine 1 is different according to the shift position such as running positions of D, 4, 3, 2, L, R and also according to stopping positions of P, N. Accordingly, the reference throttle opening degree GTHA is set with respect to the combination of these conditions by the results of experiments.

FIG. 37 is a map of this reference throttle opening degree.

However, the aforementioned load is different for each engine, and further the aforementioned load changes with time. Therefore, the throttle opening degree correction value DTHA is added to the reference throttle opening degree correction value GTHA. However, when a difference between the throttle opening degree, which is required for a predetermined engine speed, and the reference throttle opening degree is large, it takes long time for correction.

Therefore, control of this embodiment is conducted as follows. When the throttle opening degree correction value is higher (smaller) than a predetermined value, the reference throttle opening degree is made large (small), so that the throttle opening degree correction value is decreased by a value corresponding to the reference throttle opening degree which has been increased (decreased).

Accordingly, in step 15006, it is judged whether or not the throttle opening degree correction value DTHA(n) of the present time is higher than the predetermined value KDTHA. When it is not true in step 15006, it is judged in step 15007 whether or not the throttle opening correction value DTHA(n) is lower than the predetermined value –KDTHA.

When it is not true in step 15006 and also it is not true in step 15007, the program proceeds to step 15013 and returns.

When it is true in step 15006, the predetermined shift value dGTHA is subtracted from the reference throttle opening degree GTHA(n) in step 15008 so as to find the reference throttle opening degree GTHA(n+1) of the next time. In step 15010, the predetermined shift value dGTHA is added to the throttle opening degree correction value DTHA(n) so as to find the throttle opening degree correction value DTHA (n+1) of the next time. In step 15012, the reference throttle opening degree GTHA(n+1) of the next time and the throttle opening degree correction value DTHA (n+1) of the next time are added to each so as to find the throttle opening degree THA(n+1) of the next time, and then the program proceeds to step 15013 and returns.

The renewed reference throttle opening degree GTHA(n) is stored in ECU 10 in the form shown in FIG. 9.

When it is true in step 15007, the predetermined shift value dGTHA is added to the reference throttle opening degree GTHA(n) in step 15009 so as to find the reference throttle opening degree GTHA(n+1) of the next time. In step 15011, the predetermined shift value dGTHA is subtracted from the throttle opening degree correction value DTHA(n), so as to find the throttle opening degree correction value DTHA (n+1) of the next time. In step 15012, the reference throttle opening degree GTHA(n+1) of the next time and the throttle opening degree correction value DTHA(n+1) of the next time are added to each so as to find the throttle opening degree THA(n+1) of the next time, and then the program proceeds to step 15013 and returns.

In this connection, the shift value dGTHA can be set at an arbitrary value between dTHA and KDTHA.

The fifteenth embodiment operates as described above. Therefore, a period of time necessary for correction can be reduced and controllability can be enhanced.

Figure 36:
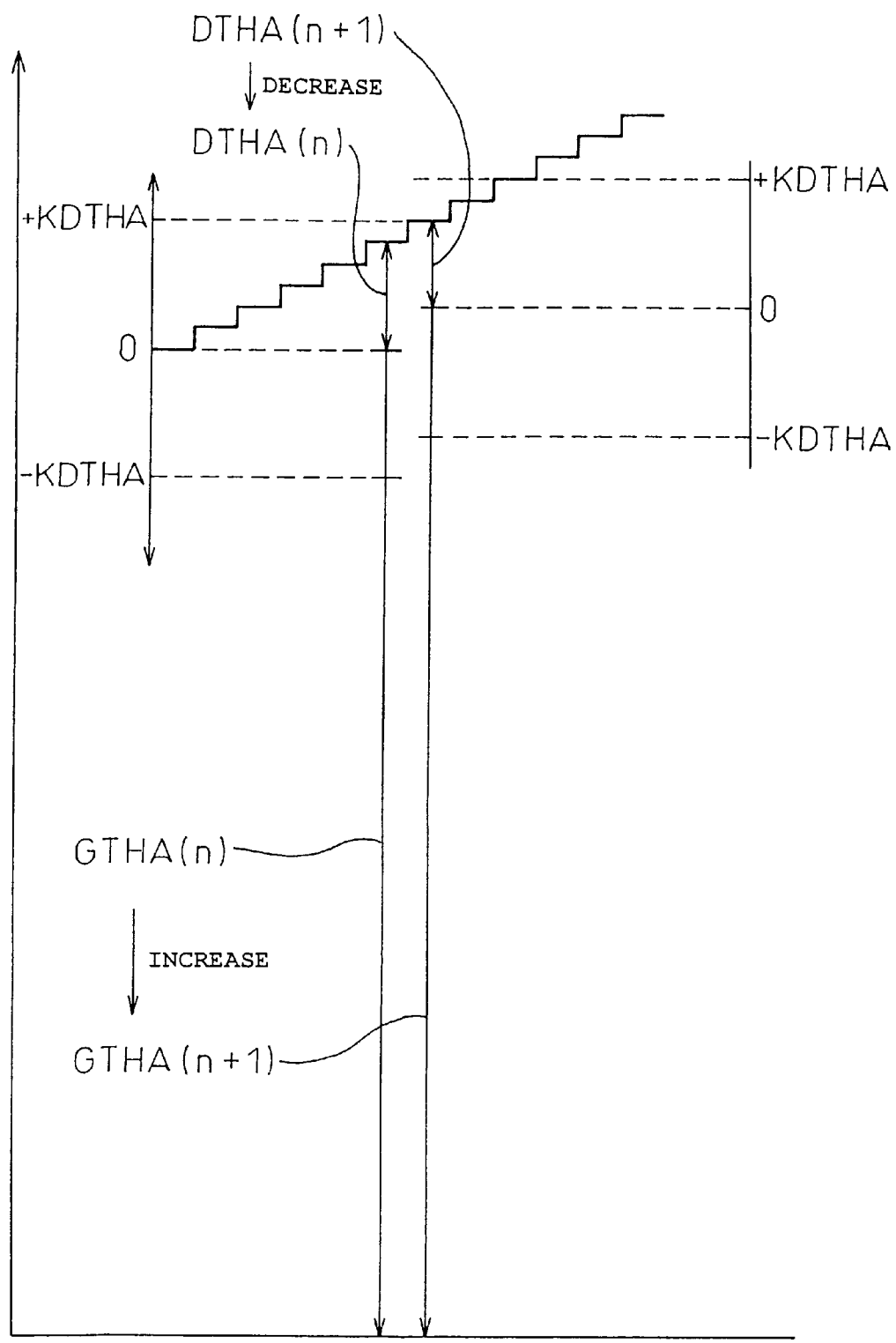
FIG. 36 is a view for explaining control conducted in the fifteenth embodiment.

FIG. 36 is a view for explaining control of the above fifteenth embodiment.

Sixteenth Embodiment

Figure 33:
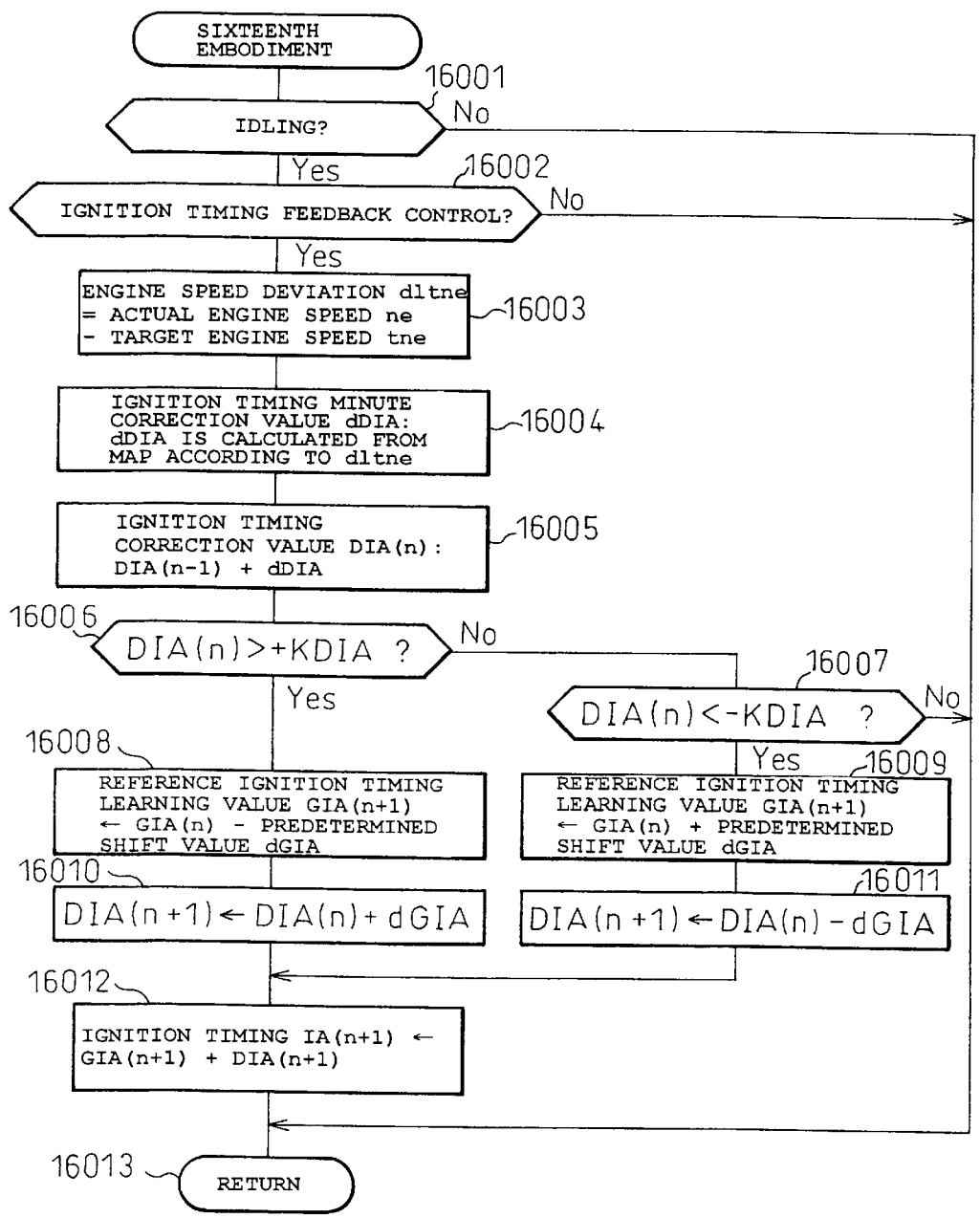
FIG. 33 is a flow chart of control conducted in the sixteenth embodiment.

FIG. 33 is a flow chart showing the sixteenth embodiment. The sixteenth embodiment operates as follows. In the case where the idling engine speed is subjected to feedback control by the quantity of suction air and the burning state is bad so that control is changed to feedback control conducted by the ignition timing, the same learning as that of the first embodiment is conducted on this feedback control conducted by the ignition timing.

In step 16001, in the same manner as that of the fifteenth embodiment, it is judged whether or not it is an idling state. In step 16002, it is judged whether or not the idling engine speed is in ignition timing feedback control.

When it is not true in steps 16001 and 16002, the program proceeds to step 16013. When it is true in both steps 16001 and 16002, the program proceeds to step 16003. In step 16003, the engine speed deviation. "dltne", which is a difference between the target engine speed "tne" and the actual engine speed "ne", is found. In step 16004, the minute correction value "dDIA" of ignition timing corresponding to the engine speed deviation "dltne" is found from the map in FIG. 38 previously stored in ECU 10.

Next, in step 16005, the ignition timing correction value DIA is found by adding the correction value of the present time to the correction value up to the present time.

In step 16006, it is judged whether or not the ignition timing correction value DIA(n) of the present time exceeds the predetermined value KDIA which has been previously determined. When it is not true in step 16006, it is judged instep 16007 whether or not the ignition timing correction value DIA(n) is lower than the predetermined value –KDIA.

When it is not true in step 16006 and also it is not true in step 16007, the program proceeds to step 16013 and returns.

When it is true in step 16006, the predetermined shift value dGIA is subtracted from the reference ignition timing GIA(n) in step 16008 so as to find the reference ignition timing GIA(n+1) of the next time. In step 16010, the predetermined shift value dGIA is added to the ignition timing correction value DIA(n) so as to find the ignition timing correction value DIA (n+1) of the next time. In step 16012, the reference ignition timing GIA(n+1) of the next time and the ignition timing correction value DIA(n+1) of the next time are added to each so as to find the ignition timing IA(n+1) of the next time, and then the program proceeds to step 16013 and returns.

The renewed reference ignition timing GIA(n) is stored in ECU 10 in the form shown in FIG. 41.

When it is true in step 16007, the predetermined shift value dGIA is added to the reference ignition timing GIA(n) in step 16009 so as to find the reference ignition timing GIA(n+1) of the next time. In step 16011, the predetermined shift value dGIA is subtracted from the ignition timing correction value DIA(n), so as to find the ignition timing correction value DIA (n+1) of the next time. In step 16012, the reference ignition timing GIA(n+1) of the next time and the ignition timing correction value DIA(n+1) of the next time are added to each other so as to find the ignition timing IA(n+1) of the next time, and then the program proceeds to step 16013 and returns.

In this connection, the shift value dGIA can be set at an arbitrary value between dIA and KDIA.

The sixteenth embodiment operates as described above. Therefore, a period of time necessary for correction can be reduced and controllability can be enhanced in the same manner as that of the first embodiment.

Seventeenth Embodiment

Figure 34:
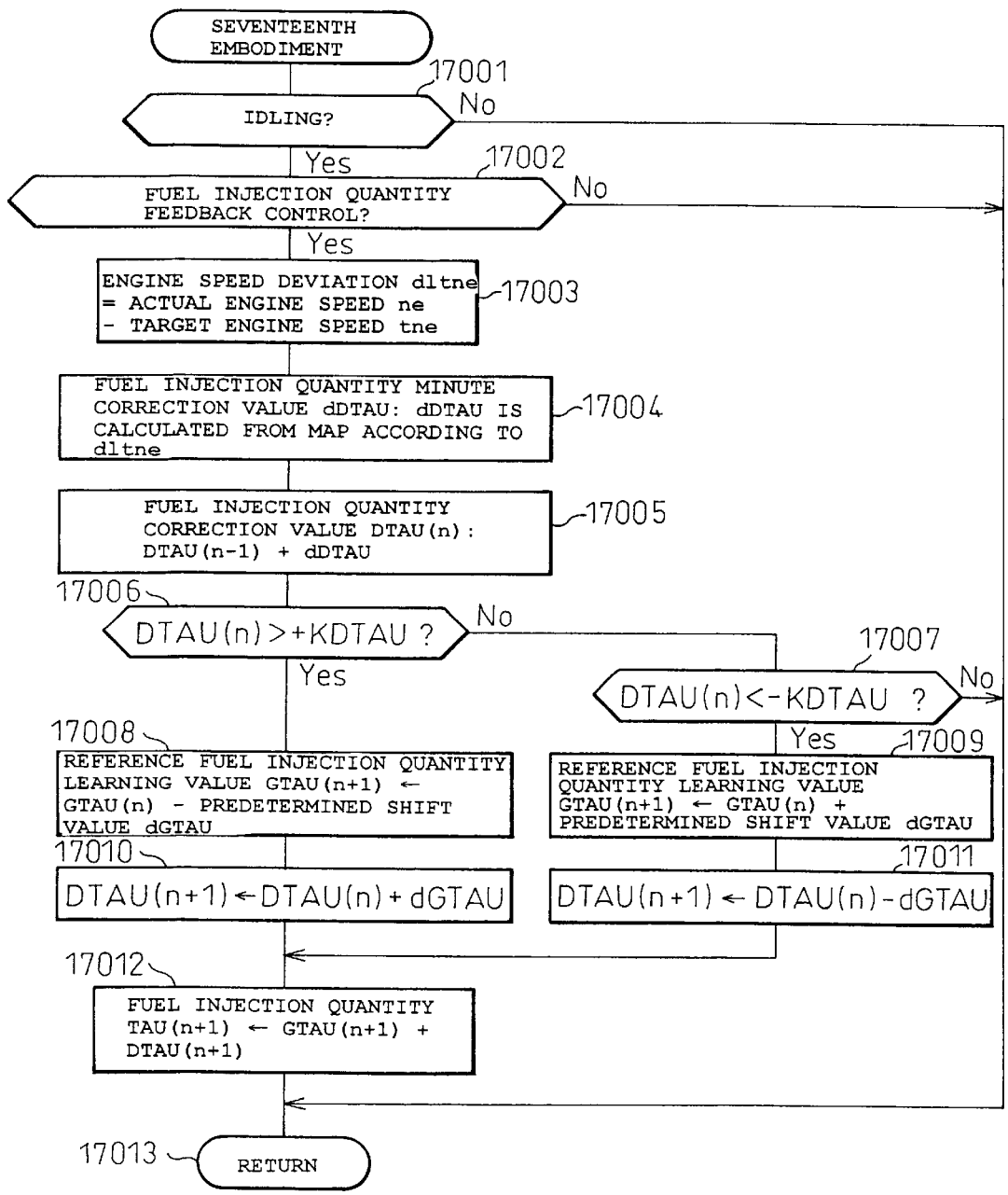
FIG. 34 is a flow chart of control conducted in the seventeenth embodiment.

FIG. 34 is a flow chart of the seventeenth embodiment. In this seventeenth embodiment, when the idling engine speed is subjected to feedback control by the quantity of suction air and the burning state is bad so that feedback control by the quantity of suction air is changed over to feedback control by the quantity of fuel injection, the same learning as that of the first embodiment is conducted on this feedback control by the quantity of fuel injection.

In step 17001, in the same manner as that of the fifteenth embodiment, it is judged whether or not the engine is in an idling state. In step 17002, it is judged whether or not the idling engine speed is subjected to feedback control conducted by the quantity of fuel injection.

When it is not true in steps 17001, 17002, the program proceeds to step 17013. When it is true in both steps 17001 and 17002, the program proceeds to step 1703. In step 17003, the engine speed deviation "dltne", which is a difference between the target engine speed "tne" and the actual engine speed "ne", is found. In step 17004, a minute correction value dDTAU of the quantity of fuel injection corresponding to the engine speed deviation "dltne" is found from the map shown in FIG. 39 which is previously stored in ECU 10.

Next, in step 17005, the throttle opening degree correction value DTAU is found by adding the correction value of the this time to the correction value up to this time.

In step 17006, it is judged whether or not the fuel injection quantity correction value DTAU(n) of the present time is higher than the predetermined value KDTAU which has been previously determined. When it is not true in step 17006, it is judged in step 17007, whether or not the fuel injection quantity correction value DTAU(n) is lower than the predetermined value −KDTAU which has been previously determined.

When it is not true in step 17006 and also it is not true in step 17007, the program proceeds to step 17013 and returns.

When it is true in step 17006, the predetermined shift value dGTAU is subtracted from the reference fuel injection quantity GTAU(n) in step 17008 so as to find the reference fuel injection quantity GTAU(n+1) of the next time. In step 17010, the predetermined shift value dGTAU is added to the fuel injection quantity correction value DTAU(n) so as to find the fuel injection quantity correction value DTAU (n+1) of the next time. In step 17012, the reference fuel injection quantity GTAU(n+1) of the next time and the fuel injection quantity correction value DTAU(n+1) of the next time are added to each so as to find the fuel injection quantity TAU(n+1) of the next time, and then the program proceeds to step 17013 and returns.

The renewed reference fuel injection quantity GTAU(n) is stored in ECU 10 in the form shown in FIG. 40.

When it is true in step 17007, the predetermined shift value dGTAU is added to the reference fuel injection quantity GTAU(n) in step 17009 so as to find the reference fuel injection quantity GTAU(n+1) of the next time. In step 17011, the predetermined shift value dGTAU is subtracted from the fuel injection quantity correction value DTAU(n) so as to find the fuel injection quantity correction value DTAU (n+1) of the next time. In step 17012, the reference fuel injection quantity GTAU(n+1) of the next time and the fuel injection quantity correction value DTAU(n+1) of the next time are added to each so as to find the fuel injection quantity TAU(n+1) of the next time, and then the program proceeds to step 17013 and returns.

In this connection, the shift value dGTAU can beset at an arbitrary value between dTAU and KDTAU.

The seventeenth embodiment operates as described above. Therefore, a period of time necessary for correction can be reduced and controllability can be enhanced in the same manner as that of the fifteenth embodiment.

Eighteenth Embodiment

In this eighteenth embodiment, when the burning state is judged to be bad in feedback control conducted by the idling engine speed, feedback control conducted by the ignition timing is executed. In this control, a cylinder in a bad burning state is discriminated, and ignition timing feedback control is executed only for that cylinder.

Figure 35:
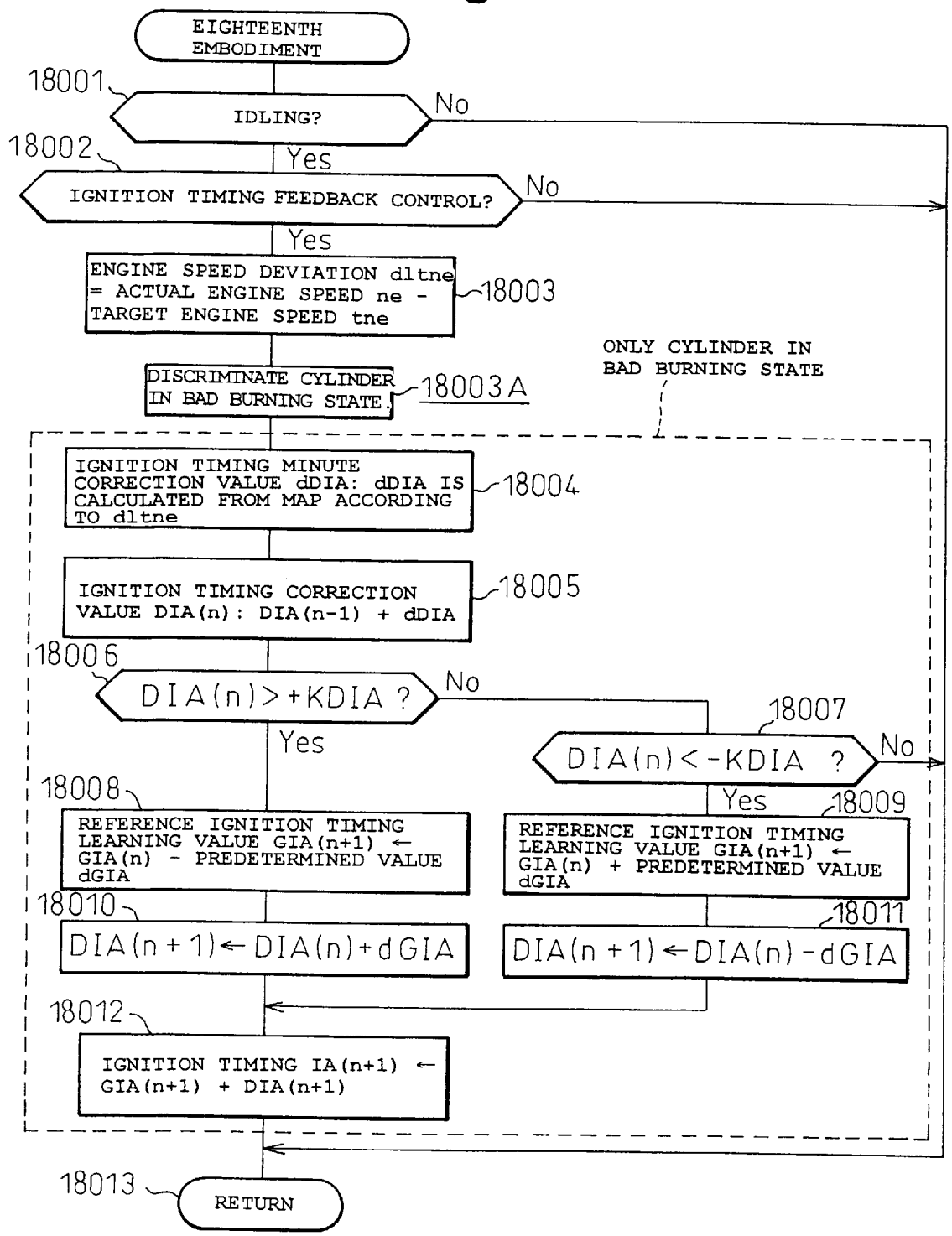
FIG. 35 is a flow chart of control conducted in the eighteenth embodiment.

FIG. 35 is a flow chart for controlling the eighteenth embodiment. Steps 18001 to 18013 in this flow chart are essentially the same as steps 16001 to 16013 in the flow chart of the sixteenth embodiment. However, the following two points are different. One point is that step 18003A to discriminate a cylinder in the bad burning state is added after step 18004, and the other point is that steps 18003 to 18012 are executed only for a cylinder in a bad burning state.

In this connection, as described before, the cylinder is discriminated in such a manner that a period of time (angle) that has passed from the reference signal generated by the cam position sensor 30 is measured on the basis of the signal generated by the crank position sensor 21.

In the eighteenth embodiment, when the burning state is bad in suction air quantity feedback control and ignition timing feedback control is conducted, a cylinder in a bad burning state is specified, and ignition timing feedback control is conducted on that cylinder, and ignition timing feedback control is not conducted on other cylinders for which ignition timing feedback control is unnecessary. Therefore, it is possible to prevent the deterioration of exhaust gas and drivability caused by taking a redundant countermeasure.

In this connection, the above method, in which a cylinder, the burning state of which is bad even if suction air quantity feedback control is conducted, is specified and subjected to another control, can be applied to not only the sixteenth embodiment but also the seventeenth embodiment.

Explanations are made into three embodiments belonging to the fourth group in which the idling engine speed is controlled. However, this control can be applied to not only control of the idling engine speed but also control of the engine speed in another operating condition.

What is claimed is:

1. An engine speed control unit of an internal combustion engine for controlling an engine speed so that it can reach a target, comprising:
    a first engine speed control means for controlling the engine speed by changing a quantity of suction air;
    a second engine speed control means for controlling the engine speed by changing a control value of a control parameter except for the quantity of suction air; and
    means for judging a burning state,
    wherein in the case of a good burning state the engine speed is controlled by the first engine speed control means, and in the case of a bad burning state, the engine speed control by the first engine speed control means is stopped and the engine speed is controlled by the second engine speed control means.

2. An engine speed control unit of an internal combustion engine according to claim 1, wherein the first engine speed control means is made to be a first after-start engine speed control means for controlling the after-start engine speed, which is an engine speed from the completion of the initial combustion at the engine starting to the idling steady state, so that the after-start engine speed can show a target change characteristic in the case where the burning state is judged to be good, the second engine speed control means is made to be a second after-start engine speed control means for controlling the after-start engine speed, which is an engine speed from the completion of the initial combustion at the engine starting to the idling steady state, so that the after-start engine speed can show a target change characteristic in the case where the burning state is judged to be bad, and the after-start engine speed from the completion of the initial combustion at the engine starting to the idling steady state is controlled.

3. An engine speed control unit of an internal combustion engine according to claim 2, wherein the second after-start engine speed control means changes at least one of the control values of ignition timing, quantity of fuel injection and fuel injection timing.

4. An engine speed control unit of an internal combustion engine according to claim 2, further comprising a bad burning cylinder judgment means, for judging a cylinder of bad burning, wherein, when it is judged to be a bad burning state, the bad burning cylinder is distinguished from other cylinders and controlled by the second after-start engine speed control means so that the engine speed can show a target change characteristic.

5. An engine speed control unit of an internal combustion engine according to claim 1, wherein the first engine speed control means is made to be a first idling engine speed control means for controlling the engine speed in the idling steady state so that it can reach the target value by feedback control in the case where the burning state is judged to be good, the second engine speed control means is made to be a second idling engine speed control means for controlling the engine speed in the idling steady state so that it can reach the target value in the case where the burning state is judged to be bad, and the engine speed in the idling steady state is controlled so that it can reach the target value.

6. An engine speed control unit of an internal combustion engine according to claim 5, wherein when it is judged to be a bad burning state and the idling engine speed control by the first idling engine speed control means is stopped and the idling engine speed control by the second idling engine speed control means is executed, the feedback control by the first idling engine speed control means is executed again after that, the burning state is rejudged by the means for judging a burning state in this state, when it is judged to be a bad burning state in the rejudgment of the burning state, the idling engine speed control is executed by the second engine speed control means.

7. An engine speed control unit of an internal combustion engine according to claim 6, wherein the idling engine speed control executed by the second engine speed control means after the rejudgment of the burning state is conducted by the same parameter as that of the idling engine speed control executed by the second engine speed control means before the rejudgment of the burning state while the control value is being changed.

8. An engine speed control unit of an internal combustion engine according to claim 6, wherein the idling engine speed control executed by the second engine speed control means after the rejudgment of the burning state is conducted by a different parameter from that of the idling engine speed control executed by the second engine speed control means before the rejudgment of the burning state.

9. An engine speed control unit of an internal combustion engine according to claim 8, wherein the idling engine speed control conducted by the second engine speed control means before the rejudgment of the burning state and the idling engine speed control conducted by the second engine speed control means after the rejudgment of the burning state are executed being selected so that the idling engine speed control, the influence given to exhaust gas emission of which is smaller, is executed first.

10. An engine speed control unit of an internal combustion engine according to claim 5, further comprising a bad burning cylinder discrimination means for discriminating a cylinder in a bad burning state, wherein, when it is judged to be a bad burning state, the bad burning cylinder is discriminated from other cylinders and controlled by the second engine speed control means.

11. An engine speed control unit of an internal combustion engine according to claim 5, wherein the idling engine speed control conducted by the second engine speed control means is also feedback control.

12. An engine speed control unit of an internal combustion engine according to claim 5, wherein the idling engine speed control conducted by the second engine speed control means is a quantitative change control by which the control parameter is changed by a predetermined value so that the control parameter can not exceed a guard value.

13. An engine speed control unit of an internal combustion engine according to claim 5, wherein the internal combustion engine is provided with an air/fuel ratio feedback control means for controlling an air/fuel ratio by feedback control, and the idling engine speed is controlled by the first idling engine speed control means when the air/fuel ratio feedback control means is operated.

14. An engine speed control unit of an internal combustion engine according to claim 5, wherein the idling engine speed is controlled by the first idling engine speed control means when the engine temperature is higher than a predetermined value.

15. An engine speed control unit of an internal combustion engine according to claim 5, wherein the idling engine speed is controlled by the first idling engine speed control means when the lapse of time after the start of the engine is more than a predetermined value.

16. An engine speed control unit of an internal combustion engine according to claim 5, wherein the means for judging a burning state judges a burning state from a change in the engine speed with respect to a change in the quantity of suction air of feedback control conducted by the first engine speed control means.

17. An engine speed control unit of an internal combustion engine according to claim 1, wherein the first engine speed control means conducts feedback-control so that the engine speed in the idling steady state can be a target value when it is judged to be a good burning state, and the second engine speed control means continues feedback-control so that the engine speed can be an after-load-change engine speed target value, which has been previously set, when a load is changed in the process of executing engine speed control by the second engine speed control means.

18. An engine speed control unit of an internal combustion engine according to claim 17, wherein the after-load-change engine speed target value is the same as the before-load-change engine speed target value.

19. An engine speed control unit of an internal combustion engine according to claim 17, wherein the after-load-change engine speed target value is different from the before-load-change engine speed target value.

20. An engine speed control unit of an internal combustion engine according to claim 17, further comprising a load change detection means, wherein the after-load-change engine speed target value is determined by a change in the load.

21. An engine speed control unit of an internal combustion engine according to claim 17, wherein the after-load-change control reference value corresponding to the after-load change engine speed target value is set, and the second engine speed control means conducts feedback control on the basis of the after-load-change control reference value.

22. An engine speed control unit of an internal combustion engine according to claim 17, further comprising a load change detection means, wherein the after-load-change control reference value is determined by a change in the load.

23. An engine speed control unit of an internal combustion engine according to claim 17, wherein the second engine speed control means conducts feedback control on the idling engine speed by one of the control parameters of the ignition timing and the quantity of fuel injection before a change in the load, and the second engine speed control means conducts feedback control on the engine speed by the same control parameter as that of before a change in the load even after a change in the load.

24. An engine speed control unit of an internal combustion engine according to claim 17, wherein the second engine speed control means conducts feedback control on the engine speed by one of the control parameters of the ignition timing and the quantity of fuel injection before a change in the load, and the second engine speed control means conducts feedback control on the engine speed by the same control parameter as that of before a change in the load even after a change in the load, and further a control parameter not participating in feedback control is changed by a predetermined value after a change in the load.

25. An engine speed control unit of an internal combustion engine according to claim 1, further comprising:

a parameter reference value learning means for renewing and storing a parameter reference value according to a state of operation;

a parameter correction value calculating means for calculating a parameter correction value necessary for making the engine speed close to a target value; and a parameter control means for controlling a parameter so as to provide a parameter execution value in which the parameter correction value is added to the parameter reference value, wherein the parameter reference value learning means renews a parameter reference value so that the parameter correction value can be reduced in the case where the parameter correction value exceeds a predetermined range, and the engine speed of the internal combustion engine is controlled so that it can reach a target value by feedback control of the control parameter selected according to the state of burning.

26. An engine speed control unit of an internal combustion engine according to claim 25, wherein the parameter reference value learning means stores a parameter reference value according to at least one of the engine temperature, the shift position of a transmission connected with the engine and the state of operation of the accessories.

27. An engine speed control unit of an internal combustion engine according to claim 25, wherein a quantity of suction air is selected as a control parameter in the case of a good burning state.

28. An engine speed control unit of an internal combustion engine according to claim 25, wherein ignition timing or a quantity of fuel injection is selected as a control parameter in the case of a bad burning state.

* * * * *